(12) United States Patent
Lemelson

(10) Patent No.: US 6,169,840 B1
(45) Date of Patent: *Jan. 2, 2001

(54) IMAGE-MODIFICATION METHODS

(76) Inventor: Jerome H. Lemelson, Suite 286, Unit 802 930 Tahoe Blvd., Incline Village, NV (US) 89451-9436

( * ) Notice: Under 35 U.S.C. 154(b), the term of this patent shall be extended for 0 days.

This patent is subject to a terminal disclaimer.

(21) Appl. No.: 08/008,493

(22) Filed: Jan. 25, 1993

Related U.S. Application Data

(63) Continuation of application No. 07/826,617, filed on Jan. 28, 1992, now Pat. No. 5,249,045, which is a continuation of application No. 07/426,080, filed on Oct. 24, 1989, now Pat. No. 5,119,190, which is a division of application No. 06/906,969, filed on Sep. 15, 1986, now Pat. No. 4,984,073, which is a continuation of application No. 06/723,183, filed on Apr. 15, 1985, now Pat. No. 4,660,086, which is a continuation of application No. 06/394,946, filed on Jul. 2, 1982, now Pat. No. 4,511,918, which is a division of application No. 06/013,608, filed on Feb. 16, 1979, now Pat. No. 4,338,626, which is a division of application No. 05/778,331, filed on Mar. 16, 1977, now Pat. No. 4,148,061, which is a continuation of application No. 05/254,710, filed on May 18, 1972, now Pat. No. 4,118,730, which is a continuation-in-part of application No. 04/267,377, filed on Mar. 11, 1963, now abandoned, which is a continuation-in-part of application No. 03/626,211, filed on Dec. 4, 1956, now Pat. No. 3,081,379, and a continuation-in-part of application No. 03/477,467, filed on Dec. 24, 1954, now abandoned.

(51) Int. Cl.$^7$ ..................................... H04N 5/76
(52) U.S. Cl. .............................. 386/46; 386/52; 386/117
(58) Field of Search ............................ 358/335, 310, 358/311, 312, 313, 319, 322, 327, 339; 360/33.1, 38.1, 13, 14.1, 14.3; H04N 5/92, 5/76, 5/78, 5/781, 5/782, 5/783, 9/79, 9/89

(56) References Cited

U.S. PATENT DOCUMENTS

| | | | |
|---|---|---|---|
| 1,985,035 | 12/1934 | Kermode et al. | ........................ 209/11 |
| 2,020,925 | 11/1935 | Young | .................................. 209/111 |
| 2,532,063 | 11/1950 | Herbst | ..................................... 178/6.8 |
| 2,830,285 | 4/1958 | Davis et al. | ........................ 340/174 |
| 2,894,247 | 7/1959 | Relis | ..................................... 340/149 |

(List continued on next page.)

FOREIGN PATENT DOCUMENTS

| | | |
|---|---|---|
| 750422 | 6/1956 | (GB) . |
| 757284 | 9/1956 | (GB) . |
| 757824 | 9/1956 | (GB) . |
| 785605 | 10/1957 | (GB) . |

OTHER PUBLICATIONS

Greanias et al., The Design of a Logic for the Recognition of Printed Characters by Simulation on the IBM Type 650 MDDPM (Engineering Laboratory, International Business Machines Corporation, Mar. 30, 1956).

(List continued on next page.)

*Primary Examiner*—Thai Tran
(74) *Attorney, Agent, or Firm*—Niro, Scavone, Haller & Niro

(57) ABSTRACT

Methods for recording, reproducing, modifying, and displaying image information. An electro-optical scanner, such as a camera, scans an image field and generates signals that vary in accordance with variations in the optical characteristics of the matter and objects in the image field scanned. Bit codes define the locations on a recording member of groups of the output electrical signals, such as a frame of image information or an object in the scanned image field. Further codes define desired modifications to be made to such groups of signals, such as alteration of intensity or superimposition. The location codes and the modification codes are applied to the signals representing image information to modify those signals, and the modified groups of information signals are applied to generate a modified image on an electronic viewing screen.

58 Claims, 16 Drawing Sheets

U.S. PATENT DOCUMENTS

| | | | |
|---|---|---|---|
| 2,906,819 | 9/1959 | Smith | 178/17 |
| 2,919,426 | 12/1959 | Rohland | 340/149 |
| 2,921,469 | 1/1960 | Newton | 73/290 |
| 2,947,945 | 8/1960 | Relis et al. | 328/112 |
| 2,963,551 | 12/1960 | Schreiber et al. | 179/15.55 |
| 2,968,936 | 1/1961 | Croset | 64/7 |
| 3,008,123 | 11/1961 | Rohland et al. | 340/149 |
| 3,069,654 | 12/1962 | Hough | 340/146.3 |
| 3,225,177 | 12/1965 | Stites et al. | 235/61.11 |
| 5,249,045 | 9/1993 | Lemelson | 358/93 |
| 5,283,641 | 2/1994 | Lemelson | 348/92 |
| 5,351,078 | 9/1994 | Lemelson . | |

OTHER PUBLICATIONS

Greanias et al., "Design of Logic for Recognition of Printed Characters by Simulation," *IBM Journal*, pp. 8–18 (Jan. 1957).

Walker et al., *Photoelectric Cell Applications*, pp. 66–67, 146–52 (Sir Isaac Pitman & Sons, Ltd., 2d ed. 1935).

Levy, "The Electronic Aspects of the Canadian Sorting of Mail System." Proceedings of the National Electronics Conference, pp. 543–557 (vol. x, Oct. 4–6, 1954).

Maxwell et al., Synchronization of Multiplex Systems for Recording Video Signals on Magnetic Tape, *IRE Convention Record*, pp. 3–11 (Part 7, Mar. 21–24, 1955).

"Cutting Bank's Paperwork," *Business Week*, p. 141 (Oct. 1, 1955).

Kelner et al., "Magnetic Shift–Register Correlator," *Electronics*, pp. 172–175 (Aug. 1956).

Snyder, "Ampex's New Video Tape Recorder," *Tele–Tech & Electronic Industries*, pp. 72–73, 108, 110 (Aug. 1956).

Carroll, "Trends in Computer Input/Output Devices," *Electronics*, pp. 142–149 (Sep. 1956).

Greanias et al., "The Design of a Logic for the Recognition of Printed Characters by Simulation," pp. 456–462, read at Convention on Digital–Computer Techniques (Paper No. 2149 M, Apr. 12, 1956).

Eldredge, "Automatic Input for business Data–Processing Systems," Proceedings of the Eastern Joint Computer Conference, pp. 69–73 (Dec. 10–12, 1956).

Ginsburg, Video Tape Recorder Design, *Journal of the Society of Motion Picture and Television Engineers*, pp. 177–182 (vol. 66, No. 4, Apr. 1957).

Ginsburg, "Achievement of Practical Tape Speed for Recording Video Signals," *IRE Transactions on Broadcast Transmission Systems* pp. 25–29 (Jun. 1957).

Koller, "Instrumentation Applications of the Ampex Videotape Recorder," *IRE Wescon Convention Record*, pp. 43–48 (Part 5, Aug. 20–23, 1957).

Shepard et al., "A Reliable Character Sensing System for Documents Prepared on Conventional Business Devices," *IRE Wescon Convention Record*, pp. 111–120 (Part 4, Aug. 20–23, 1957).

Kirsch et al., "Experiments in Processing Pictorial Information with a Digital Computer," Proceedings of the Eastern Joint Computer Conference, pp. 221–229 (Dec. 9–13, 1957).

Grimsdale, et al., "A System for the Automatic Recognition of Patterns," Proceedings of the Institution of Electrical Engineers, pp. 210–221 (Paper No. 279, 1959).

Young, "Automatic Character Recognition," *Electronic Engineering*, pp. 2–10 (Jan. 1960).

Deckert, "The Recognition of Typed Characters," *Electrical Manufacturing*, pp. 129–133 (Jun. 1960).

"The Voracious Eye," *Time*, pp. 69–70 (Sep. 5, 1960).

Gronich et al., "Machines that Read," *Radio–Electronics*, pp. 64–67 (Sep. 1960).

Blum, "An Associative Machine for Dealing with the Visual Field and Some of Its Biological Implications," *Biological Prototypes and Synthetic Systems*, vol. 1, pp. 244–260 (Bernard et al., eds 1962).

Golovin, "Reading Printed Data Electronically," *Automation*, pp. 60–64 (Dec. 1961).

Block, "The Perceptron: A Model for Brain Functioning," *Reviews of Modern Physics*, pp. 123–135 (vol. 34, No. 1, Jan. 1962).

Bauldreay et al., "Solving Registration Problems In Optical Character Recognition," *Electronics*, pp. 77–81 (Jan. 5, 1962).

Butterfield et al., "Two Ideas for Character Recognition," *Control Engineering*, p. 113 (Aug. 1962).

"Electronic Brain Get Eyes," *Business Week*, pp. 56–59 (Aug. 4, 1962).

Graham, "Snow Removal—A Noise–Stripping Process for Picture Signals," *IRE Transactions on Information Theory*, pp. 129–144 (Feb. 1962).

Hu, "Visual Pattern Recognition by Moment Invariants," *IRE Transactions on Information Theory*, pp. 179–187 (Feb. 1962).

Spinrad, "Machine Recognition of Hand Printing," *Information and Control*, pp. 124–142 (1965), allegedly based on Ph.D. Thesis dated May 17, 1963.

IMAGE-MODIFICATION METHODS

RELATED APPLICATIONS

This is a continuation of application Ser. No. 07/826,617, filed Jan. 28, 1992, now U.S. Pat. No. 5,249,045, which is a continuation of Ser. No. 07/426,080, filed Oct. 24, 1989, now U.S. Pat. No. 5,119,190, which is a division of Ser. No. 06/506,969, filed Sep. 15, 1986, now U.S. Pat. No. 4,984,073, which is a continuation of application Ser. No. 06/723,183, filed Apr. 15, 1985, now U.S. Pat. No. 4,660,086, which is a continuation of application Ser. No. 06/394,946, filed Jul. 2, 1982, now U.S. Pat. No. 4,511,918, which is a division of application Ser. No. 06/013,608, filed Feb. 16, 1979, now U.S. Pat. No. 4,338,626, which is a division of application Ser. No. 05/778,331, filed Mar. 16, 1977, now U.S. Pat. No. 4,148,061, which is a continuation of application Ser. No. 05/254,710, filed May 18, 1972, now U.S. Pat. No. 4,118,730, which is a continuation-in-part of application Ser. No. 04/267,377, filed Mar. 11, 1963, now abandoned, which is a continuation-in-part of application Ser. No. 03/626,211, filed Dec. 4, 1956, now U.S. Pat. No. 3,081,379, and a continuation-in-part of application Ser. No. 03/477,467, filed Dec. 24, 1954, now abandoned.

BACKGROUND OF THE INVENTION

It is known in the art to record a series of picture signals on a moving magnetic tape and subsequently reproduce the picture signals at essentially the same rate of recording to create a motion picture on a video or television screen for visual observation. My patent application Ser. No. 688,348, now U.S. Pat. No. 3,051,777, describes means for recording a video signal of a single frame or screen sweep of the video scanning beam of a camera or flying spot scanner. The video signal may be reproduced thereafter and used to provide a still image picture on a video monitor screen.

In U.S. Pat. No. 2,494,441, a method and an apparatus are disclosed for obtaining the average or mean dimensions of small particles by counting pulses generated in scanning a large number of small particles. In this particular disclosure, it is necessary to mathematically calculate the average or mean particle size and possibly the area covered by the particles by using mathematical formulas. However, it is not possible to specifically pick out a particular particle and measure its size or area directly by using this prior art method and apparatus.

In U.S. Pat. No. 2,731,202, an apparatus is provided for counting the number of particles appearing in a field of view against a background contrasting in appearance with the particles. In this particular prior art structure, a beam is impinged on the viewing field. Whenever there is a change in the beam intensity, an electrical pulse is produced and counted. That is, this prior-art method and apparatus merely provides a simple counting technique. There is absolutely no disclosure for digitizing the image on the field of view to provide its location or the specific dimensions thereof.

PURPOSE OF THE INVENTION

It is a primary object of this invention to provide a new and improved automatic scanning and inspection apparatus.

Another object is to provide an automatic image field scanning apparatus which is capable of automatically determining various characteristics of the field being scanned or any predetermined portion thereof.

Another object is to provide an automatic inspection apparatus employing one or more electron beams which apparatus is highly versatile and may be used to perform a plurality of different scanning and inspection functions without major modification to said apparatus.

A further object is to provide an automatic inspection apparatus including beam scanning means for analyzing an image or field with said apparatus capable of providing the results of scanning directly in coded form which may be used by a computer.

Another object is to provide an automatic inspection apparatus for automatically comparing or measuring a plurality of different dimensions in an image field in a substantially shorter time interval than possible by conventional inspection means.

Another object is to provide an improved means for electrically controlling and selecting portions of an image field being inspected.

A still further object is to provide an improved electro-optical comparator means employing beam scanning which does not require masking an image field for effecting selective area scanning.

Another object is to provide an automatic inspection apparatus employing beam scanning to determine dimensions and other characteristics of articles of manufacture, whereby both the work and the beam scanning means may be positionable by numerically controlled manipulators to present predetermined portions of the articles to be inspected in the field of the beam scanning means.

Another object is to provide automatic inspection beam scanning means for scanning and inspecting a plurality of different image fields which may comprise different areas of a workpiece.

Still another object is to provide means whereby a video picture signal may be used to effect automatic quality control by the investigation of part of said signal.

Another object is to provide a means for effecting automatic measurement and quality control functions using two video picture signals. One is a standard signal of known characteristic and the other is a sample or test signal whereby all or parts of said signals are investigated and compared by their simultaneous reproduction from a magnetic recording medium on which they are recorded in a predetermined relative position.

Another object is to provide automatic means for reproducing a specific or predetermined part or parts of a video picture signal for computing, measurement or control purposes.

Another object is to provide automatic means for reproducing that part of a video signal derived during the scanning of a specific area of a total image field without the need to control the scanning beam of a video scanning device.

Another object is to provide means for operating on video picture signals and for modifying or changing specific portions of said signals whereby the altered picture signal may be used to produce a video image or still picture of modified image characteristics.

Another object is to provide a recording arrangement including analog signals with digital pulse code signals recorded adjacent thereto for identifying portions of said signals.

Another object is to provide automatic scanning and control means for effecting measurement or inspection of an article of manufacture on a production line for determining the dimensional or other physical characteristics thereof.

Another object is to provide new and improved apparatus which may be used to effect various inspection, control and digitizing functions.

Another object is to provide automatic apparatus for measuring an object or surface including means for selectively measuring predetermined parts of said object and for providing information in code form resulting from said measurement which code may be utilized by a digital computer.

SUMMARY OF THE INVENTION

As described herein, an apparatus and a method are provided for digitizing an image field. Code signals such as binary digital signals are generated when the image field is scanned. The code signals indicate information such as location of a line, the border of an object, the distance between lines or borders, and areas. It would be possible to indicate information related to volumes when appropriate mechanism is provided to scan in all directions.

In one embodiment of this invention, a beam scanning apparatus includes an electron beam which may be moved relative to a workpiece or image field to provide information or a picture field from a code signal which has been generated within the beam scanning apparatus. The apparatus further includes means for analyzing the code signal to determine certain characteristics of the image field such as the presence or absence of images or image portions such as components of an assembly, flaws, or other objects in the field, and the location and/or dimension thereof.

The apparatus of this invention is applicable for the inspection of articles of manufacture. In addition, the apparatus may be used to automatically analyze a field such as a drawing, photograph, map or electronic picture as found on an oscilloscope. The analysis provides a determination of the degree of certain characteristics of the field such as light or dark areas which are indicative of certain known conditions.

Such characteristics are obtainable in code form in one aspect of the invention and are thus capable of being analyzed by a computer or other device. In another form of the invention, apparatus is presented for automatically analyzing a changing condition in an image field.

In another specific embodiment, the digitizing can be effected either automatically by a flying spot scanner or by a cathode ray tube or by manual techniques which currently use a photoelectric cell or some other form of sensing device. Therefore, the digitizing may be accomplished either in constant speed or variable speed. That is, it can be done either by timing of a constant speed scanner or in proportion to the degree of movement of an allied digital converter such as a wheel having codes associated therewith.

DEFINITION OF TERMS

Components and known circuits provided herein bear the following general alphabetical notations in the various drawings. Unless otherwise noted, the circuits and components referred to herein and illustrated in block notation are standard circuits which are known in the art. General titles, notations or terms such as "multi-circuit timer or controller", "computer", "computing circuit", "recorder and/or computer", "signal analyzer", "analog/digital converter", "clipper", "alarm", "storage tube", and "binary adder", are well known components and perform specific functions known in the prior art. The various components referred to, while they perform their normal functions, have been combined together in a new and unobvious way to effectuate a new and unobvious result not known in the prior art before the effective filing date of the present application. Such prior art patents as U.S. Pat. Nos. 2,494,441; 2,731,202; 2,749,034; 3,081,379; 3,098,119; 3,239,602; 3,539,715; 2,429,228; 2,726,038; 2,754,059; 2,735,082; 3,146,343; 3,027,082; 2,979,568; 2,536,506; 2,615,306; and 2,729,771 are exemplary of the manner in which such terminology is acceptable in the prior art to fully disclose the inventions claimed therein. As shown in these prior art patents, all of the terminology referred to, in the instant case is clearly known in the prior art and thereby provides the skilled artisan sufficient disclosure to effectuate the invention of the present disclosure. Where a hyphen (-) follows the letter, it is assumed that a multiplicity of the devices or circuits are provided in the disclosure.

A—Amplifier, such as a reproduction amplifier for amplifying signals reproduced by an associated magnetic reproduction transducer or pickup head PU.

RA—Recording amplifier, used to record pulse or video picture signals on a magnetic recording member.

AN—A logical AND switching circuit which will produce an output signal when, and only when, signals are present at all inputs to said circuit.

CL—A vacuum tube or semi-conductor clipping circuit, preferably a video clipper operating at a desired clipping level.

CM,CM'—A Schmitt cathode coupled multi-vibrator circuit, which comprises a cathode coupled multivibrator with an associated signal inverter at the output of the multivibrator. This circuit will produce a pulse output when the leading edge of an elongated pulse appears at said circuit and a second pulse output when the trailing edge of said pulse reaches said circuit.

D—Delay line or time delay relay of required time constant. If a signal such as a video picture signal is to be delayed, D signifies a delay line.

IF,IFP—A scanning image field where video beam scanning is employed for inspection.

N—A normally closed, monostable switch or logical NOT switching circuit which will open and break a circuit when a signal is present at its switching input. It may be a vacuum tube, semiconductor or electromechanical device or any other logical circuits or gates.

OR—A logical OR switching circuit adapted to pass a signal from any of a multiple of inputs over a single output circuit.

FF—A Flip-flop switch, electromechanical, vacuum tube or semi-conductor circuit. A bi-stable switch adapted to: (a) switch an input signal from one of two input circuits to one of two output circuits, (b) switch a signal from a single input circuit over one of two outputs depending on the described application. The flip-flop switch may have two or three switching inputs depending on the application, a complement input C which, when energized, switches a single input from one output to the other and/or two inputs, each of which, when energized, switches the flip-flop to its respective output.

PB—A picture signal, preferably derived from beam scanning a fixed image field IF. The signal may be amplitude modulated or frequency modulated and may be the output of a conventional television scanning camera, flying spot scanner or the like. It may be a continuous signal or may consist of a multitude of short pulses depending on the type of scanning and signal formation employed.

The PB signal may also be derived from the output of a fixed photo multiplier tube with the image or object being scanned, being moved to provide variations in said signal.

For some applications, the PB signal may be any analog signal derived from scanning, an analog or digital computer or other computing device.

PC—Pulse code number. This may be any type of code (binary digit, decimal, etc.) recorded either longitudinally along a single channel of a magnetic recording member or recorded laterally along a single channel of a magnetic recording member or laterally along a fixed path or line across multiple channels of said recording member, there being code positions where said code line crosses each recording channel which either (a) contains or does not contain a pulse recording or (b) contains a positive pulse recording or a negative pulse recording depending on the design of the digital computing or switching apparatus to which the reproduced code is transmitted. If recorded along a lateral line of the recording member, the code PC may be reproduced at a specific point in the reproduction of one or more picture or analog signals adjacent thereto and may be used to effect a specific switching action when reproduced to affect a specific section or length of the associated picture signal(s).

SW—A, limit switch.

SC,CS—A signal or signals preferably recorded in positions on a magnetic recording member to be reproduced simultaneously with a specific section of another picture or analog signal and used for gating or control purposes.

ST—refers to a video storage tube or storage device having a writing input WI for recording a picture signal on the storage element of said tube and an output RI, which, when a second input R2 is pulsed or energized, passes a picture signal derived from the scanning of the read beam of said tube.

CL—refers to a clipping circuit adjusted to clip at a specific clipping level. A diode, triode or other clipper such as used in video clipping.

IF, IFP—refers to an image or object field being scanned to produce a picture signal. The field in the optical system of a conventional or special television scanning camera. The field may also be the screen of an optical comparator or projection microscope having a video scanning camera or flying spot scanner focused and positioned relative thereto in a predetermined manner. The image or images in said field may be any optical or radiation phenomenon which provides an area or areas therein of different radiation or light characteristic relative to other areas so that, in scanning across said different areas, the resulting picture signal will change sufficiently to permit a measurement or measurements to be made by electrically noting said changes or differences. The field may also comprise a map, photograph, X-ray image or pattern, etc.

All of the above terms indicating various components may be interconnected to accomplish their desired results by the skilled artisan. The drawings discussed herein below along with the description of the specific embodiments clearly give guidance to the skilled artisan to select and interconnect each of the prior art devices to perform the desired operations and effectuate the new and unobvious results as set forth herein.

BRIEF DESCRIPTION OF DRAWINGS

The various electrical circuits used herein for performing the described measurement, comparison and indicating functions are illustrated in block diagram notation for the purposes of simplifying the descriptions and drawings.

The following assumptions are also made regarding the circuitry to simplify drawings and descriptions:

Figure 1:
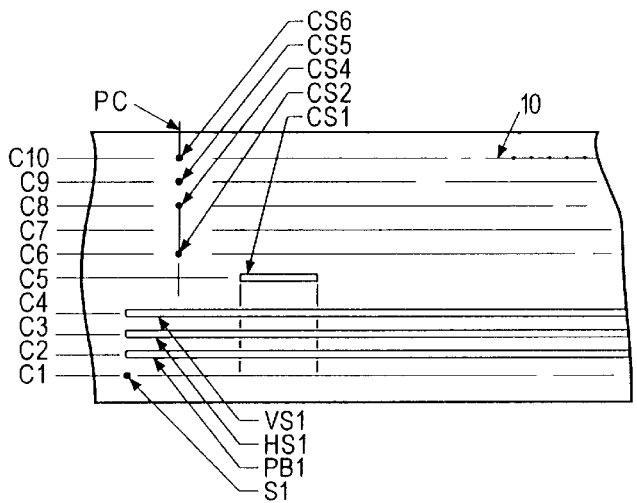

In the diagrams, where junctions are illustrated between two or more circuits which are electrically connected at said junction with a further single circuit, it is assumed that a logical OR circuit is employed at said junction.

Where a single circuit extends from a junction to two or more circuits, it is assumed that either a single input, multi-output transformer is provided at said junction or said output circuits are resistance balanced permitting any input signal to travel over both of said outputs.

Wherever circuits which require a power source, such as switching or logical circuits, gates, clipping circuits, multi-vibrators, servo motors, controls, amplifiers, transducers, are provided, it is assumed that a source of the correct electrical power or potential is provided for said circuits. Power is also assumed to be provided on the correct side of all gates and relays where needed.

Various automatic measurement and comparison scanning techniques are provided herein whereby a picture signal, derived from photoelectric, or video scanning an image field or part of a field, is recorded on a magnetic recording member such as a magnetic tape along a predetermined length of said tape and in predetermined positions relative to other signals used for gating and control. When reproduced together, said other signals may be used to effect one or more predetermined functions relative to said picture signal.

The method of recording all signals in predetermined relative positions on a recording member and then reproducing and using said signals in one or more manners described herein has a number of advantages including the provision of a record which may be rechecked, if necessary, or otherwise monitored. However, in the embodiments provided, it is not necessary to record the video or picture signal on the recording member if means are provided for presenting said picture signal in the respective measurement or control circuit at a predetermined time in relation to said other signals. For many of the functions described, particularly those where it is only necessary to measure or compare images, a picture signal may be passed directly from a video storage tube or other photoelectric scanning device to the reproduction amplifier through which the reproduced signal passes. However, functions such as record keeping may require that the picture signal. be recorded; hence recording arrangements are illustrated.

In the various magnetic recording arrangements and apparatus provided herein, picture signals are shown recorded on a magnetic recording member which also has other signals recorded thereon in predetermined positional relationship to said picture signals. The recording member is illustrated as an elongated flexible magnetic tape or the developed surface of a magnetic disc or drum. While not illustrated, it is assumed that known means are provided for driving the tape or drum at constant speed past magnetic reproduction apparatus when constant speed is a requisite for the desired measurement. For example, when an automatic timing circuit is utilized to effect a measurement between two predetermined points in the picture signal, the timing device and the drive for the tape must be synchronized to start at predetermined times and operate at predetermined rates. If the magnetic recording member is driven at a predetermined constant speed, and if the timing device operates at a predetermined constant rate and is started at an instant determined by the time of reproduction of one or more signals on said magnetic recording member, then a particular reading or value of the timing device may be converted to a lineal distance or a coordinate in the field which was scanned to produce said picture signal.

The above objects and other advantages will appear in the following description and appended claims, reference being made to the accompanying drawings forming a part of the specification wherein like reference characters designate corresponding parts in the several views.

Figure 1A:
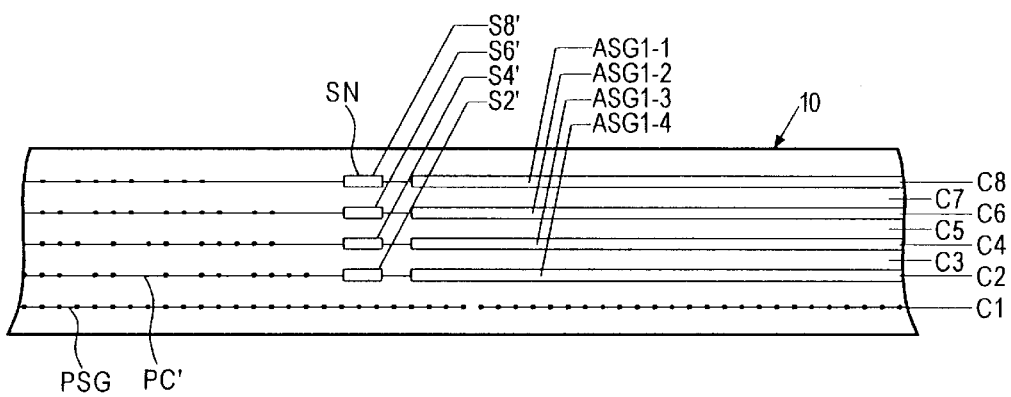
Figure 1B:
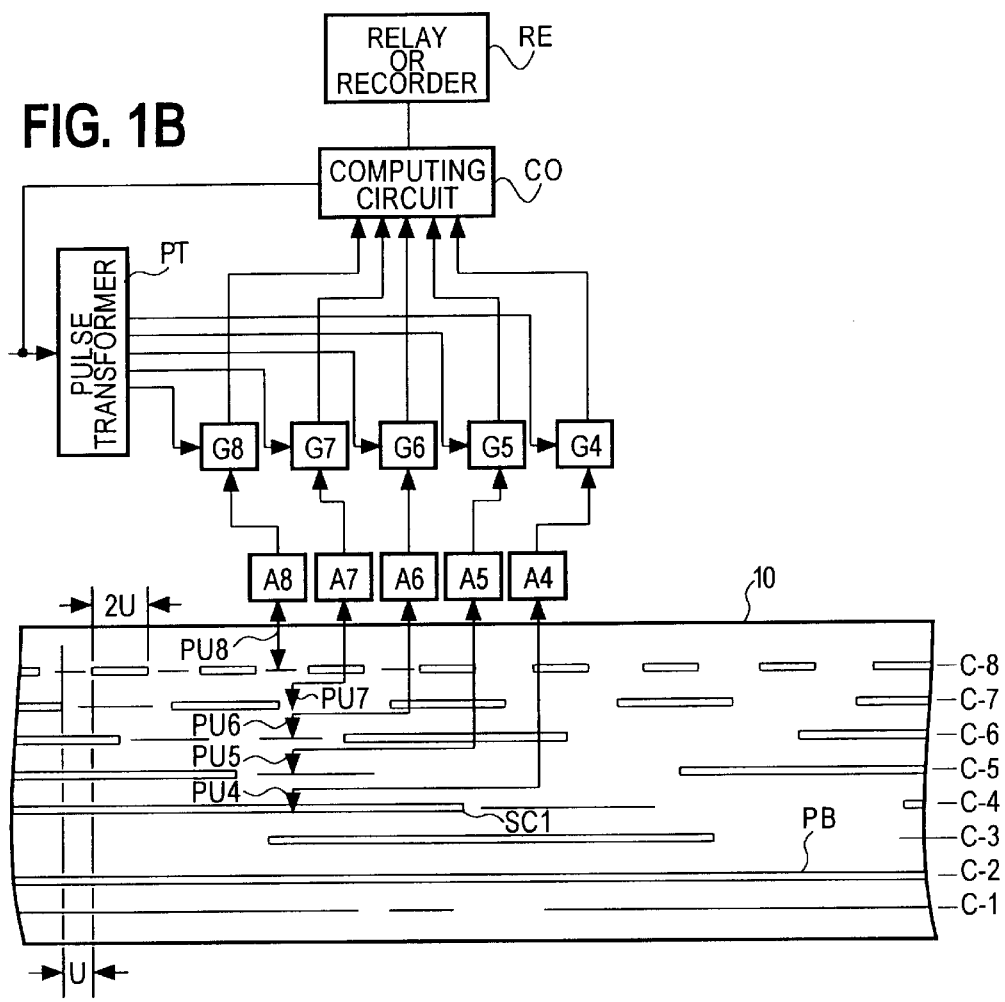
Figure 1B:
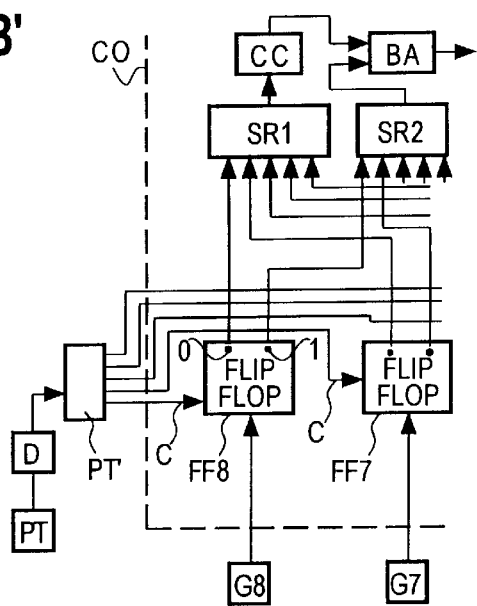
Figure 1C:
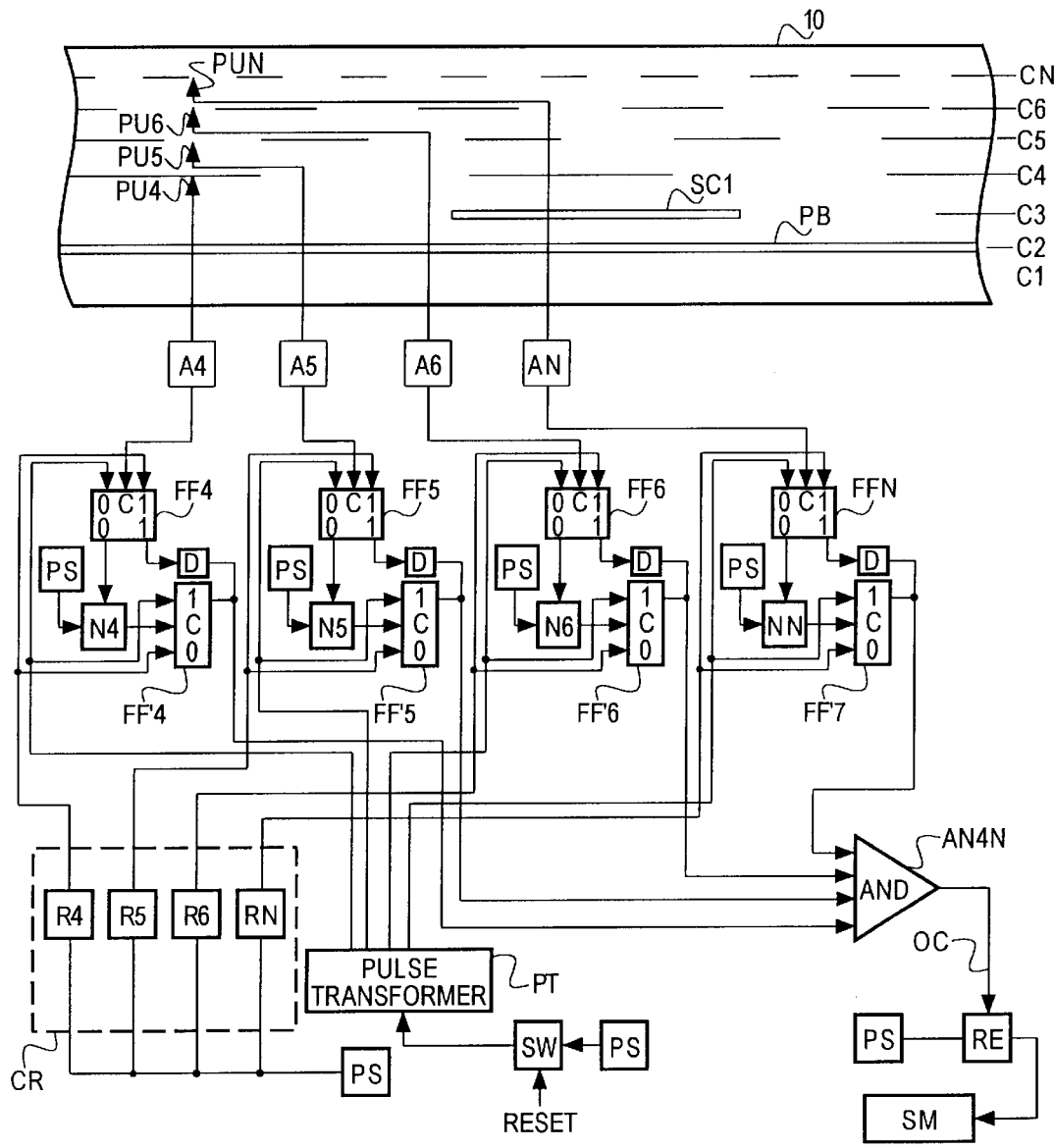
Figure 2:
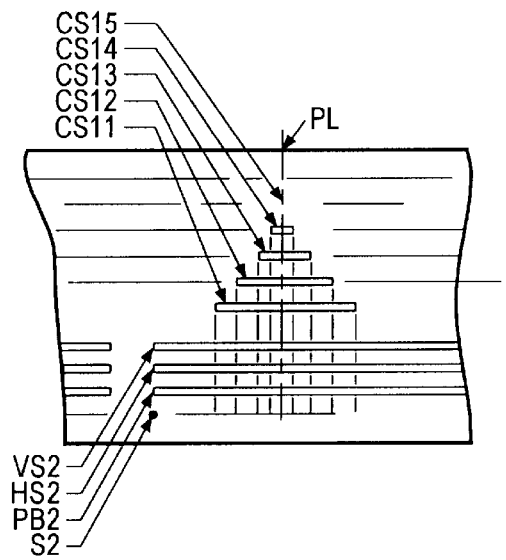
Figure 3:
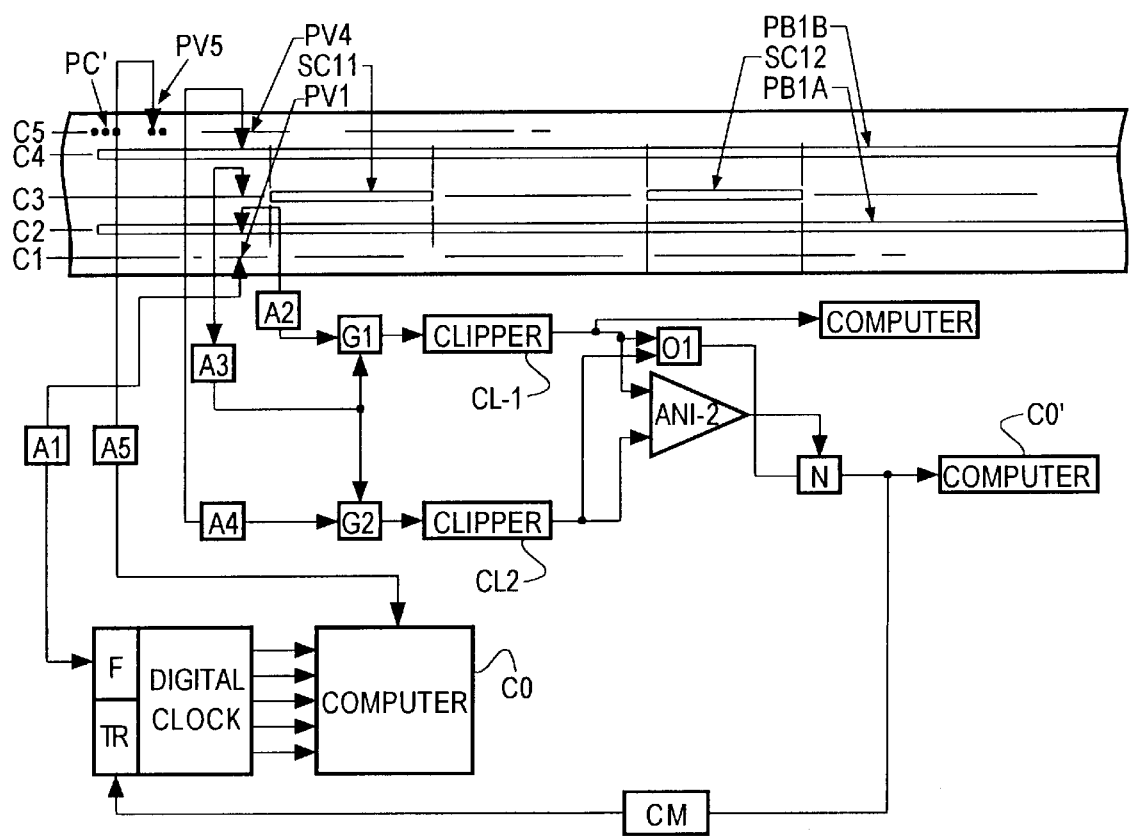
Figure 4:
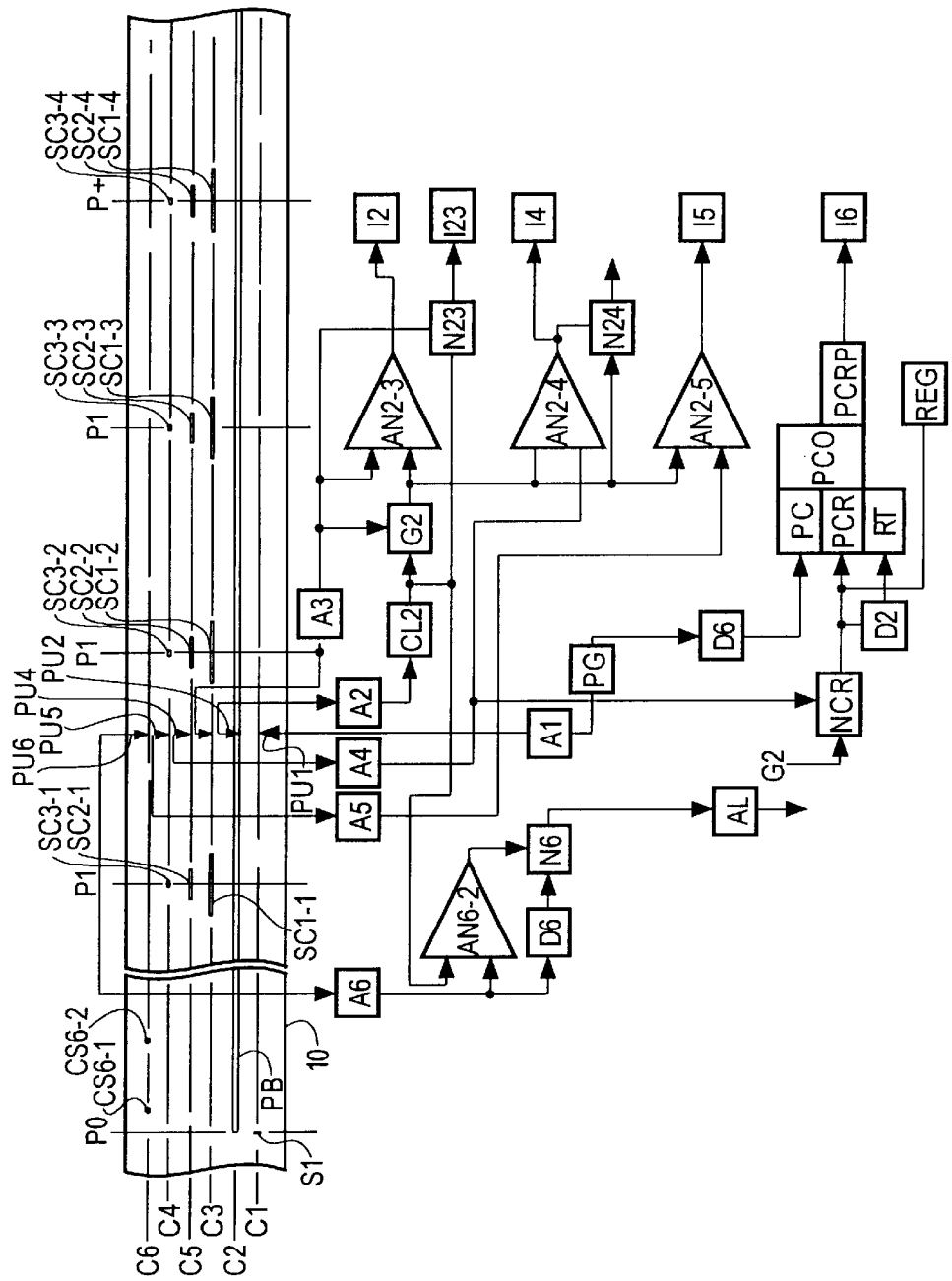
Figure 4:
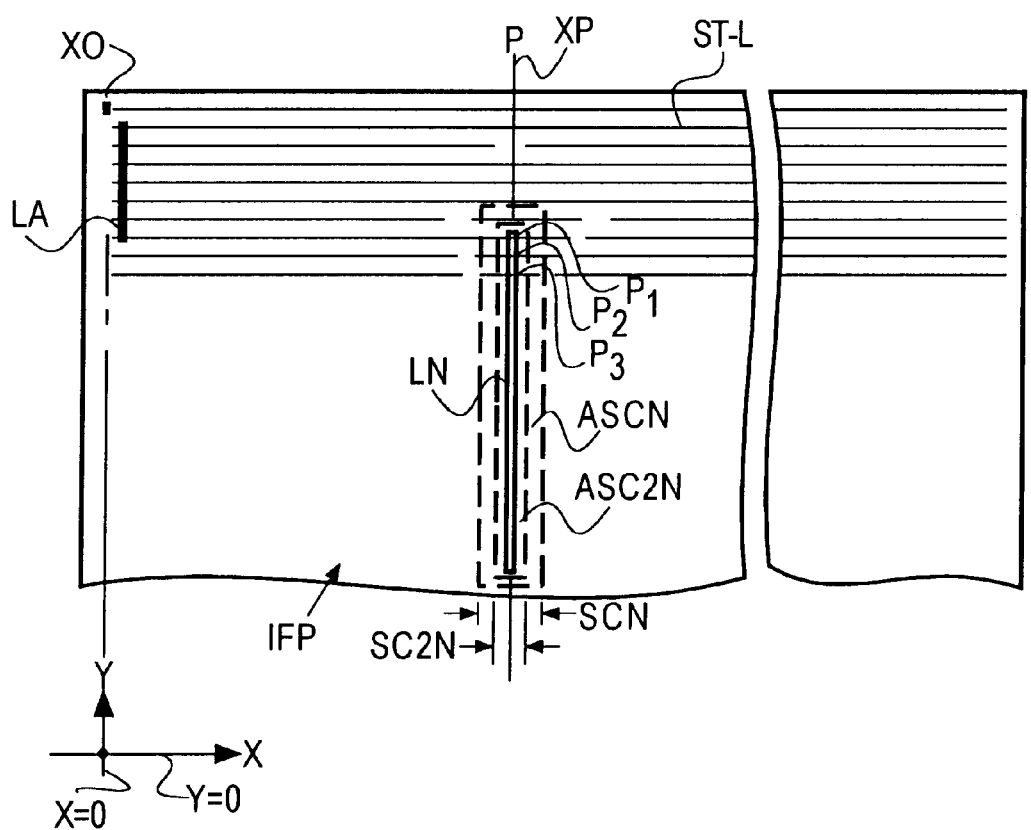
Figure 4A:
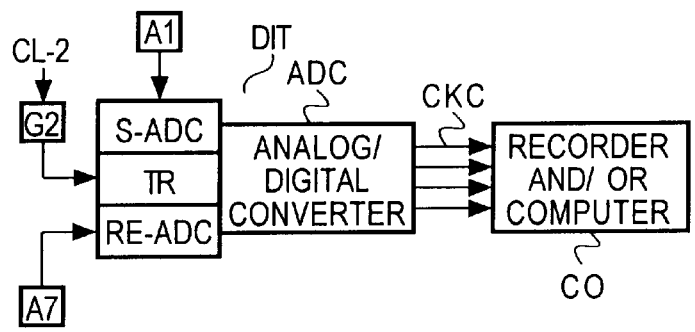
Figure 4B:
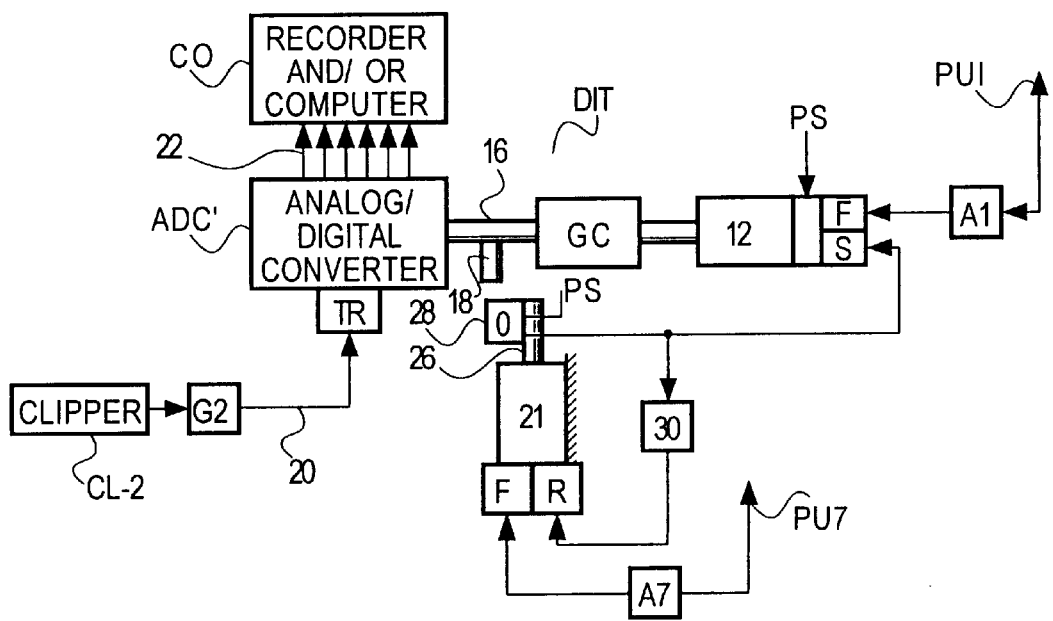
Figure 5:
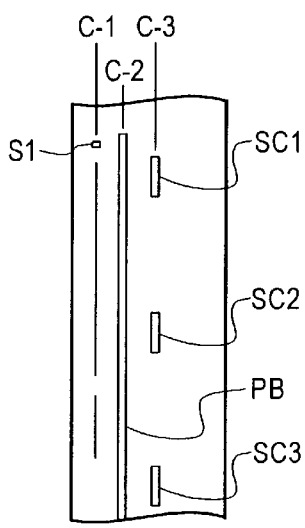
Figure 6:
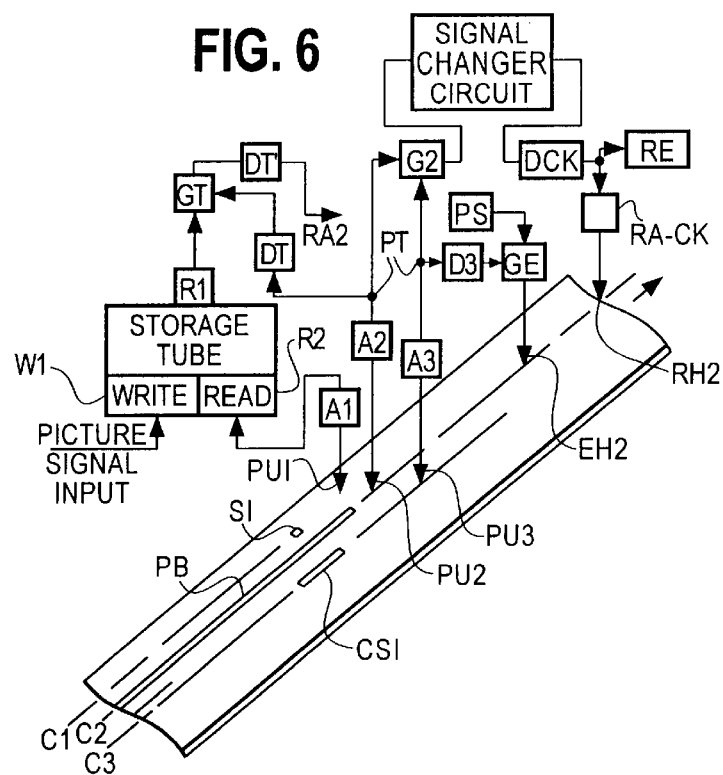
Figure 7:
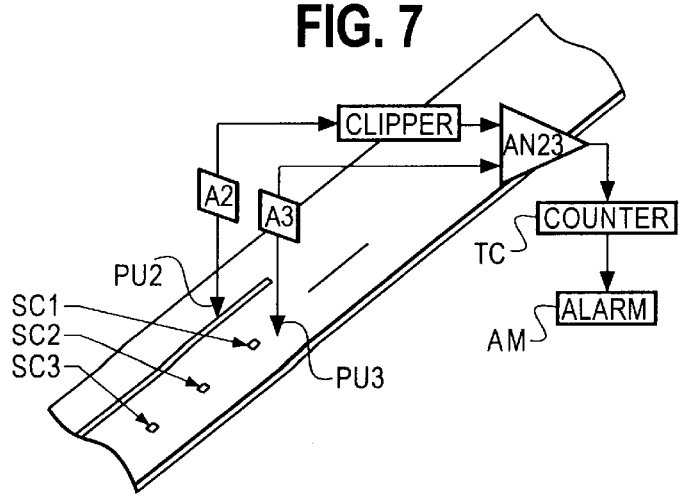
Figure 8:
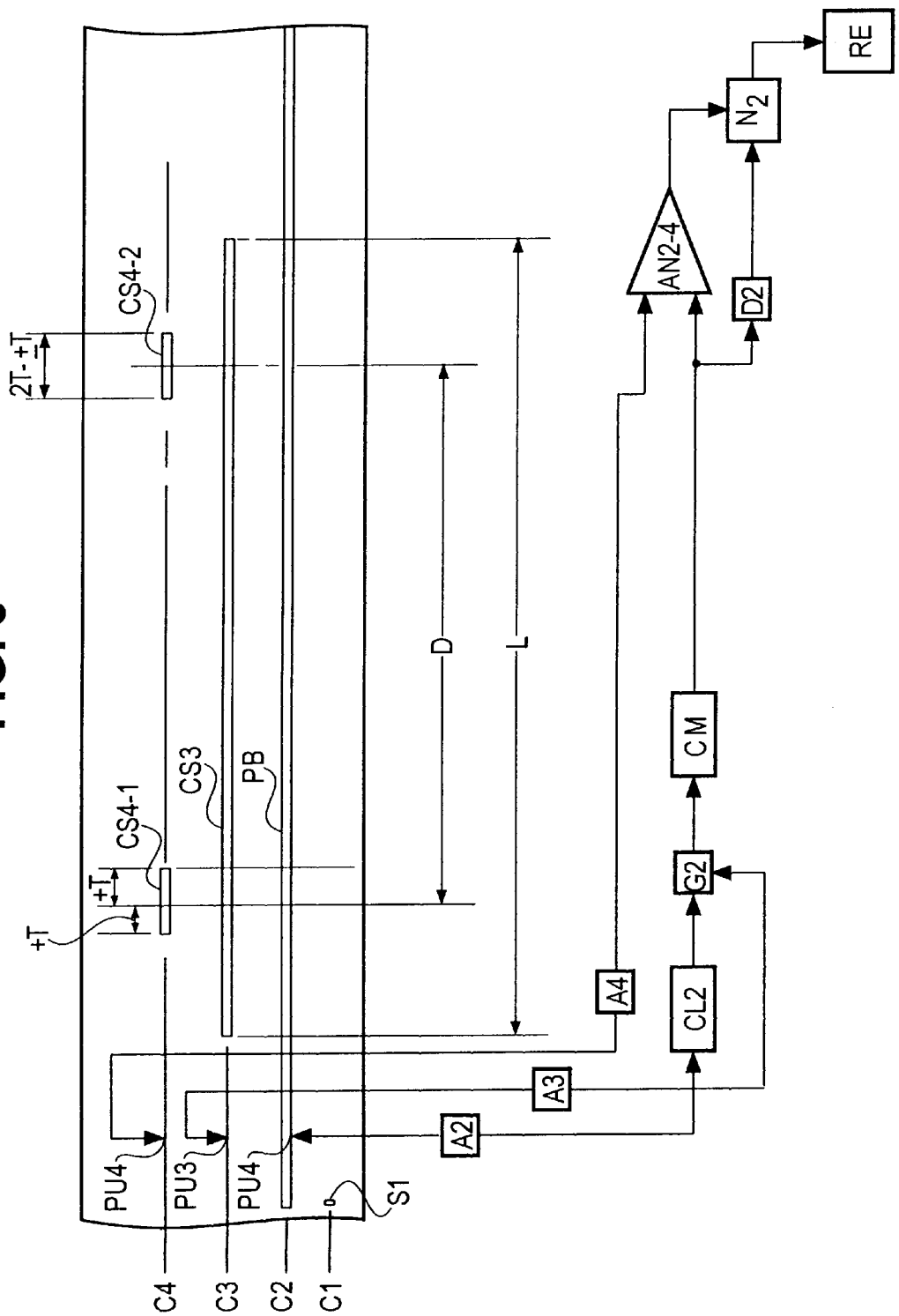
Figure 8:
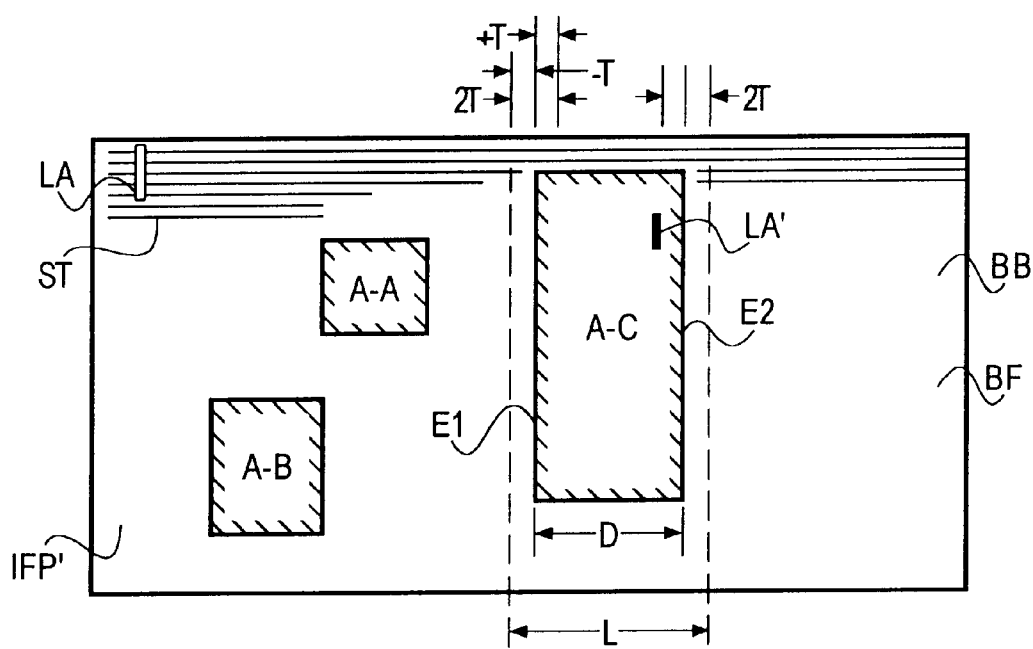
Figure 9:
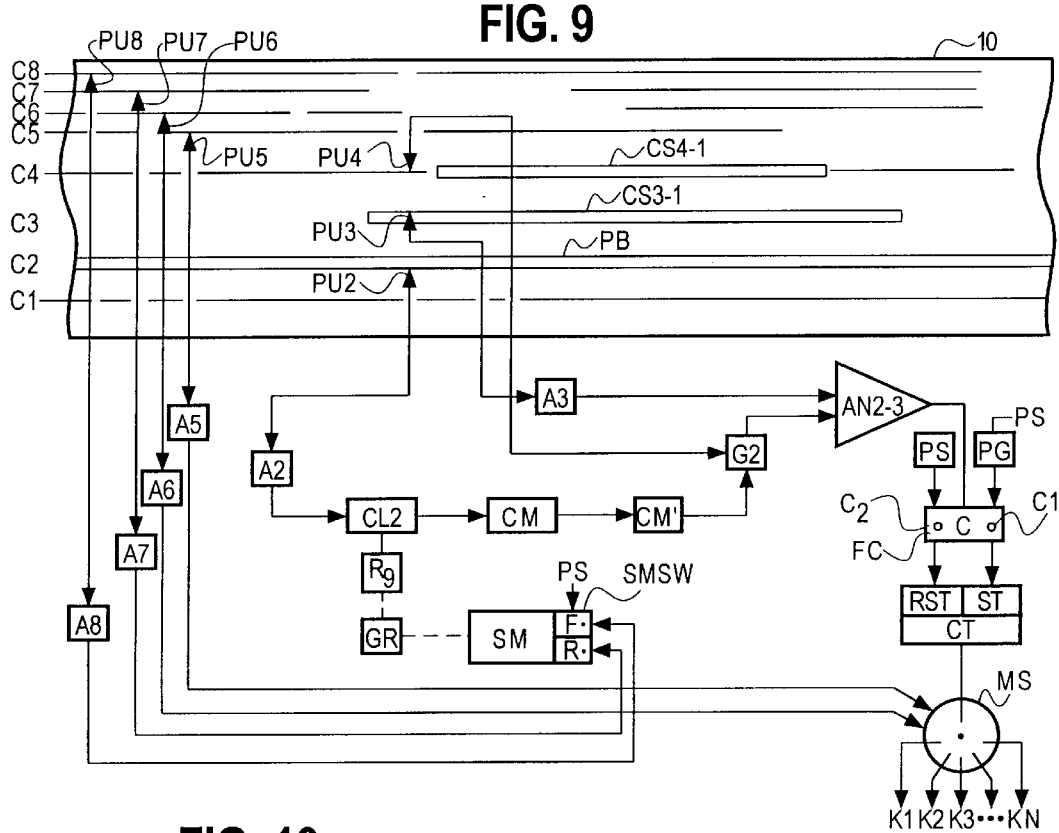
Figure 10:
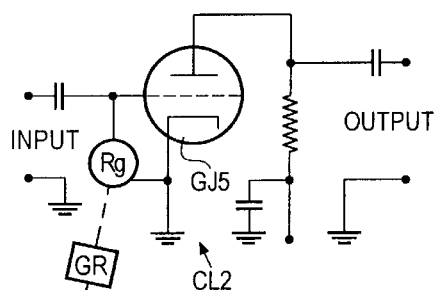
Figure 12:
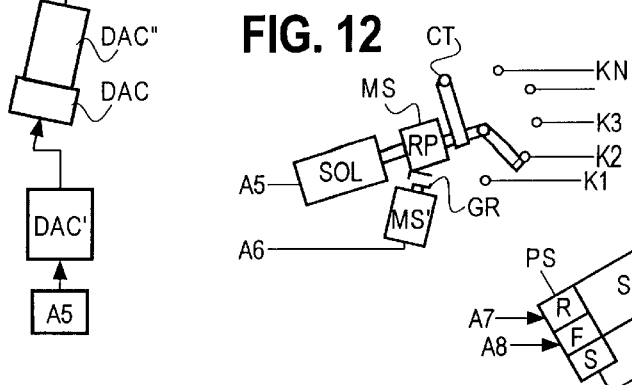
Figure 11:
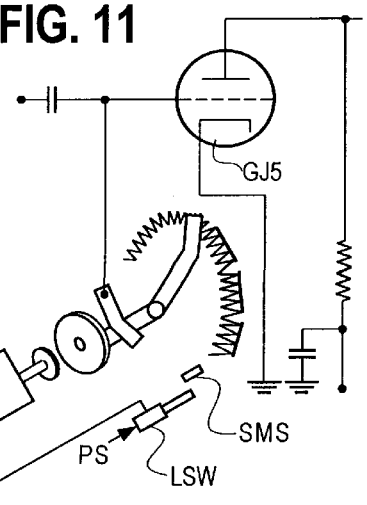
Figure 13:
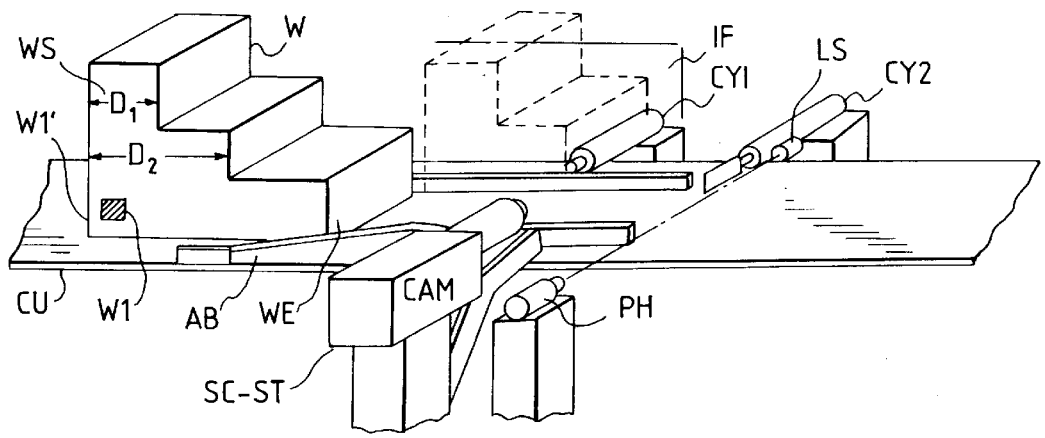
Figure 14:
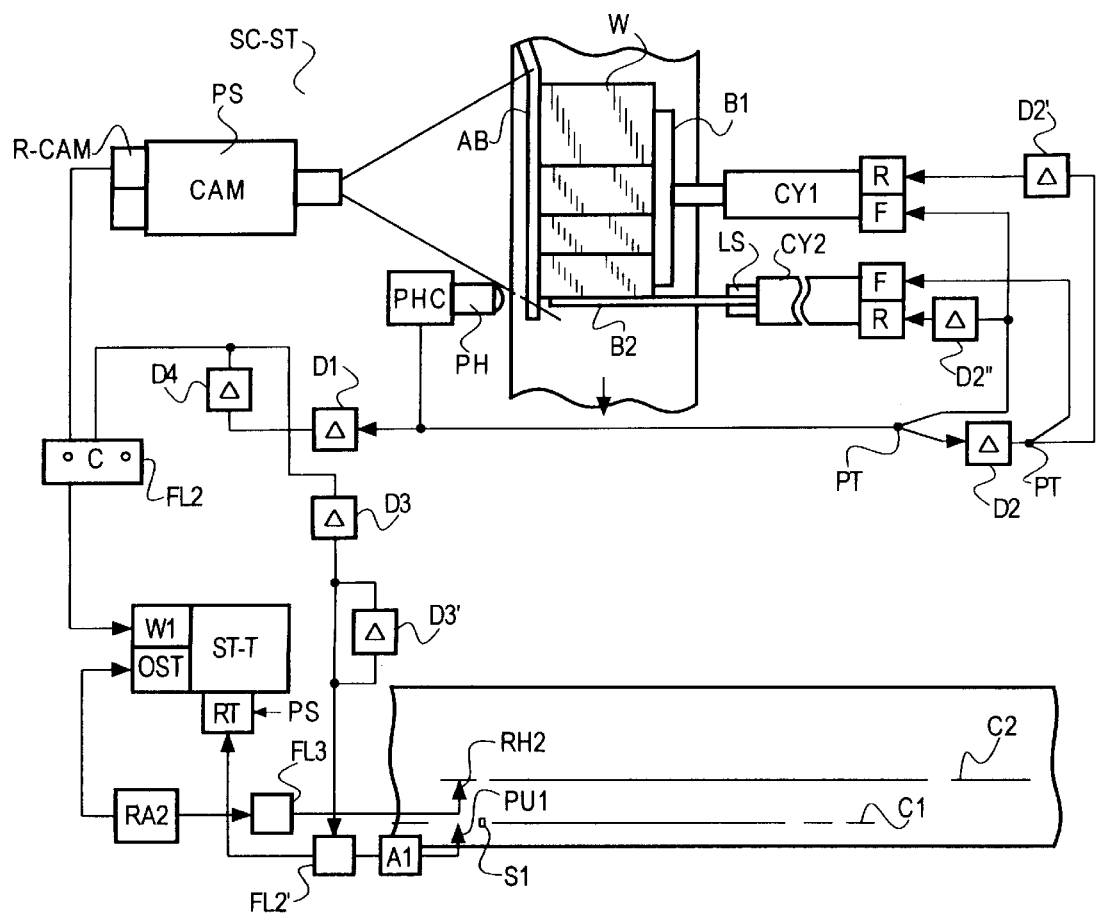
Figure 15:
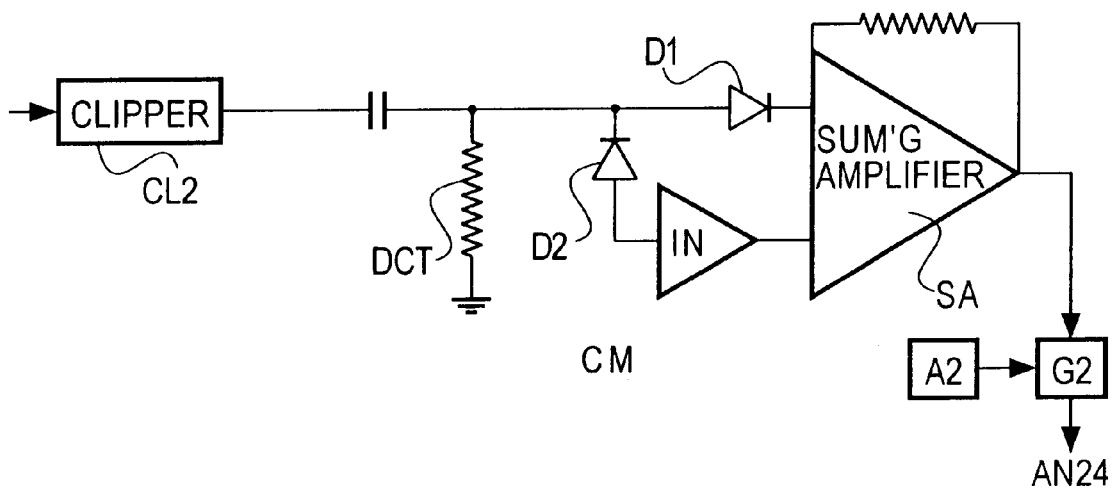
Figure 16:
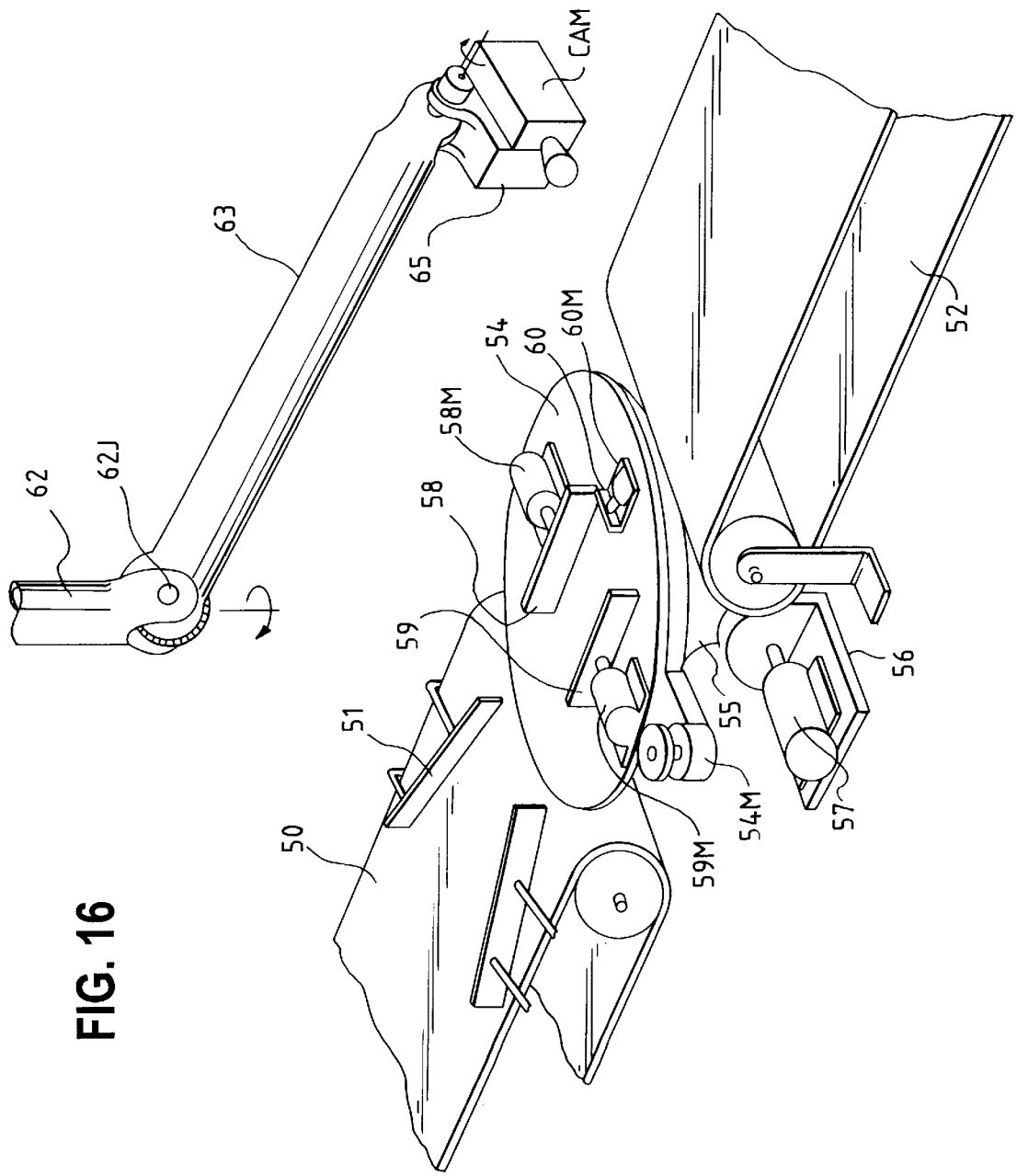
Figure 17:
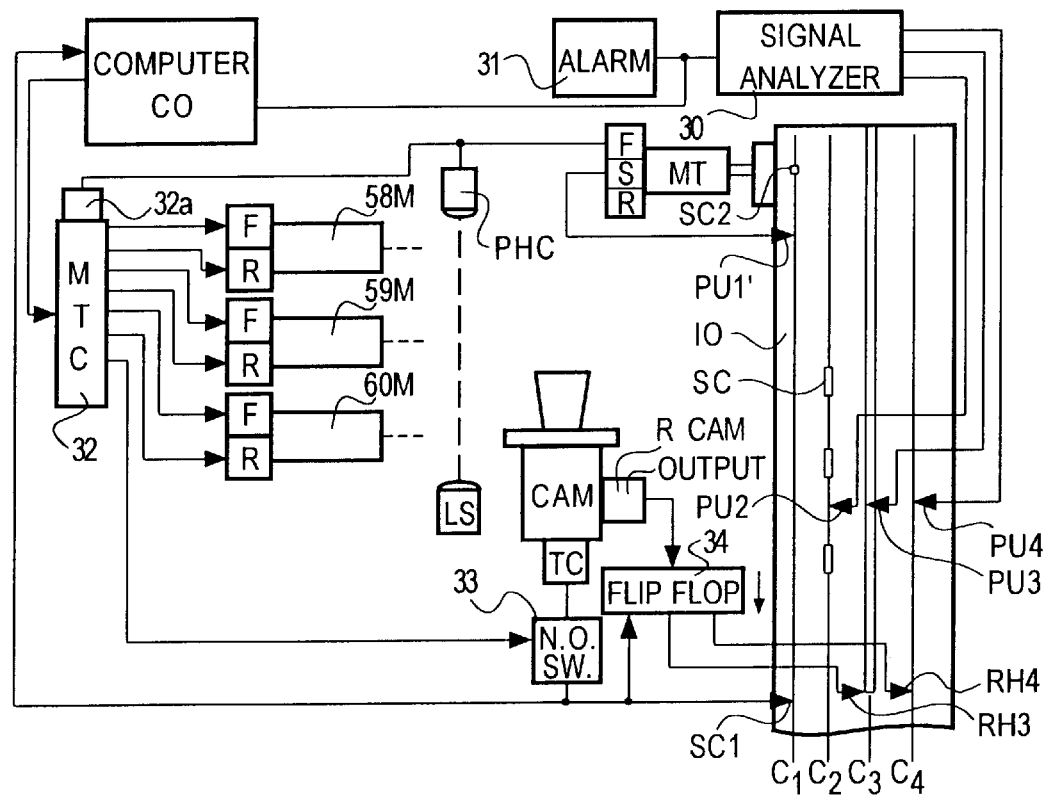
Figure 18:
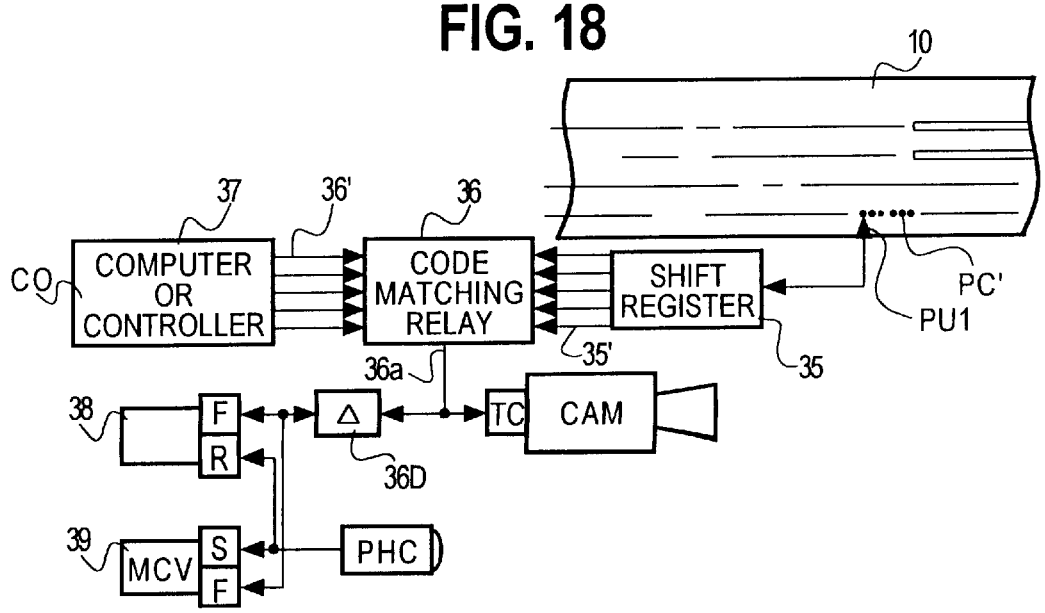
Figure 19:
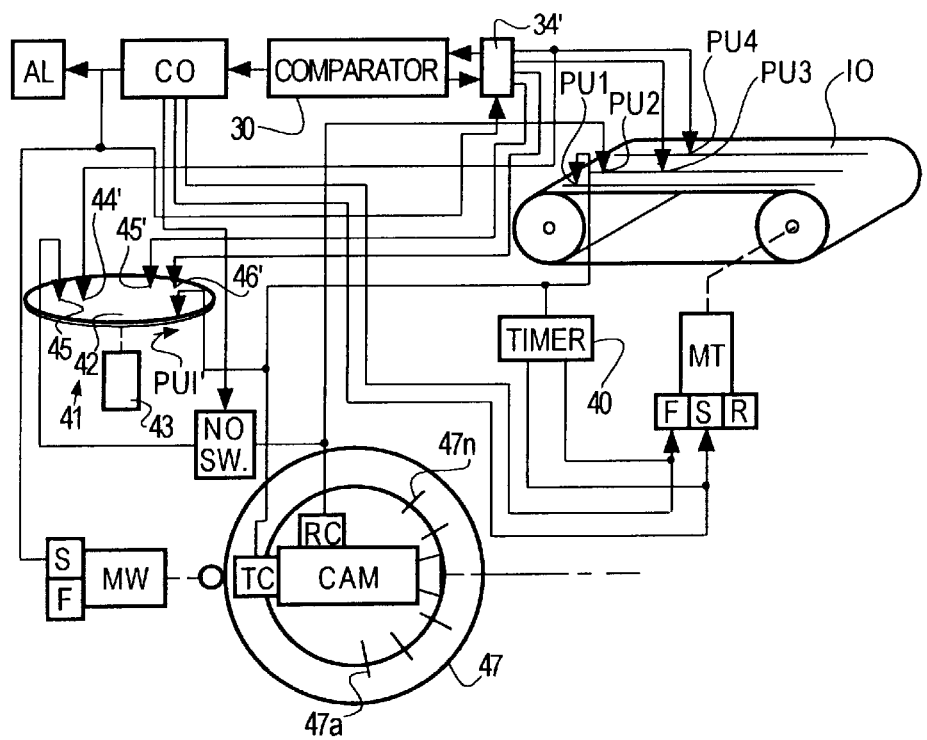
Figure 20:
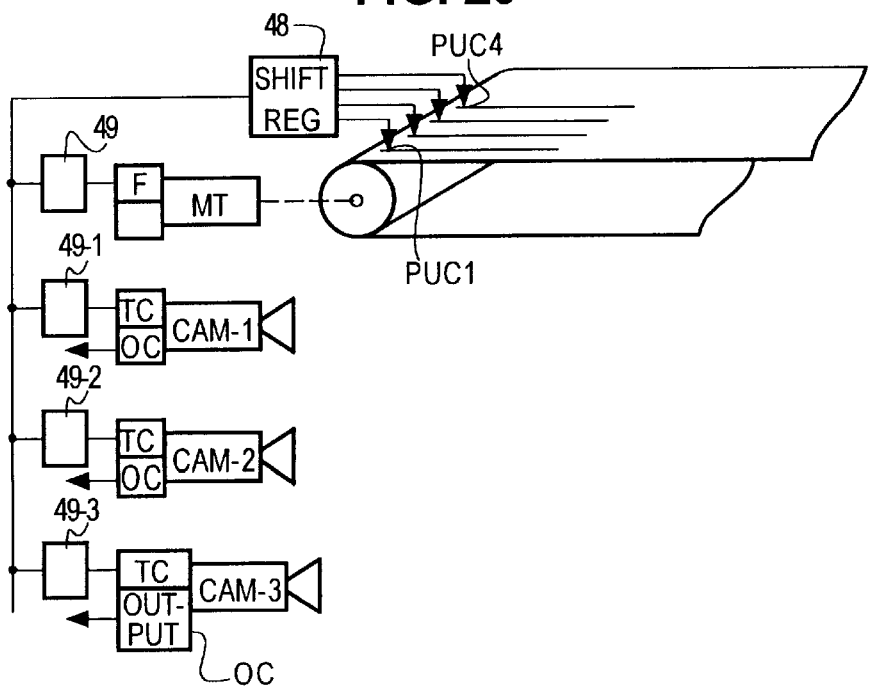

FIG. 1 illustrates a portion of a recording member and an arrangement of picture signals and control or gating signals provided thereon in predetermined relative positions;

FIG. 1A illustrates a portion of a multi-track recording member having plural picture signals recorded adjacent each other and associated control or gating signals tandemly aligned with said picture signals;

FIG. 1B illustrates a portion of a multi-track recording member containing both picture and code signals recorded on different tracks thereof and also illustrates in block diagram notation, gating and computing circuitry for utilizing reproductions of recordings;

FIG. 1B' is a circuit diagram showing details of part of the computing circuitry of FIG. 1B;

FIG. 1C illustrates a portion of a recording member containing picture signals and controls and circuitry provided in the output of the reproduction transducers which scan said recording member;

FIG. 2 illustrates a portion of a multi-track recording member having signals of predetermined duration or length recorded thereon in predetermined positions relative to recorded picture signals for indicating, when reproduced simultaneously with said picture signals, dimensional ranges of the physical phenomenon or objects scanned to generate said picture signals;

FIG. 3 illustrates a recording and reproduction arrangement whereby control means are provided for blanking all but predetermined or particular portions of one or more picture signals so that the remaining portion or portions of said picture signals may be analyzed without interference from the other portions;

FIG. 4 illustrates a recording and reproduction arrangement for operating on a picture or analog signal in a manner similar to that illustrated in FIG. 3 to effect one or more dimensional measurements or control functions;

FIG. 4' is a fragmentary view of a scanning field illustrating the physical significance of certain of the signals recorded on the recording member of FIG. 4;

FIG. 4A illustrates a circuit applicable as a replacement for a portion of the circuit of FIG. 4;

FIG. 4B illustrates a digital code generator or clock applicable to the circuitry of FIG. 4 to effect measurement functions;

FIG. 5 illustrates a recording arrangement with predetermined positioned sync and gating signals;

FIG. 6 illustrates the recording arrangement of FIG. 5 and circuit components utilizing the signals provided thereon;

FIG. 7 illustrates a modified form of the recording arrangement and circuit components of FIGS. 5 and 6;

FIG. 8 illustrates a recording arrangement and a reproduction circuit diagram utilizable for effecting automatic dimensional measurement;

FIG. 8' illustrates a scanning field showing physical aspects of the signals recorded in FIG. 8;

FIG. 9 illustrates a recording arrangement and reproduction circuitry therefore applicable for measuring the various dimensions of distances in an image field and providing said measurements as coded signals;

FIG. 10 illustrates a clipping level adjustment means applicable to part of the apparatus of FIG. 9;

FIG. 11 is a more detailed view of a portion of FIG. 10;

FIG. 12 is a more detailed view of a portion of FIG. 9;

FIG. 13 is a perspective view of a scanning station utilized to provide signals which are applicable to the recording and measurement arrangements illustrated in the other drawings;

FIG. 14 is a plan view of FIG. 13, which view also illustrates recording and dimensional measuring components;

FIG. 15 is a schematic diagram showing a circuit employing a summing amplifier to generate pulse signals;

FIG. 16 is an isometric view of an inspection station employing means for prepositioning both a scanning apparatus FIG. 17 is a diagram of control apparatus for the apparatus of FIG. 16 and also illustrates means for recording and analyzing the results obtained by scanning;

FIG. 18 shows another control arrangement applicable to the apparatus of FIG. 16;

FIG. 19 shows an automatic scanning system having a scanner which is positionally controllable to continuously scan different image fields and includes means for indicating when changes occur in said image field; and FIG. 20 shows a scanning arrangement employing a plurality of different scanners each adapted to scan a different image field or phenomenon.

DESCRIPTION OF SPECIFIC EMBODIMENTS

The video information signals recorded on the magnetic recording mediums illustrated in FIGS. 1 through 9 may be derived by using a television scanning system and the components as shown, for example, in FIG. 14.

A number of recording, reproduction, scanning and comparison measurement, counting, control and computing functions are described herein. Additionally, an apparatus utilizes a video picture signal derived by electron beam or flying spot scanning of an object or image field or a video storage tube surface.

For most of the above functions, the picture signal or signals are recorded in a fixed or predetermined position on a magnetic recording member such as a magnetic tape or drum and relative to one or more control and/or gating signals which will be denoted by the notations SC or CS. These control signals are specified as constant amplitude pulse signals of a short or predetermined duration. However, they may also be of variable amplitude and/or frequency depending upon the type of operation or function controlled thereby.

One technique comprises the scanning of an image or optical field such as a predetermined area of a surface of a workpiece or assembly, or an image field in which a portion thereof contains an object or plurality of objects or areas having an optical characteristic which is discernible from the characteristic of the surrounding field or background. For example, the image may have different color or light characteristics which investigation involves the analyzing of a length or lengths of the video picture signal produced when the image or optical field is scanned by a video camera or flying spot scanner.

If automatic scanning or comparison measurement using a change in a portion of a video signal is to be employed for measurement or analysis of the optical characteristics of the field from which the signal was derived, then there is a requisite for such measurement. If it is to be meaningful, the area, object or other phenomenon in the field being scanned must be at a known distance from the scanning camera, optical system or the flying spot scanner so that its scanned area will be to a predetermined scale in the image field.

The attitude of the object or plane being scanned must also be fixed or predetermined relative to the axis of the video scanning device. A plane, point or area of the object should also be known or referenced in position in the field being scanned. The requirement for any automatic measurement is that a base or benchmark be established. The measurement or comparison is effected in this invention by a scanning means which is utilized to indicate the existence of an area, line or plane in the field being scanned. Therefore, the above mentioned scale, alignment and positional requisites must exist to a predetermined degree or tolerance in order to attain a predetermined degree of precision in the measurement. It is thus assumed that where dimensional measurement, comparative image analysis or other investigations involving the scanning and analysis of a specific area or areas of the total field are desired, the object, surface, or area being scanned is prepositioned, aligned and provided at a predetermined scale in the scanning field. For the automatic and rapid investigation of multiple articles or assemblies by this method, a jig, fixture, platform or other form of prepositioning stops may be provided to preposition the articles at a fixed distance and attitude relative to the video scanning device. Preferably at least one surface area or point of said article is at a predetermined point, plane or position in space.

The following physical conditions may be measured, indicated or compared by means of the automatic measurement apparatus provided herein:

(1) Indication of the position of a line, point, border of a specified area, or a specified area in a given image field. This may be provided as a coded signal or series of coded signals which are indicative of said position or positions from a base point or line in the field or at a specified distance from the field.

(2) Determination if the point, line or area is positioned in a predetermined area or position in said field, and if not within limits, how far the image falls or is positioned away from the predetermined position.

(3) Determination if the point, line or area in the field being scanned falls within a specified distance or region such as a tolerance range, one or either side of a specified position.

(4) Determination in which of several specified regions in an image field being scanned, each of which encompasses a different area either or both sides of a specified position or area in said field, a point, line or area falls. This function pertains to automatic sorting operations.

(5) Determination if a predetermined image exists or does not exist in a specified area of an image field. If so, determination also as to how much or to what extent the area falls in the specified area. This function pertains to inspection functions to determine if image conditions exist such as surface defects, markings, assemblies, or internal defects whereby X-rays are used to provide the image.

(6) The measurement of the dimension or dimensions of an image in a field by scanning part of said image at a constant scanning rate and timing the scanning from one point in its travel across an image to another.

An erasable recording member, generally designated 10, may be a magnetic tape or the developed surface of a magnetic recording drum, showing signal arrangements thereon which are basic to this invention. The lateral and longitudinal dimensions of the signal recording channels or areas illustrated are not necessarily to scale or of equal scale and merely illustrate the relative positions of the various signals on the recording member so that their coacting functions may be described.

In all the figures illustrating relative signal areas, one of several recording and reproduction systems may be provided whereby, while the total recording pattern may vary, the positions of the various coacting recordings relative to each other will essentially remain the same to permit the same functions to be accomplished in one recording system as in the other. For example, if the magnetic recording tape or drum is moved relative to one or more recording heads which remain stationary, then a series of parallel areas or tracks will be traced by the heads as illustrated in FIG. 1. However, if the recording heads are driven in a rotary path, and sweep across the recording medium as the latter moves in a fixed path relative to the rotational axis of said heads, then a series of recording areas oblique to the longitudinal axis of the tape will be traced thereon by the heads. The end of each oblique recording channel area or head sweep will be continued further along the tape as the beginning of a new oblique trace. Thus, any video and control signal recording arrangements illustrated in one figure as provided on recording areas or channels which extend parallel to the longitudinal axis of the recording medium or tape, may also be provided on the oblique, repeating recording areas of others of said drawings such as FIG. 5 if the same relative positioning of said adjacent signals is maintained in the oblique recording.

More specifically, referring to FIG. 1, a sync signal S1 and a picture signal PB1 are recorded on multiple side by side recording areas of the recording member 10. Each of the signals S1 and PB1 is recorded on a separate channel thereof in a predetermined position with respect to the other channels. The sync signal S1 is recorded on a first channel or track C1 which indicates and may have been used to effect the precise positioning of the picture signal PB1. The picture signal PB1 is derived from beam scanning of the image field such as a video signal. The field may or may not contain the frame blanking signal component. The picture signal PB1 is shown recorded on a second channel C2. The picture signal PB1 may be a recording of the signal output of a video scanning device such as a video camera employing a vidicon, iconoscope or other scanning tube or a flying spot scanner.

If it is desired to provide a visual display of the PB1 signal at some time after its reproduction from 10, the duration and character of the PB1 signal is preferably such that it may be used when reproduced therefrom to modulate the write beam of a video picture or storage tube. In my application Ser. No. 668,348 which was filed in 1957 and was co-pending with a parent application. The output signal of a video camera or storage tube equivalent to the signal derived from the video camera scanning read-beam is recorded during a single frame or screen sweep either in an image storage tube or on a moving recording member. Thereafter, the signal is reproduced at video frequency and used to modulate the picture generating write-beam of a video monitor-screen.

The PB1 signal of FIG. 1, if intended to later reproduce a visual image on a monitor screen, is thus preferably an image, single frame video picture signal. The beginning of the picture signal is positioned adjacent to or in predetermined relation to sync signal S1 such that sync signal S1 may be used to control the reproduction of the picture signal PB1. For faster scanning, the start of the picture signal may be defined as a predetermined point occurring at or after the frame vertical sync signal appears when the so-called read beam starts its frame sweep.

In the inter-laced scanning system, each complete sweep of the camera scanning beam is referred to as a "field" sweep and two of such image fields make up an image "Frame". As stated, the PB1 signal preferably has provided therewith the associated frame blanking signal so that it may be used to effect the production of a video image, if necessary, for display purposes. For specific computing or operational functions, it may be desirable to merely compare part of the PB1 signal with another signal whereby only part of a single frame signal need necessarily be recorded and the blanking component of said signal may be eliminated. The sync signal S1 may be used as a trigger signal recorded on a predetermined position of member 10 and used thereafter to trigger or otherwise effect the recording of the PB1 signal on a predetermined recording area or channel of member 10. If the PB1 signal is recorded at random on member 10, sync signal S1 may be used as an indicator of the position of the PB1 signal and of another signal or signals also recorded thereon.

A third channel or band recording area C3 parallel to bands C1 and C2, contains the necessary video horizontal line sync signals HS. The sync signals HS are recorded in a predetermined position relative to PB1 for the correct horizontal deflection and synchronization of the picture and blanking signal PB1 to effect the production of a video image.

A fourth channel C4 runs parallel to the other channels and contains the associated vertical synchronization signal VS1 for vertical line and frame synchronization of the picture signal PB1. The latter two signals HS and VS1 are optionally provided in the event that it is desired to reproduce the PB1 signal as a picture on a video screen for monitoring or other purposes.

One or more additional recording channels or areas C5, C6, C7, C8, C9 and C10 preferably extend in a direction parallel to and are adjacent to those channels described hereinabove. The channels C1, C2, etc. contain one or more operational gating or command signals CS1, CS2, etc. which may be either pulse or analog signals. The command signals CS1, CS2, etc. are preferably provided in predetermined fixed positions relative to the picture signal PB1 located on channel C2 to be reproduced therewith and are used to modify, gate or operatively coact with the video signal PB1. While the various control signal or signals CS1, CS2, etc. may be recorded at any time on the recording medium 10, if their precise position relative to the video signals is an important factor, their recordation may be triggered by the synchronizing signal S1 which indicates the position of the video signals. If precisely relative to sync signal S1, the CS signals will also be precisely positioned relative to the video signal or signals and may be used to effect one or more operative or measurement functions on or in coaction with the PB1 signal.

The command signal or signals CS1, CS2, etc. may be provided in one or more forms. A single pulse, such as CS1, may be recorded on a single channel of member 10 and positioned adjacent a specific length of the video signal or signals. When reproduced therefrom as said member 10 moves relative to respective reproduction heads, the pulse signal CS1 may be used, for example, to gate an adjacent similar length of the video signal over an output circuit for scanning, modifying, measuring, clipping or otherwise operating on or cooperating with said video signal. Thus, the position as well as the length of the pulse signal CS1 will determine what section and length of the video signal will be gated or otherwise operated on. The other operations controlled by CS1 may include magnetic erasure, attenuation, amplification or other modifications to said video signal adjacent or behind said pulse signal on channel C5.

While the CS1 signal may be a constant amplitude signal or pulse of any desired length, it may also be an analog signal of varying amplitude and/or frequency which is utilized to perform a more complex function on a particular section or sections of the video signal.

A series of other command or control signals CS2, CS4, CS5 and CSC are laterally aligned bit pulses. Each pulse is on a different channel and capable of being simultaneously reproduced therefrom by respective magnetic heads which are preferably aligned and scan a separate track or area referred to by the notations C6 to C10. The series of pulses may be in the arrangement of a digital code PC, such as a binary code, and may be used to effect circuit selection, computing and/or switching functions. Circuit selection functions may be operative to (a) affect a specific section or length of the video signal, (b) select a specific section or sections of said video signal for reproduction, (c) adjust or otherwise affect one or more electrical components or circuits in the output of the reproduction head or heads of the video signal or (d) select one of a multiple number of circuits through which part or parts of said video signal may be gated for measurement, inspection or scanning functions to be performed thereon.

While the CS2, CS3, CS4, etc. signals illustrated in FIG. 1 are shown aligned laterally across the medium or tape for simultaneous reproduction by aligned magnetic heads, they may be provided in any positional arrangement which will be determined by the positioning of the magnetic reproduction heads and the required function of said signals. The signals CS2, etc. may be formed as a pulse chain by providing the necessary delay lines or elements in the output circuits of the respective reproduction heads. Furthermore, a pulse chain for computing and (or) control or switching purposes may be provided on a single track adjacent the video signal in the form of the appropriate tandem pulse signals or multiple pulse chains may be provided thereon. Preferably, the pulse chains are sufficiently in advance of the video signal or a section of the video signal which it is to affect or gate, to permit a switching, computing or shaft positioning action to take place prior to the reproduction of the desired section of said video signal. The position of said recorded signal or signals on member 10, will also be a function of the relative positions of the various reproduction heads.

A code or bit number PC' is shown as a series of tandem pulses on the channel C10 and having the binary value 1110101. The code PC' is provided as a series recording to illustrate that such means of recording numerical information may be used with and adjacent analog or picture signal to be reproduced prior to, during or after the reproduction of said picture signal for effecting computing and /or control operations to be performed on or in coaction with the reproduction of said picture or analog signal, or in relation to at least part of said signal. If the series code PC' is utilized for computing and control purposes adjacent a picture signal PB, then still another channel (not shown) is preferably provided with a series of equi-spaced, equi-duration pulses recorded thereon at preferably the interval of the pulses of PC' to act as a clock when reproduced simultaneously therefrom thus simplifying digital operations in a switching circuit or computer using said pulse code.

The recording of the picture signal PB and the associate sync signals on the magnetic member 10 has many advantages such as the provision of a permanent record which may be referred to at any time or reproduced by selective means whenever needed and visually monitored by modulation of the picture generating beam of a monitor screen device. However, said PB signal need not be recorded provided that said signal may be otherwise generated in a measuring or computing circuit at a predetermined instant relative to the generation of said other illustrated signals. It is further noted that multiple, tandemly recorded picture signals may be provided on one or more of the channels of the recording member 10 of FIG. 1 with the associated gating and/or code signals for record keeping and computing purposes.

FIG. 2 shows a second picture signal PB2 which may be selectively reproduced by use of a predetermining counter receiving the position indicating signals on channel C1. Upon reaching a preset count, signal PB2 closes a switch between the reproduction transducer reproducing from the channels C2 to C4 when that section of the tape 10 containing the selected picture signal PB is adjacent the reproduction transducer.

The parallel code PC may be placed prior to, or after the reproduction of the associated picture or analog signal PB. If recorded prior to signal PB, said code PC may effect a specific switching or adjusting action. During the reproduction of a particular segment of the PB signal, said PC signal may gate or effect an action on a specific length of said PB recording If placed on member 10 in a position to be reproduced after the reproduction of the PB signal, the PC signal may be used for effecting a computation obtainable in digital form from other operation on the associated picture signal or a part or parts of said signal.

It is noted that the recording arrangement of FIG. 1 is subject to modification depending on the switching and logical circuitry operatively connected to the output of the transducing apparatus for measuring and performing operations on the associated picture signal, viz:

I. The laterally aligned pulse code PC which, in FIG. 1, is provided for reproduction prior to the reproduction of a section or length of the associated picture signal, to perform a switching, gating,computing or other functions may be recorded adjacent a particular point in the picture signal PB for effecting a specific switching function or other action on or simultaneously occurring with a predetermined length of said picture signal. One such function described hereinbelow provides said code or signals in relay storage to be subtracted from or added to a numerical code derived from operating on a specific length of the picture signal.

II. The illustrated pulse code PC which is shown recorded for a short duration in FIG. 1, may be recorded on a longer section of member 10 and may vary in length from a short pulse such as the shortest signal which may be recorded thereon, to the entire length of the picture signal PB. When the code PC is reproduced, the output circuits of the associated reproduction heads will each either have a signal or no signal present during the period a particular code is reproduced whereby said multiple circuits define a code pattern or bit number at any instant. If it is desired to have this code present for a specific period of time which may represent such phenomenon as a tolerance range, it will be necessary to record the signals reproduced to provide the PC code recorded on member 10, for a time during which said predetermined condition or change in said picture signal will occur. If said code PC is thus recorded as one or more pulse recordings of prolonged and predetermined duration or length next to a predetermined section of the picture signal whereby said position is such that it will be known that said prolonged code PC will exist in output circuitry for a time duration during which a particular change in amplitude or frequency in the picture signal will occur, then said code will be known to exist when said change occurs and will be available for reproduction therewith for effecting switching or control functions, some of which will be described.

III. A series of parallel code recordings PC may exist in tandem array along member 10 in a manner whereby, when the end of one code stops, the next begins on the next length of said tape. Thus every point or length of member 10 will have an associated parallel code, such as a binary digital code, which will identify said point or length. If a signal or signals such as an analog signal, video picture signal, or other signal or signals are recorded adjacent said chain of said pulse codes recordings PC, the output circuits of the transducers reproducing said codes will be energized with a predetermined code array during the reproduction of a particular length of an adjacent signal which condition will be indicative of the position of the part of said adjacent signal being reproduced at the time the code is reproduced.

If the PC signals are of a binary or other numerically progressing order, whereby each code array occupies the same length of member 10 as the others and each successive code array is of a numerically progressing order (i.e. a binary digital signal order whereby one signal array is a unitary increase over the prior recorded code or the same increment as each successive number from the prior number), then the recording member 10 may be used essentially as a digitizer. If driven at constant speed, recording member 10 may be used as a digital timer or clock whereby a code, existing in the output circuits of the transducers reproducing said recorded code tracks, will be indicative of the time lapse from the start of travel of said member 10 provided that the code recorded at the start of the cycle is known. The member 10 may be a closed loop tape or dry running continuously and at constant speed. It may be used as a digital clock by providing a normally open electronic switch or gate in the output of each of the reproduction transducers reproducing from channels C6 to C10, the code recording channels, and pulsing all said gates simultaneously to effect their closure for a brief period of time at the start of the interval being measured and at the end of said interval. The pulse code passes through said gates when first closed may be held in relay storage and may be added to or subtracted from the pulse code passed therethrough at the end of said interval. The result of subtracting the smaller of said two code numbers from the larger number will be indicative of the time lapse between the two provided that the speed of the recording medium is known and the lengths of the code arrays are also predetermined and similar. If the drive shaft of the recording medium 10 is connected to an analog mechanism, then the recording medium and drive may be used as an analog to digital converter of much greater capacity and duration than the conventional coded disc converter.

FIG. 1A illustrates a recording arrangement of analog and digital or coded pulse signals, which are functionally related to each other. An elongated magnetic recording member 10 is provided having multiple recording channels C1 to CN (where N is any desired number). The channel C1 has a series of pulse signals PSG recorded as a group or as trains thereon comprising short pulse recordings positioned at equi-spaced intervals, which may be reproduced and transmitted to a binary counter or other device for identifying any specific section or length of member 10 as a result of the nature of said particular code. When the equi-spaced, short pulse recordings PSG are reproduced and passed to a pulse counter such as a decade counter, they will indicate any position on said member 10 by the existing value of said counter.

The even numbered channels C2, C4, C6, etc. contain signal recordings including one or more pulse codes PC such as digital codes, followed by one or more analog signals ASG1 which may be the aforementioned picture signals PB derived by scanning a fixed path in a field. The odd numbered channels C3, C5, C7, etc. may contain other information in pulse or code form such as a signal, S1, S13, for indicating the position of the start of the associated analog signal such as ASG1-3. The signal S1 may also be positioned at any predetermined location along the respective channel for switching the output of the reproduction transducer reproducing a particular part or all of the associated analog signal. The said output may be switched thereby for example from an input to a digital computer mechanism adapted to receive the associated PC codes to the input of an analog device for receiving the ASG signal reproduced thereafter. The switching signal on the odd channels may also be incorporated and positioned on the even channels between said digital code signals and analog signal such as the illustrated SWS- signals of FIG. 1A.

The analog recording or recordings ASG1-1, ASG1-2, ASG1-3, etc. may be recorded in one of several forms. Said signals may comprise picture signals of different but related phenomena such as derived from the scanning of one or more surfaces of a work member from different angles, two or more signals derived from scanning a standard field and field to be compared therewith, or the simultaneous output of one or more analog recording devices or instruments which are all functioning simultaneously to measure for example, simultaneously changing variables of a process or test. The digital signals preceding each analog signal or signals on each recording channel may be used to preset one or more measuring circuits in a manner to be described, to select a particular length of the analog signal for reproduction, or to gate said signal or predetermined sections of said signal as indicated by said code signal over one or more of a multiple of circuits.

An application of the recording arrangement of FIG. 1A is in the field of machine tool or process control. For example, the analog signal recordings ASG may have each been obtained from the output of a synchro or selsyn generator which is operatively coupled to the shaft of a motor driving a part of a machine.

The significance of providing a recording of the type illustrated in Figure 1A whereby one or more command analog signals on one or more channels of the recording member 10 are preceded by one or more pulse codes PC' is that the pulse codes may be used for effecting broad control of the tool driving motor whereas the analog signal there following may be used to effect a finer control or micropositioning. Also, while the pulse code on a specific channel of member 10 may be used to effect a stepped or intermittent control of the motor driving the tool, the analog signal may be used to effect continuous control of the speed and position of said motor. Numerous machine tool and materials handling applications exist where the combined digital-analog recording means of FIG. 1A is applicable to advantage.

The digital signals may also be used to preset measuring devices and perform other switching functions in coaction with the operation controlled by the analog signals, which functions are not conveniently derived from said analog signal per se. Further, the digital codes PC' may be used to control the direction and speed to the motor driving the recording member 10 in a predetermined manner. For example, it may be required in the cycle of operation of the device controlled by analog signal associated therewith to repeat the control effected by a limited duration analog signal. The digital or pulse code preceding the analog signal may be used to preset a recycling timer or may be held in relay storage and used to control the future motion of the tape or recording member 10 so that the analog signal associated therewith is repeated thereafter or parts of said signal are repeated in a predetermined manner.

Pulse recordings S2' to S8' are provided on the even numbered channels between the groups of serially recorded pulse bit codes PC' and the analog or picture signals ASG-. The recordings SN' are preferably several times the length of the pulses comprising the PC' recordings so that they may be used to actuate a relay which is responsive only to the longer signal. The relay is used to switch the output from the respective reproduction transducer from a digital control device to an analog device or circuit prior to the appearance of the reproduced ASG signal. It is noted that the odd numbered channels C3 to CN may contain a parallel pulse code for effecting an operation at a specific point or points in the reproduction of one or more of the analog signals.

Figure 1B shows multiple recordings on a magnetic recording tape or drum 10 driven at constant speed past multiple magnetic reproduction heads PU. The heads PU-1 to PU-8 (heads PU-4 to PU-8 are shown in FIG. 1B) reproduce the signals recorded on the respective channels C1 to C8. On channel C1 there is recorded a sync signal, such as S1 of FIG. 1, for indicating the position of the start of a picture signal such as a video picture signal PB recorded on channel C2. Signal PB may also be any analog signal on which a measurement or operation is to be made. On channel C3, one or more gating signals SCN are recorded for switching a selected length of lengths of the reproduced adjacent PB signal to one or more measurement or clipping circuits.

The channels C4 to C8 contain multiple pulse recordings arranged in a multiple code or binary scale order such that the heads PU4 to PU8 will, at any particular instant while reproducing from said channels, be energized in a specific code order. That is, at any instant the parallel outputs of said transducers will be energized in a signal array equivalent to a code.

The code scale recorded in FIG. 1B is a so-called progressive code with the number zero at the point X1 and the number 32 at X2. A so-called natural binary code recording may also be used as may any code means which will provide a different code or signal array during each unit length or increment U in the tape or drum 10. On channel C8, the pulse signals are equi-spaced and have a length of 2U or twice the unit length. If the reproduction heads PU1 to PU8 are aligned as shown laterally across the member 10, the code existing in their output circuits will depend on which unit lengths of the recording member said heads are reproducing from at the particular instant. If the member 10 is a closed loop tape or drum and is driven at constant speed relative to said heads PU, then the recordings on channels C4 to C8 may be used for timing or clocking purposes or may measure the distance between any two points or changes in the associated PB signal.

The time between any two instantaneous or short duration occurrences may be determined automatically as a numerical or binary code by the mechanism as shown in FIG. 1B. By applying the proper constant or conversion factor to the result, the distance between any two points in the associated picture signal PB and/or the distance between any two points in the image field scanned to produce said signal may be obtained. The combination of the recording member 10, a constant speed drive therefor, the reproduction apparatus and the illustrated circuitry may be used for performing any automatic timing function in which a rapid readout is desired in pulse code form of a time interval between two pulses passed thereto. The time interval maybe any two instances in a timing or measurement cycle of any event whereby means are provided at each instance to produce a pulse of short duration. The apparatus of FIG. 1B may also be used to provide a binary or other pulse code for effecting computational or control functions at various instances in a measurement cycle whereby each instance is characterized by an associated pulse signal. The running code may also be recorded on additional channels of member 10.

The output of each of the magnetic reproduction heads PU4 to PU8 is passed to a respective reproduction amplifier A4 to A8 and thence to the input of a respective normally open mono-stable gate or switch G4 to G8. The output of each gate is passed to a computer or computing mechanism CO, one form of which will be described and is illustrated in FIG. 1B'. Device CO may also be an automatic recorder. The outputs of the reproduction amplifiers A4 to A8 are only passed to computer CO when the switching inputs to said gates G4 to G8 are energized.

Simultaneous energization of all gates G4 to G8 is effected to provide a code output indicative that the heads are reproducing from a particular unit length U of member 10 by passing a pulse to the input of a multiple output pulse transformer PT. Each output of pulse transformer PT is connected to a switching input of one of the five normally open monostable gates or switches G4 to G8. The gates G4 to G8 are electron tube or semi-conductor devices capable of switching in the megacycle range. Thus any condition occurring in the signal PB during the interval defined by reproduction of the SC signal or signals may be indicated as a code. If the code occurring on channels C4 to C8 is of a numerically progressing order, then the distance or time between the appearance at the input of pulse transformer PT of two pulses may be indicated by subtracting one code so generate from the other.

If the recording member 10 of FIG. 1B having the code scale recordings illustrated on channels C4 to CN is a closed loop magnetic tape, it may be used as a component of an analog to digital converter of greater versatility than the conventional coded disc type of converter. Assume that the member 10 is driven by the conventional capstan-depressor drive and there is no slippage in the driving means. Then the shaft of the capstan or a shaft coupled thereto may be digitized. That is, any degree of rotation of said shaft may be indicated as a numerical code or number by providing a pulse at the input to pulse transformer PT at any instant in the rotation of said shaft. Since the code reproduced from member 10 will be a function of the rotation of the capstan shaft, a coded number may thus be obtained for any degree of rotation of said shaft.

An elongated flexible magnetic tape with the code recordings as illustrated in FIG. 1B offers a coding surface of considerably greater length than the conventional coded disc. As such, the code may extend as a greater numerical value than on the conventional disc converter surface thus eliminating counting circuitry and providing a considerably higher numerical value in code form than on the surface of the disc.

If the recordings on channels C1 to C3 comprise multiple picture signals or information in the form of bit recordings such as binary code, the recording of a progressing numerical code as in FIG. 1B on said adjacent channels C4 to CN may be used for a number of purposes. Said code may be used for the selective reproduction of any specific adjacent recording such as a bit number or a specific length of PB signal, or the reproduction of one of a multiple of said picture signals for transmission to further control or computing apparatus. Said code may also be used to identify a particular section of said tape for recording a selected signal or bit information. These functions may be effected accurately without the use of a counter counting drive shaft rotations or short pulse recordings and has an advantage over the latter techniques in that each point in the length of member 10 is identified by an associated code, whereas counting means are subject to errors if a pulse should be accidentally erased.

If the device of FIG. 1B is used as an automatic interval timer, recording member 10 is driven at constant speed. Then the computing circuit CO includes means for computing the time lapse between two occurrences by subtracting the code occurring at the reproduction heads at the start of the interval to be timed from the code appearing there at the end of said interval. The difference will be proportional to the actual time it takes for said codes to pass said reproduction heads. A means for obtaining said difference automatically is illustrated in FIG. 1B', which shows part of the circuit. If the code on channels C4 to CN is a binary code, subtraction may be effected by a method known as complement addition. That is, the complement of a number is formed in a complementing circuit (CC) and added to the second number. The result is the difference between the two numbers.

In FIG. 1B', the circuitry for effecting this operation is illustrated in part. The circuit comprises one single input, dual-output bistable switch or flip-flop FFN in the output of each gate GN. The switches FF8 and FF7 are part of the chain of said switches and are each shown with a complement input. When pulsed, the complement input switches the output of said switch from the existing condition to the other of its switching conditions. Said switches FFN preferably also have a reset input which, when pulsed, switches the input to the other of said two states in which it has been placed or if in said reset state, maintains said reset condition.

Assume that the reset condition of each flip-flop is the illustrated "O" or left hand output and that all flip-'lops are in this condition prior to the appearance of the first point in the timed interval. Then any pulses of the coded number passed through the gates G4 to GN will pass through said "O" outputs of said flip-flops. The "O" output of each flip-flop is thus connected to a respective input of a first shift register SR1 which converts the parallel bit code passed through the gates G4 to GN to a series code which is passed to the complementing circuit CC. From the complementing circuit CC, the complement of the number is passed to one input of a binary adder BA.

The second coded number is obtained at the end of said measuring cycle when a pulse appears at the input to the pulse transformer PT. This second coded number is passed through the flip-flops FF4 to FF8 to a second shift register SR2 from which it is passed as a series code to the other input of the binary adder BA. The result, which is transmitted from the adder as a code, is the difference between the two numbers and is proportional to the time between the receipt of the two pulses at the input of pulse transformer PT.

Switching of all flip-flops to their output conditions "1" is effected by passing a reproduction of the first pulse passed to pulse transformer PT through a delay line or time delay relay D and then to the input of a multi-output pulse transformer PT'. Each output of pulse transformer PT' is connected to a respective complement input "C" of a respective flip-flop to switch said bi-stable switch to its other output condition. The next signals to pass through the flip-flops are thus passed over the "1" outputs to the shift register SR2.

The duration of the delay D will depend on the switching times of the gates GN and flip-flops FFN as well as the shortest time intervals to be measured. The pulses to pulse transformer PT, as will be described hereinbelow, may be derived from such a phenomenon as a specified change in the associated recorded PB signal. The technique may be used to measure distances in the image field scanned to produce the picture signal PB as described hereafter.

If the flip-flops and circuits CC, BA and SR2 are eliminated, the resulting outputs of shift register SR1 or of the gates GN may be recorded as indications of the coordinate positions of specified lines or areas in the field scanned to produce the picture signal PB. For the circuit of FIG. 1B' to function, the code scale on channels C4 to C8 will be a binary code.

The input to the pulse transformer PT of FIGS. 1B and 1B' may be transmitted from such circuit arrangements as the following:

(A) In FIG. 3, the output of the Schmitt circuit CM may be passed to pulse transformer PT as shown in FIG. 1B to measure and present as a bit code signal the length of the signal passed through the "not" circuit N. The output of either clipper CL1 or CL2 may also be passed to a Schmitt cathode coupled multivibrator circuit, the output of which is connected to the input of a pulse transformer, the alternate arrangement not being shown. In one embodiment, the gating signals illustrated in FIG. 3 are provided in predetermined positional relationship to the associated picture signal such that part of the picture signal which was produced during the line scan of a predetermined portion of the image field contains an area the width of which it is desired to measure. The clipping circuit produces a signal output when the input is that part of said picture signal produced during scanning said area. Consequently, the leading and trailing edges of said signal will cause said Schmitt circuit to produce short pulse outputs. The circuits of FIGS. 1B and 1B' including the recordings on channels C4 to CN will provide a code at the output of the binary adder BA therein which will be indicative of the time lapse between said two signals produced by said multivibrator circuit.

(B) In FIG. 4, the outputs of any or all of the circuits or logical switching circuits AN 2-3, AN 2-4, AN 2-5, may be passed to a Schmitt cathode coupled multivibrator circuit and then to pulse transformer PT shown in FIGS. 1B and 1B'. The said outputs present in bit form a number which represents the length of the signal passed through said AND circuits. The same may be effected for the outputs of the various NOT switching circuits of FIG. 4.

(C) In FIG. 7 the output of either clipper CL2 or switching circuit AN2-3 may be passed to a Schmitt circuit and the resulting pulses therefrom to the pulse transformer PT of FIGS. 1B and 1B'.

(D) In FIG. 8 the output of the switching circuit AN2-4 or N may be passed to a cathode coupled multivibrator Schmitt circuit CM having its output connected to pulse transformer PT of FIGS. 1B and 1B'.

(E) In FIG. 9, the output of Schmitt circuit CM may be passed to pulse transformer PT of FIGS. 1B and 1B' or the output of switching circuit AN2-3 to a Schmitt circuit and then to pulse transformer PT for measuring the respective length or difference signal duration.

The resulting output of the binary adder BA of FIG. 1B' may be passed to a recorder or computing mechanism such as the code matching relay to be described and illustrated in FIG. 10. The output of binary adder BA may be used as an error or difference signal in machine control. It may be used for example to correct a machine tool or adjust its position to provide a production or assembly result indicated by the make-up of the picture signal PB which is closer to an acceptable tolerance or standard.

FIG. 1C shows a means for effecting automatic control and switching by what will hereinafter be referred to as code matching. The apparatus comprises a magnetic recording member 10 such as a magnetic tape, drum or disc having multiple recording channels C1 to CN carrying said described sync, picture and gating signals, as illustrated, adjacent to a group of recordings on channels C4 to CN. The recordings comprise a pulse code array such as a binary or other code running scale which, if used to energize the associated reproduction transducers PU4 to PUN, as shown in FIG. 1B, will provide signals at any instant during said reproduction in the output circuits of said transducers equivalent to a particular coded number.

The signals on channels C4 to CN may increase with the length of member 10 in a numerically progressing order. Each unit increase in said recorded code scale may occupy a particular unit length or any predetermined length of member 10. Then, each of said lengths is identified by a particular code which may be used for control purposes. Control signals may be generated and used, for example, to effect such functions as closing a normally open gate having an input from the reproduction amplifier through which the associated picture signal PB is being reproduced to pass the part of the picture signal over a further circuit, recording of a signal adjacent the code recording. Controlling, timing or programming functions whereby the member 10 is driven at a constant speed and a particular code is used to represent a particular time in a cycle.

In FIG. 1C, a series of switches R4 to RN may be manually, pulse, or signal operated or may be the switches of a card or punch tape reading device. Said switches, when closed and opened in the order of the preselected code, condition the illustrated circuitry. Therefore, a signal will be provided over an output circuit when and only when said preselected code appears at the multiple heads PU4 to PUN as shown in FIG. 1B reproducing from the magnetic recording member 10. Said recording member may be driven continuously past said heads by a motor or in an intermittent manner by a solenoid actuated ratchet and pawl drive.

When one of the switches RN is closed, a signal is transmitted to a switching input "I" of a single input, two output bi-stable switch FFN switching it from a "O" or reset condition to a first, "1" condition. When so actuated, the particular FFN switch switches its input to an output circuit which extends therefrom to a corresponding input of an N input AND switching circuit, For example, when the flip-flop bistable switch FF4 is in the reset or "O" condition, an input signal sent thereto from reproduction amplifier A4 is passed to the switching input of a normally closed monostable switch or NOT circuit N4 opening circuit N4 and preventing a signal from a power supply PS from passing to its output.

The output of circuit N4 extends t o an input of a bi-stable switch FF'4 and therefrom to the same input of AN4N that the "1" output of FF4 extended to. A logical OR circuit may be provided at the junction of the two outputs which connect to the single input to AN4N if said circuits are not resistance matched.

The bi-stable switch FF'4 is switched to its closed or "1" condition by the reproduction of a reset signal passed to circuit illustrated input "1" of FF'4. Said reset signal is also passed to the "O" switching input of FF4 thereby conditioning the circuitry so that a signal will be passed to the corresponding input to AN4N only when there is no output signal from reproduction amplifier A4 (i.e. where there is no signal on channel C4 at the reproduction head PU4.) A signal transmitted from amplifier A4 will pass through "O" of flip-flop FF4 to the switching input of NOT circuit N4 and prevent the passage therethrough of the constant output of power supply PS.

The output of switch R4 is also passed to a "O" switching input of flip-flop FF'4 thereby switching FF'4 to open and preventing any signal from power supply PS to pass therethrough. when in said condition. With flip-flop FF4 switched to state a signal will be passed to the corresponding input of circuit AN4N only when a signal is present at the head PU4 on channel 4. A delay line or relay p4 may be provided in the output of "1" of flip-flop FF4 to account if necessary for the time it takes the switches N-3 to N-N to switch if provided in the switching action by the action of the corresponding R switches. It is thus seen that by opening and closing particular or selected of the R switches, provided that all flip-flops FF4 to FFN have been reset to "O", a code array is set up in relay storage which will provide a signal over the output circuit when the same code exists as recordings at the heads PU4 to PUN.

As illustrated, the code on channels C4 to CN is a binary code and is of a numerically progressing order. Consequently, the inputs for activating switches R may be derived from a digital computer and may represent the desired shaft rotation of the power means driving the member 10. A signal output from circuit AN4N represents the attainment of a degree of movement of member 10 as indicated by the code input to the switches R4 to RN. Said output signal may be used to start or stop a servo motor SM by activating a relay RE. The relay RE may also be used to pulse a solenoid, to sound an alarm, or to actuate any electronic or electro-mechanical device, switch, relay or motor. Reset of flip-flop switches FF and FF' is effected by manually or automatically closing a switch SW which gates a signal from a power supply PS to a pulse transformer PT thereby transmitting energizing signals to the respective "O" switching inputs of the FF switches and the "1" inputs of FF' switches.

FIG. 2 shows a section of a recording medium 10 having a number of pulse signals CS11, CS12, CS13, CS14, CS15 recorded on separate tracks or channels adjacent video signals PB2, HS2, and VS2. The latter signal CS15 is recorded on channel C9 and is the shortest of all the pulse signals. While signal CS15 is preferably of a duration in t he order of ten microseconds or less duration when reproduced therefrom, said duration will depend on what phenomenon it is being used to indicate or measure. The C11 to C15 signals are of decreasing length or duration along member 10 and are shown symmetrical with a transverse line PL extending across and preferably perpendicular to the direction of recording and passing through the center of the shortest pulse CS15. This arrangement of recorded signals may be used to indicate the position or region on which a particular point in the video picture signal falls or is expected to fall and may be used for measurement or quality control purposes involving said picture signal.

Assume the image from which the video picture signal PB was produced has a particular characteristic indicative of a position, plane, edge of an object therein or the beginning of a specific area of said image and said characteristic is scanned by the video scanning camera or device as a change in color or light reflectivity. Then, the video signal will change in amplitude. The change in amplitude may comprise an inflection in its amplitude if the color or light characteristic of the field suddenly changes. This change in amplitude may be indicated electronically by the use of a proper clipping or filter circuit in the output of the video reproduction amplifier for the video signal reproduction head. By comparing said clipped signal and noting the position of the leading edge of said signal in relation to the position of the CS12 to CS15 signals, its position or the region of its position may be indicated electrically.

The CS15 signal may be used to indicate the precise norm or desired position of the surface, plane, line or position of the beginning of the area in the field being scanned. The CS14 signal recording may be positioned and of such a time duration or length to indicate a range of acceptable tolerance for said picture signal inflection or image position. For example, when the member 10 is moving at video frequency or the frequency or speed at which the video signal was recorded on member 10, then the length of the CS14 signal may be such that its reproduction will occur in a time interval during which the camera scanning beam will travel across a few thousandths of an inch of the surface of the object or image being scanned which will be equal to the combination of the plus and minus tolerance permitted for said image line to be off a desired or predetermined position P1 indicated positionally by signal CS15.

It is assumed that an area, benchmark, points or a reference line or plane of the object being scanned is prepositioned in the image field and that the object or surface being scanned is at the correct attitude and distance from the video scanning camera or device. Such a method of automatic inspection or measurement may be effected by fixing the video scanning device or camera to scan a particular area or field. A fixture or stops are provided in said field being scanned for aligning the object being scanned so that all objects will have a common base and will be of equal relative scale in the image field. Thus a particular degree of sweep of the scanning beam will represent for each prepositioned object being scanned the same length on the surface of each other object scanned.

The length of the CS signals is proportional to a particular length or distance along any plane in the image field. The positions of the leading and trailing edges of these signals may be electronically detected and may be used to indicate the position of a particular line, plane or small area in the image field or to effect the measurement of said line or plane from a predetermined line, plane or point in the field. As stated, the CS1 signal may be used primarily as a means to gate a similar length of the video signal PB to an output circuit and the position of CS1 will determine what particular length of the video signal will be gated. Assume that it is desired to indicate or measure the distance along a video scanning line between two lines oblique to the beam scanning line which are of different light reflectivity or intensity than the image background. Further assume that the position of each of said lines may be indicated as a result of the inflection in the amplitude of the video picture signal by a pulse created as the signal passes a video clipper, such as a pentode clipper. Then, the CS1 signal will be provided on member 10 in a position such that, when reproduced therefrom, it may be used to gate that part of the video signal produced when the scanning beam of the video camera crosses said lines.

Since the distance between said lines in the image field may vary from one sample or image field to the next, if the maximum variation for all samples being scanned is known, a gating signal CS1 may be provided of sufficient length to pass the correct section or sections of the video signal for each field or sample being scanned such that each will contain that part of the picture signal containing said two lines. The CS1 signal thus acts to pass only that part of the image signal PB in which it is known that the two lines or points will appear regardless of their variation from tolerance to the exclusion of all other lines or images in the total video image field. There may be other lines or images of similar light intensity in the field which would ordinarily prevent the comparative or quantitative measurement of the desired length or distance in the image field, the PB sections of which would have to be blanked or otherwise discriminated.

The CS12, CS13 and CS14 signals may serve one or more of several purposes. They may be used to indicate the actual position and variation from a desired position indicated by the center of said signals, of a point, plane, line or area, as indicated by an amplitude change or inflection in the PB signal occurring in the range indicated by the CS1 signal. For example, if the pulse created by the inflection in said video signal occurs between the time the leading edge of the CS12 signal is reproduced and the leading edge of the CS13 signal is reproduced, then said point in the video signal is known to occur in a particular tolerance range or distance from the norm which may be indicated by the position of the CS15 signal.

Similarly, the range or distances between the leading edges of the CS13 and CS14 signals and between their respective trailing edges may be second tolerance regions and between the respective leading and trailing edges of CS14 and CS15 third tolerance regions. For inspection of machined parts, the tolerance regions between CS14 and CS15, for example, may be indicative of acceptable tolerances between CS13 and CS14 signals indicative of acceptable but also of an impending required change in tool adjustment; between CS13 and CS14 signals indicative of a dimension scanned not passing inspection and quality requirements but capable of rework, and outside the leading and trailing edges of reproductions of signal CS13 indicative of complete rejection of the part and either shut-down of the machine for readjustment or the requisite that the scanning inspection apparatus be checked. The CS12 to CS15 signals may also be used for automatic sorting purposes whereby an object having a dimension which falls in the range of one of said pulse signals but not in the range of the next smaller signal may be so classified or sorted by pulse means to be described.

FIG. 3 shows a magnetic recording member 10 having multiple recordings thereon and also illustrates associated apparatus for the automatic comparative measurement of a similar length or lengths of two scanning signal recordings which are signals derived from photoelectric scanning of moving objects or video beam scanning of image fields. Said picture signals include a sync or position indicating signal S1 provided on a first channel C1 of member 10, two picture signals PB1A and PB1B recorded on channels C2 and C4 and in lateral alignment with each other and the signal S1, and one or more discrete signals SC11, SC12, etc. shorter than either of said picture signals and recorded in predetermined positions on member 10 relative to said picture signals. Said reproduced SC signals may be used per se or with signals recorded on still other channels of the recording member to perform one or more of the various other gating, control and operative functions described elsewhere in this specification.

In FIG. 3, said SC signals are used, when reproduced, to gate specific and similar lengths of reproductions of the two recorded picture signals over respective output circuits for automatically comparing the characteristics of said similar lengths of said two signals. For example, one of said picture signals PB1A may be derived from scanning what will hereafter be called a standard image field. Such a standard is defined as a field of measurement or inspection which to the optical scanning system of a beam scanning video device contains one or more images or image areas which (a) are in a predetermined position in said field resulting from determined alignment therein and (b) exhibit other predetermined optical characteristics such as predetermined color or light characteristic.

The other signal, PB1B, is preferably derived from scanning another field containing an image area or areas similar in shape, position or light characteristics to corresponding areas in said standard image field but which may vary in any of said characteristics. Since the amplitude and/or frequency of the picture signals PB1A and PB1B change as the optical characteristics of the image field being scanned change, said two signals may be compared point by point. Two similar segments or lengths of said signals may thus be compared for amplitude or frequency variations by the means provided and the resulting differences in signal variations indicated by apparatus such as illustrated.

While the method of measurement utilizing the recordings of said two picture signals provided in fixed relation to each other on a magnetic recording member has numerous advantages, it is possible to perform the same function by recording said standard image field signal PB1A in a fixed or predetermined position relative to sync signal S1, for example. Said second picture signal is provided in the circuitry illustrated during the same time it is provided in FIG. 3 by the reproduction apparatus illustrated by utilizing the reproduction of said S1 signal to trigger, for example, the sweep of a video storage tube readbeam to scan a charge pattern recording of said second picture signal and produce said second signal over said illustrated circuitry. Similarly, it is possible to provide both said picture signals recorded on respective storage tubes and to effect their simultaneous reproduction by means of a signal derived by the reproduction of the sync signal S1, whereby the member 10 serves as a signal generating medium for generating said SC signals at predetermined instants during the reproduction of said two picture signals.

The method of recording all signals in predetermined positions relative to each other has numerous advantages. These include the provision of a recording which may be rechecked or rescanned if necessary or changed in characteristic and which may be filed for future reference or used to modulate the write beam of a picture tube for visual monitoring. The recording of at least said standard image field signal on member 10 has additional advantages in that it may be one of a multiple of related but different picture signals recorded on said member and may be selectively reproduced therefrom adding flexiblity to the apparatus and permitting it to be used to perform a multiple of inspection functions relative to different image fields or devices.

Assume that the signal PB1A has been derived from scanning a standard or quality-acceptable image field such as derived from the surface of a work member or X-ray structure of an object or subject which conforms to specified dimensions, surface characteristics or light characteristic. Further assume that said image field contains areas of different light or radiation intensity or other characteristic which will result in signal variations in a predetermined segment or segments of said picture signal. Then, the position or positions of similar variations in the signal derived from scanning field containing images may be measured or compared. The apparatus shown in block notation in FIG. 3 provides one method of comparing the positions of image areas in the standard image field with image areas of fields to be compared therewith. Modifications to said apparatus are possible which will provide not only the same type of measurement but other inspection functions such as counting, noting image variations of areas in a particular area or areas of the field being scanned which do or do not conform in position, light intensity, shape or size with areas of said standard image field.

It is also assumed that means are provided for prepositioning at least part of the scanned image area or the object being scanned in the scanning field of the video scanner to produce said picture signal PB1B. Variations in picture signal PB1B represent particular areas of said image field provided in a predetermined range or area of possible scatter so that a basis for measurement and comparison is provided. For example, if it is desired to compare the position of one or both of two areas in a field being scanned with the position of similar areas in a standard or known image field and said areas are permitted to fall at random in said field, then one of said areas of one field positionally may overlap the comparative area of the standard image field which may result in an incorrect measurement.

The electrical apparatus of FIG. 3 comprises a multiple of reproduction transducers PU1, PU2, PU3 and PU4 as shown in FIG. 1B for reproducing the signals from respective channels C1 to C4. Said transducers are shown in FIG. 1B as being laterally aligned across the member 10 for simultaneously reproducing aligned sections of signals recorded on said channels. The heads may be staggered provided that similar provision is made in positioning of the respective recorded signals, it being desirable to reproduce the start of said two picture signals simultaneously by their respective transducers. It is assumed that both picture signals were initially generated by respective beams initially positioned at the same points in each field being scanned or at a predetermined point on the surface of the object being scanned. Therefore, if said image areas being scanned are to the same scale in relation to the scanning device and are similarly aligned, similar points in the resulting picture signals will have similar field coordinate positions.

The signals reproduced by reproduction heads PU1 to PU4 are amplified by means of reproduction amplifiers A1 to A4 respectively. The output of amplifier A2 is passed to the input of a normally open, monostable electronic gate or switch G1 and the picture signal output of reproduction amplifier A4 to the input of a second gate G2. The switching inputs of gates G1 and G2 receive the output of reproduction amplifier A3 thereby amplifying the signals SC11, SC12, etc. Said gates G1 and G2 may be any monostable electrical switching device adapted to switch at the required rate and to effect the completion of a circuit between its input and output whenever a signal reproduced from channel C3 is present at the switching inputs and to disconnect said circuits or when said signal is no longer present thereat.

Various electron tube and semi-conductor gates are known in the art and may be used for switches G1 and G2. Thus, if it is only desired to compare image segments in predetermined areas of said two fields being scanned or compared, or particular lengths of said respective picture signals, the positions of the SC signals and their lengths will provide segments of both said signals on measurement which segments were produced during beam scanning said predetermined areas of said fields or said specified lengths of said signals.

It is also assumed that the picture signals PL1A and PB1B were derived by beam scanning means which provides a picture signal during scanning which varies in amplitude as the beam scars areas of different light characteristic. For example, the field being scanned may contain an image area of one color or light intensity on a field of a different color or intensity. Then, as the beam crosses from said field to said image area or vice-versa, the picture signal produced during said beam crossing will experience an inflection in amplitude.

Scanning and video systems are known which produce a picture signal which changes in frequency when the field scanned changes in optical characteristics or radiation intensity. Amplitude change and detection of said change is utilized throughout this invention for measurement purposes. However, means for detecting predetermined changes in frequency may also be applied. Thus, if it is desired to compare the position of an image or part of an area in the standard image field with the position of a similar area in another field, the locations of the respective inflections in said two signals produced during scanning said similar areas may be compared by comparing their time relationship in the output circuits of the respective amplifiers A2 and A4.

The outputs of gates G1 and G2 are passed to respective clipping circuits CL1 and CL2 which may be standard video diode or triode clippers adjusted to a desired clipping level. The clipping circuits will indicate by a signal output therefrom when said inflections in said respective picture signals occur. The gates G1 and G2 have the further advantage of limiting the input to the clipping circuits CL1 and CL2 to predetermined lengths of the respective PB signals. The PB signals may correspond to segments of said signal produced during the scanning of a specific area or areas of said total fields. Thus any other areas in said respective image fields, which areas vary the same degree in light intensity or characteristic as those being measured, will not confuse the measurements and will not give false results.

The outputs of clippers CL-1 and CL-2 are passed to a logical two-input AND switching circuit AN1-2 which produces a signal over an output therefrom when a signal is present at both inputs. Thus, a line image may be in the same coordinate position in the standard image field as in the other field being scanned. Provided that the other mentioned conditions of recording and reproducing said two signals simultaneously and initiating said beam scanning actions at the same point in each of said fields are met, and each of said line images as it is scanned causes an inflection of short duration in said respective picture signals, and said inflections cause respective pulse outputs from said respective clipping circuits, then an output will be produced from the AND circuit AN1-2 which will be indicative that said two images where crossed by respective scanning beams are in the same coordinate positions in said two fields.

The mentioned indicating technique will suffice if it is merely desired to compare a point in one scanned field with a point in a second or standard image field whereby the output of the AND circuit may be passed to a counter or recorder. However, if it is desired to scan a larger area of a field to determine if one or more points in said field, or one or more border sections vary in position from a standard, or where a specific border or line starts to vary from a standard, then further indicating and computing apparatus is necessary.

In FIG. 3, the output of AND circuit AN1-2 is passed to the switching input of a normally closed monostable switch or logical NOT switching circuit N1. Whenever an output from gate AN1-2 is present at circuit N1, said switch will open and break a circuit between its input and output. The outputs of clippers CL-1 and CL-2 are also passed to the inputs of a logical OR switching circuit O-1, the output of which is connected to the input of circuit N1. Thus, if either clipping circuit produces an output at a time when the other clipping circuit is not producing an output, said output signal will be passed through the NOT circuit N1. An output from circuit N1 will thus be indicative that the inflection or change in the signal PB1B occurs either prior to or after the occurrence of the respective inflection in the standard signal PB1A.

Physically this may be interpreted as the shifting of the position of a border or line in an image field being scanned either side of a predetermined position as determined by the position of a similar section of an image in a standard or quality acceptable field or pattern. If it is desired to determine on which side of the standard or desired coordinate position, border or line said image being investigated falls, then one of several techniques may be employed. For example, one of the two inputs to the OR circuit O-1 may be eliminated or it may be opened by manual switching means at some time after an output has appeared at circuit N1.

FIG. 3 shows technique for determining where in the picture signal PB1B or said field scanned to produce said signal, an image varies from a desired or standard position defined by the PB1A signal. The technique employs what will hereinafter be referred to as a digital clock or timer referred to by notation DIT. The timing device DIT is started by pulsing an input F thereof and will produce a pulse code such as a binary digit code over parallel circuits 22 whenever a trigger input TR of said timer is pulsed. Thus, if the output of NOT circuit N1 is passed to the trigger input of timer DIT, a signal code is available which indicates the time lapse from the time the timer is first energized. The output of circuit N1 may be of such a duration and occur during a time interval whereby the timing element of timer DIT advances more than one position or time increment. Then, multiple code signals will be transmitted over the parallel output circuits 22. By counting the number of said codes transmitted, the degree of which said sampled image area varies from a standard image position may be determined.

The output 22 is shown extending to a computing circuit which may be an input CO to a digital computer adapted to record or otherwise utilize said digital information for computing control purposes. In a simpler form, stage CO may be a counter or switching circuit adapted to energize servo devices for performing such functions on work being scanned as sorting, marking, assembly or the like. In more complex arrangements, stage CO may be one of a number of digital computing mechanisms adapted to convert the digital input, after operating thereon, into one or more signals for controlling various actions which control results from a decision or decisions made by utilizing sad input information. Such actions as readjusting a machine, stopping, starting, marking and the like may be controlled by computing mechanisms and will depend on the value of the results obtained from scanning.

Other circuitry, hereinafter described, may be utilized to improve or extend the utility of the apparatus of FIG. 3. The use of such apparatus will depend on the characteristic of the phenomenon being measured and the design of the computing or measuring circuits CO. For example, the output of the NOT circuit N1 may be passed directly to a recording device or to a computer CO' which may be used to record said signals and provide an outfit for operating a warning device or servo when said signals become greater than predetermined duration or length. The output of circuit N1 may also be connected to a cathode coupled multi-vibrator Schmitt circuit CM, the output of which is connected to the input TR of timer DIT.

The multivibrator Schmitt circuit is adapted to produce a first short pulse at its output when the leading edge of a longer pulse appears at its input and a second short pulse when the trailing edge of said longer pulse appears at said input. These pulses may each be used to provide a respective coded output over the circuits 22 which are indicative of their relative time relationship. Then, said first digital code may be subtracted from the second generated code by employing known digital computing means in stage CO. Consequently, a different signal or code will be obtained which will be indicative of a difference between the coordinate position of that part of the image area of the standard field being scanned and that part of an image area being compared therewith in the field scanned to produce the PB1B signal. The resulting difference digital signal obtained from subtracting said two outputs of timer DIT may be recorded and/or automatically compared with a code or number recorded in the recording section of the computer CO.

As a further variation in the illustrated measurement technique provided in FIG. 3, a pulse code such as the binary digit pulse code PC' on channel CS of member 10 may be provided, reproduced and passed to the computer CO. The code PC' is reproduced by reproduction transducer PVS and amplified by reproduction amplifier A5 prior to being transmitted to computer CO. Code PC' may represent, for example, in binary digital notation, a number equivalent to the maximum permissible difference between the mentioned two pulse code outputs 22 resulting from said two, leading-trailing edge signal created short pulse outputs of said cathode coupled multivibrator.

By matching said two digital codes (i.e. the reproduction of code PC' and the difference signal computed by computer CO) it can be automatically determined if the variation in that part of the position of that part of the article or image being scanner and the position of associated part of the standard image is greater than the degree specified by the code recording PC'. The difference signal or number which has been obtained by subtracting said first input number from timer DIT to computer CO from said second input may be subtracted from the digital signal obtained by reproduction of the recording PC'. The result is a number which indicates how close the deviation in the position of said article or image area being scanned is to a maximum permissible deviation from a standard position. This latter result may be used to effect the positioning of a tool or other device by operating a servo motor through an equivalent degree of motion or angular position proportional to said difference signal or code.

The signal PC' of FIG. 3 may also be replaced by one or more laterally aligned code recordings of the type referred to by notation PC illustrated in FIG. 1. Additional recording channels C5 to CN may be provided with means for simultaneously reproducing a particular array of pulse recordings at one time. For example, a digital code signal output may be provided over parallel circuits to computer CO at a particular instant or short time interval in the measurement cycle. Then, said codes PC may vary in value from point to point along member 10 and may be used to perform or effect different operations or functions.

Multiple PC codes may be provided to indicate maximum permissible variations in the positions of the standard image and that being measured. Then, each PC recording may be used to indicate the variation in the position or dimension in a particular part or dimension of the total image or article being scanned. For example, the maximum variation or permissible tolerance from a specified position of a first object or component assembled on a chassis may be X inches and of a second object, Y inches. A first code PC is provided opposite or just prior to those parts of the picture signals produced during beam scanning said first object which is indicative of said first permissible maximum variation. A second code PC is provided in a position or positions along member 10 to be reproduced just prior to or during those parts of the picture signals produced during beam scanning said second object. The first output of the cathode coupled multi-vibrator or the signal SC reproduced from member 10 may be used for switching purposes in the computer CO. For example, switching the associated PC code reproduced from member 10 curing the time interval defined by said SC signal may be switched to a particular storage unit such as a relay storage where it is held and used for comparison with the associated output of timer DIT. Further details of such a switching function will be described hereinafter.

FIG. 4 shows magnetic recording means and associated reproduction determining one or more of the following phenomena:

(a) If a given image portion or area in a field being scanned falls in a particular position in said field or if reference points, lines or planes of a given image fall in predetermined positions in said field, (b) Where in said total field or how far off a reference point, line or area in the scanned field a given point, image area or line falls. Examples of the operations of the above referred to scanning means include such investigative functions as determining if the border of an area or areas such as the edge of a workpiece, part of assembly falls along a particular array of coordinates; determine if the workpiece is precisely positioned on an assembly or is fabricated to tolerance. It is assumed that another surface or area of said workpiece is in a fixed position in said field to establish a benchmark or base for said comparative measurement, (c) The means of FIG. 4 may also be used in determining if lines or areas on a map, scope, drawing or photograph fall along predetermined positions. It is again assumed that part of said map or drawing is in a referenced position in said field being scanned.

The arrangement of FIG. 4 may also determine the degree of variance of phenomena such as described above from a predetermined position or positions in said field; and if any other image phenomenon which is characterized by a variation of light characteristic exists in a given scanning field.

For the purpose of simplifying the description of the signal recording arrangement and apparatus of FIG. 4, reference is made to FIGS. 2 and 4'. In FIG. 2, multiple pulse signals are provided each on a different channel of the magnetic recording member 10 to indicate the position of a change or inflection in a video picture signal by noting during which of said pulse signals said variation is reproduced. Similar recording arrangements are provided in FIG. 4 at various positions illustrated as signals P1 to PN on member 10 which represent precise coordinate positions or distances recorded from the start of the picture signal recording where changes such as inflections in said picture signal will occur if the surface being scanned is precisely positioned relative to the scanning apparatus when the field scanned to produce the PB signal is similar to a standard image field.

Thus, at each of the P coordinate positions, multiple pulse signals are provided which bear the general notations SC1-N, SC2-N, SC3-N. The SC3-N signals are located at the P positions. When said inflection in said PB signal is reproduced simultaneously with the corresponding SC3-N signal, the condition may be indicated by use of a logical switching AND circuit which produces an output when said condition occurs. Said output signal indicates that the line or area being measured falls at a predetermined location or coordinate position in the image field.

Reference is also made to FIG. 4' which shows a fragment of an image field IFP being scanned. The horizontal lines ST-L represent the trace of a raster scanning beam. The recording means and apparatus of FIG. 4 may be utilized to determine if an area such as the band LN is positioned in said field IFP with its borders at predetermined coordinate positions therein. Band LN may be such phenomena as the silhouette image of a machined part, a line or curve on a graph, map or drawing, etc.

For many measurement functions, if another surface of said machined part is prepositioned in the field IFP or prepositioned relative to the scanning device, a maximum variation of an image thereof such as band LN from a predetermined position in said field may be determined and noted by means of measuring the lengths of the SC1-N signals. If the area LN is of a different color or light intensity than the surrounding area, it will cause, when scanned, a change in the resulting video signal. Such a change may be inflection in amplitude in that part of the signal produced when the camera scanning beam scans said image line. The maximum expected shift in the position of band LN either side of the predetermined position illustrated is indicated by the length of the longest signals SC-N on channel C3. If the line in the image field should fall beyond the band or area having the width SCN in FIG. 4', then that part of the picture signal PB obtained when the camera beam scanned line LN will not be gated by the associated CS signal.

From FIG. 4', it is noted that a definition of the CS signals of FIG. 2 is that they are pulse signals of such a length, duration and position on magnetic recording member 10 relative to the associated video picture signal PB that, when said CS signals are reproduced therefrom, their presence at the switching input of a normally open monostable electronic gate may be used to gate only those segments of the PB signal which were produced when the video scanning beam scanned the band area ASCN, ASC2N having the width SCN as shown in FIG. 4. A narrowed band area ASC2N having a width SC2N and centered within the larger band area, similarly defines the SC2N signals of FIG. 4.

While these band areas are assumed to be fixed in the field IFP and provide increasingly smaller regions which approach the area or line P, the actual position of the image area or line LN may shift from one sample being scanned to the next and may fall on either side of the line P of FIG. 4. As stated, the area of maximum expected dispersion of band LN is assumed to have the width SCN. Whereas, in FIG. 4' it is assumed that the line LN may shift in its absissa or X value only from $Xp+SCN/2$ to $Xp-SCN/2$ where Xp is the X coordinate value of the line P, other scanning arrangements may have a line image or area of any predetermined shape. Whereas in FIG. 4, the SC3-N signals which indicate the desired or basic position of the line or band LN are of equal duration and are equi-spaced, for other measurement problems, the spacing of said SC3-N signals will depend on the shape or other characteristic of the line or phenomenon being scanned and the type of image scanning employed to produce the picture signal.

In the upper left hand corner of the image field IFF in FIG. 4', the image of a line LA may comprise a mark on the article, map or surface, part of the edge of said image or some other characteristic of said image being scanned which may be used to indicate if said article or surface being scanned is aligned in the field IFP and/or provided in the correct scale therein. The image line or area LA will produce changes or inflections in the PB signal and these may be compared for position in the picture signal with short pulses recorded on member 10. Said pulses are shown on channel C6 of FIG. 4 and are referred to by the notations CS6-1, CS6-2, etc. The pulses CSE-N may all be produced simultaneously with a corresponding pulse caused by the inflection in the video signal PB each time it scans the line LA. Then, by the provision of logical switching circuits in the outputs of the reproduction apparatus and a clipping circuit for clipping said inflections in the PB signal, an automatic indication may be attained that the object or surface containing the line or optical phenomenon LN is properly aligned in the image field and/or provided to correct scale there. If these conditions are not met, a warning device may be actuates to indicate that corrective action must be taken by a human operator before automatic scanning may be continued.

The apparatus of FIG. 4 is illustrated in block diagram notation for the purpose of simplifying the drawings. Various standard electrical components such as reproduction amplifiers A1 to A6, video clipping circuits CL, gates G, logical AND switching circuits AN, logical NOT switching circuits N and the like are provided and are known in the art. It is assumed that each of these circuits is provided with a power supply of sufficient magnitude. Similarly, these circuits are assumed to be capable of switching at the required frequency for effecting precision in measurement.

The circuitry illustrated in the block diagram of FIG. 4 may be utilized to determine (a) if the surface, article, map, drawing, photograph or other object containing the image LN to be scanned is to the correct scale in the image field IFP, (b) if same is correctly aligned relative to the optical or flying spot scanning system of the video device effecting said scanning, and (c) just where in the area of possible dispersion said LN image falls. Multiple magnetic reproduction heads PU1 to PU6 are provided aligned across the tape 10 over channels C1 to C6 for simultaneous reproduction of any of the illustrated signals.

The head PU2 rides against channel C2 containing the picture signal PB and the signal reproduced thereby is amplified in a reproduction amplifier A2. From amplifier A2, the signal is passed to a clipping circuit CL2 adjusted in clipping level to pass only those parts of the PB signal of a desired amplitude such as the inflection portions generated as the scanning beam scans lines LA and LN. The output of clipper CL2 is passed to a monostable, normally open electronic gate G2 having a switching input from amplifier A3 and logical circuit AN6-2 is from the amplifier A6 of the reproduction head PU6, so that the signals CS6-N will be passed thereto. If the reference line or area LA in the image field is permitted to be a predetermined degree off scale or off a specified position or basic position in the field IFP, the permissable scatter may be accounted for in the length of the CS6 signals.

The output of amplifier A6 is also passed to a delay line D6, the output of which is connected to the input of a logical NOT circuit N6. The switching input to NOT circuit N6 is from the output of AND circuit AN6-2. Thus, if a signal is reproduced from the track C6 at a time when no signal is produced at the output of clipper CL2, an indication that the reference line LA on the object or surface being scanned is not at a predetermined position or attitude in the image field IFP will produce a signal at the output of the NOT circuit N6.

The delay circuit or line D6 is provided of a time duration to account for the time required to switch circuits AN6-2 and N6 although for many applications it may not be required. If signals are simultaneously reproduced at the output of clipper CL2 and amplifier A6, AND circuit AN6-2 will produce an output and switch the normally closed NOT switch N6 to open so that the signal from amplifier A6 will not pass therethrough to an alarm or other device AL6. Device AL6 may be a relay which, when energized by an output from NOT circuit N6, is adapted to effect such actions as the stopping of the measuring apparatus, rejection of the part or article being scanned, etc., by energizing an electrical device such as a relay actuated solenoid.

Circuitry is provided to determine where the image of LN falls in the image zone referred to by notation ASCN in FIG. 4. Respective reproduction heads PU3, PU4 and PU5 scan channels C3, C4 and C5 and reproduce the illustrated signals therefrom. The reproduction amplifiers A3, A4 and A5 amplify the signals reproduced by their respective heads. The output of amplifier A3 is passed to the switching input of gate G2 thereby closing said gate while present thereat and permitting any signal or signals produced at the output of clipper CL2 while said gate G2 is closed by the presence of a reproduced SCN signal thereat to pass to three circuits including inputs to AND switching circuits AN2-3, AN2-4, and AN2-5.

The other input to circuit AN2-3 is from amplifier A3. When clipper CL2 produces an output at the same time that one of the SCN signals on channel C3 is being reproduced, an output will be produced from circuit AN2-3 indicating that the change or inflection in the PB signal caused by the scanning beam sweeping across the area LN falls in the region ASCN of the scanned image field. The output of circuit AN2-3 may be passed to a counter, recording device or further logical switching circuit 12. The output of amplifier A3 is also passed to the switching input of a NOT circuit N2-3, the signal input to which is derived from clipper CL2. Thus, if the area or line LN falls outside of the area ASCN, such that the change in the PB signal occurs and is passed to clipper CL2 at a time when no signal is present at amplifier A3 to be passed to open circuit N2-3, said signal clipped by CL2 will pass through circuit N2-3 to a circuit 12-3 which may be an alarm, recorder or relay adapted to energize a counter or actuate a solenoid or other device.

The output of switch G2 is also passed to one input of a logical AND switching circuit AN2-4. The other input to switch-circuit AN2-4 is from amplifier A4. Therefore, if an SC2N signal is reproduced at the same time an output is produced from clipper CL2, a signal indication is obtained that the line LN falls in the region or area ASC2N having the width SC2N. The width SC2N is shown in FIG. 4' as a narrower band or area closer to the required position of line LN at X=Xp, Y=O in FIG. 4'. The output from switching circuit AN2-4 may be passed to a counter, recorder or relay 14. If relay 14 is a pulse counter, it may be adapted to produce a pulse over an output circuit upon receipt of a particular number of pulses from switching circuit AN2-4. If LN is a curved line or band or is oblique to the horizontal X-axis of the image field, a predetermined number of pulses produced from switching circuit AN2-4 will indicate that a particular part or percentage of the total line LN falls within the area ASC2N.

It may be desired to discover where in the image field the line LN deviates in its position and if it falls outside of a given limit defined, for example, as the band area ASC2N. Assuming that said line can vary from one sample scanned to the next in a manner whereby part of said line may fall within said given area and part beyond said given area, a code indication of where said deviation occurs may be derived as follows:

A pulse counter PCO having a counting input PC is connected to a normally inactive pulse generator PG. The trigger input to the pulse generator PG is from the output of reproduction amplifier A1 which receives the reproduction of the S1 signal on channel C1. Since the S1 signal is indicative of the reproduction of the start of the PB signal and is used to trigger the pulse generator PG, the number of pulses produced by pulse generator PG after being so triggered is an indication of the length of the recording member 10 moved past the reproduction heads. Hence, it may be used to indicate the position of a particular point in the picture signal PB such as a deviation from tolerance.

The pulse count or pulse signals received by said counter activate said counter for indicating where in said video PB signal or in said image field said deviation or other occurrence take place. The phenomenon measurable by the apparatus of FIG. 4 is a point or area in the image field IFP where the line LN first extends beyond or leaves predetermined area ASC2N. This may physically be interpreted as a deviation from tolerance, a change in a predetermined image condition, or an image change such as a step in the shape of a manufactured part.

Said indication of position may be attained as follows: The counter PCO is assumed to be initially set at zero and is adapted to start to count upon receipt of a first pulse from the pulse generator PG which is triggered by reproduction of an S1 signal as the recording passes head PU1. When a second input PCR to the counter PCO is pulsed, said counter either stops counting or provides signals therefrom indicative of the count received prior to energizing input PCR by means of said pulse. Said signals are transmitted to a circuit I6 which may be a recorder, relay, part of a logical computing circuit or other device.

In FIG. 4 the input PCR is adapted to receive a pulse when the inflection or change in the PB signal, caused as the beam of the scanning camera first sweeps across the area LN, is reproduced by head PU2 when part of the SC2N signal associated therewith is not reproduced therewith. The pulse transmitted to input PCR is indicative of this condition because it is the output of clipper CL2 and can only be passed through a normally closed NOT gate NCR when there is no signal at the switching input of said gate from amplifier A4. An output through NOT circuit NCR indicates that the line or border of the area LN in FIG. 4' falls outside of the limits or area defined by the SC2 signals yet, due to the gating action of the SC1 signals when said line falls within the limits defined by the signal on channel C3.

Two other functions which may result when a signal is produced and passed through circuit NCR are also illustrated. The output of circuit NCR may also be passed through a time delay switch or delay line D2 to the resetting input RT of pulse counter PCO to automatically reset said timer to condition it for the next measuring function. The output of circuit NCR is also connected to a relay RE6 which may actuate a warning device, solenoid or motor for causing such an action as rejection of the article being inspected, stopping a production machine, etc. The output of the pulse counter PCO may be provided on a single or multiple parallel circuits for transmitting a parallel pulse code therefrom whenever input PCR is energized to the input of stage I6 which may be a recorder, computer, switching circuit, relay or other device.

The pulse generator PG of FIG. 4 may be eliminated from the circuitry as follows: Instead of recording a single pulse S1 on channel C1, multiple equi-spaced short pulses are recorded thereon preferably extending the length of the PB signal. The length of these pulse signals SN will depend on the length of the PB signal. If the heads PU1 to PU6 are laterally aligned across a magnetic tape 10, then the first signal S1 will preferably be positioned at or near the start of the PB signal. The number of SN signals which pass and are reproduced by the head PU1 at any instant during the reproduction will be an indication of the length of the PB signal which has been reproduced up to that instant. The output of amplifier A1 may be thus passed directly to the pulse counting input of a counter such as counter PCO which has been set at zero and said counter may be stopped and caused to read out avalue of the total number of counts received by an input such as from circuit N6. Then, the total pulses received until receipt of said latter input will be an indication of the length or position of the PB signal at which said latter pulse was received.

In FIG. 4a a code generating means is provided in place of the pulse counter PCO of FIG. 4 to indicate the position or positions of specific images or parts of images in the total image field represented by the video picture signal PB. For example, various measurement, computing or control functions may require the automatic indication by means of electrical signal means indicating the position of a line in the image field or a portion of a line in a predetermined part of the image field. If the field IFP of FIG. 4' is considered the X-Y plane of a coordinate system and the origin is predetermined by the coordinates as X=O, Y=O at the lower left hand corner of said field, then any point in said field may be referred to as having positive Y coordinate.

A means for determining the coordinates of a point in field IFP in FIG. 4 of a particular point in the PB signal is to initiate counting when first reproducing the PB signal by gating the output of a pulse generator PG and noting the total count or number of pulses generated thereafter at any instant. However, device I6 connected to the output of counter PCO may be a digital computer which is adapted to utilize the output of counter PCO for automatic computational purposes. Then, said output is preferably provided in binary digital pulse form. Counters are known in the art and will provide a binary pulse code output at any instant during their operation by pulsing their input. If counter PCO is such a digital output counter, a pulse transmitted thereto from NOT circuit NCR may be utilized to indicate, by means of binary codes, variations in the picture signal PB recorded on channel C2 of member 10.

In FIG. 4a means are also shown for providing an instantaneous binary pulse code output on parallel circuits to the input of a digital computer CO. The said code is an indication of the location of a particular point in the picture signal. Depending on the circuitry employed to energize said code producing apparatus, said code may serve as an indication of the location of a particular change in said picture signal thereby digitally indicating the position of a particular part of the image in the field IFP.

In FIG. 4a, an analog to digital converter ADC of conventional design is employed to provide a digital pulse code on parallel circuits CKC which are connected to the input of a digital computer CO. The converter ADC may comprise a constant speed motor driven and a shaft switching device having multiple brush contactors which sweep a coded contact area of a coded disc to produce a digital code over parallel circuits indicative of the position of said shaft at the instant an input TR is pulsed. The output of the amplifier Al is connected for reproducing the recorded S1 pulse and passes said pulse to the starting input S-ADC of the converter driving motor to start the cycle. It is therefore assumed that the shaft of said converter is at zero position prior to starting.

The code triggering signal to the trigger input TR of converter ADC may originate from any of the logical switching circuits or gates of FIG. 4 depending on what is desired to be indicated by means of a digital code signal. For example, the image phenomenon in the field IFP may comprise a line such as LN of FIG. 4' or a simple analog curve and it is desired to indicate by coded signal means the coordinate points in said field where said curve or line falls. Then, the input to input TR is connected to the gate G2 of FIG. 4. Each time an inflection occurs reproduced in the picture signal PB, a parallel digital code will be produced over the multiple parallel circuits CKC and transmitted to the computer CO.

It may be desired to indicate where the area AC, for example, varies from the predetermined area position as indicated in FIG. 8'. Then, the pulse input to input TR may be derived from one of the outputs of the logical AND switching circuits AN2. The selection of which output to use will depend on which of the limits denoted by the signals SC1, SC2, SC3, etc. it is desired to measure variations relative to. The output of NOT circuits N23, N24, etc. will provide a code indication at the computer by activating to the input TR of converter ADC when a change in the PB signal occurred resulting from the area scanned falling outside the limits defined by the signals on channels C3 and C4.

The input RE-ADC to the analog/digital converter ADC ADC is connected to a reproduction amplifier A7 which reproduces a signal from a seventh channel of recording member 10 (not shown). The seventh channel signal is positioned thereon to be reproduced after the reproduction of the PB signal and is used to either stop converter ADC at its zero position or activate a servo which drives converter ADC position to a shaft thereof at said zero position. If the switching shaft of converter ADC is adapted to make one revolution during the time it takes to reproduce the PB signal, then a limit switch may be provided mounted adjacent said switching shaft of converter ADC adapted to be closed when one revolution of said shaft has been made and to thereby stop said driving motor at said zero position. Pulsing the control S-ADC during the next cycle by means of a signal reproduced from channel C1 may be used to bypass switch RE-ADC and start said converter driving motor to start the next inspection cycle.

FIG. 4B is a diagram showing further details of a digital clock or timer of the timer type DIT utilized in FIGS. 3 and 4. As stated, the digital clock is adapted, when operative, to transmit a digit binary code therefrom at any instant after starting when an input TR is pulsed. Said code is indicative of the time passed from the starting of said clock. If the cycle of timer DIT is activated at a predetermined time during the reproduction of the picture signal PB, the position of any point in said PB signal may be indicated by generating a pulse signal at the instant said point in said picture signal is reproduced and by passing said pulse signal to the input TR of timer DIT. The resulting code transmitted over parallel circuits 22 will be indicative of the time said clock was pulsed.

The digital clock of FIG. 4B is electro-mechanical and is a modification of the conventional shaft position encoder in that it is driven after starting at a constant speed. The clock DIT indicates unit time lapse whereas the conventional encoder is a variable speed device which is driven by a variable speed motor the shaft of which is speed controlled by an analog signal. The clock DIT may utilize certain components of a conventional shaft encoder; namely, a shaft digitizer assembly ADC' having the conventional code disc therein and readout means. Assuming that digitizer ADC' is a photoelectric type of encoder, it may contain the conventional code disc driven by shaft 16. It also has a readout flash light source which is energized when a signal is present at input TR, a radiation limiting slit between the code disc and light, a slit system on the other side of the code disc and a multi-element photoelectric PBS cell on the other side of the slit system.

The cell elements which receive light through the disc pass pulse signals over the output circuits 22 to computer CO. These elements, while not illustrated in FIG. 4B are known in the art and are part of the encoder section of the type 309-13 electric shaft position encoder produced by the Electronic Corp. of America. The shaft 16 is driven by a constant speed motor 12 through reduction gears preferably of a ratio of 100 to 1 or greater. The ratio depends on the time constant of the clock and the running speed of the motor 12. The motor 12 may be any constant speed, rapidly accelerating motor.

During the time of acceleration, accurate code signal indications of time lapse can only be obtained if the acceleration is constant or occurs always in a predetermined manner. If the motor is provided to accelerate at a constant rate or always in a predetermined manner and contains the necessary controls to maintain a constant speed thereafter, it may be calibrated so that a particular pulse code that is generated on the outputs 22 with the shaft 16 initially provided at a zero set point will always indicate by code the same time lapse from said starting. Known automatic control apparatus 12 is used for rapidly accelerating said motor in a predetermined manner and includes control means for maintaining the speed of said motor constant thereafter.

The starting and stopping of clock DIT and its reset to zero may be effected by a combination of switches including a pulse actuated flip-flop switch for starting and stopping the motor 12. The switch is indicated by the blocks having notations F and S. When input F is pulsed, a circuit is completed between a power supply PS and the motor 12 and/or its constant speed control. When the input S to the flip-flop switch is pulsed, said switch switches to open, thereby cutting off the power supply. In the apparatus of FIG. 4, if the input to F is derived from amplifier A1 and if member 10 is driven at constant speed, then at any particular instant after input F is energized by the reproduced S1 pulse, a particular code will be transmitted from the encoder and said code will be indicative of said time interval.

The output of the converter ADC' consists of multiple parallel circuits 22 over which said digital pulse code is transmitted whenever an input pulse appears at a line 20. The input line 20 extends from the gate GS and the output code from digitizer ADC' effected when line 20 is energized will indicate the point at which an inflection occurred in the PB signal.

The digital timer or clock DIT may be reset to zero as follows: A bi-stable solenoid 21 is mounted adjacent the shaft 16. A cam projection 18 is provided on shaft I6 which during normal operation of the device rotates and clears the retracted shaft 26 of the push pull solenoid 21. The solenoid has two inputs F and R. When input F is pulsed its shaft 26 projects and when input R is pulsed shaft 26 retracts. Mounted on the end of shaft 26 is a limit switch 28 which is projected into the path of cam 18 when input F of solenoid 21 is pulsed. The limit switch 28 is provided in circuit with a power supply PS and when closed as it engages cam projection 18, a signal thereby transmitted to the stop control S of motor 12 and input R of 21. The solenoid shaft 26 is thus retracted and the motor 12 stopped with the shaft 16 provided in a predetermined or zero position. A delay relay 30 in the circuit of limit switch 28 and input R of solenoid 21 may be used to delay the retraction of shaft 26 so that the shaft 16 may come to rest against shaft 26. The pulse transmitted to input F of solenoid 21 is derived from an amplifier A7 which amplifies signals recorded on a seventh channel C7 of the member 10. The seventh channel signals are provided to indicate the end of the particular recording or desired computing function.

In FIG. 5, a signal recording arrangement is provided on a magnetic recording member 10 and is applicable for operating on or gating particular lengths of a video picture signal which correspond to those parts of the video picture signal PB derived during the beam scanning of a particular area or areas of the image field or object being scanned. The recorded signals of FIG. 5 comprise a sync signal S1 provided on a first recording channel C1 for indicating the position of a video picture signal PB on a recording channel C2. Multiple pulse gating signals SC1, SC2, SC3 . . . etc., preferably of predetermined duration, are provided on a third channel C3 in predetermined positions adjacent the PB signal. The SCN signals are preferably of a length and/or positioned relative to the picture signal PB such that they may be used to gate or effect operations on similar lengths of the PB signal. If the length, spacing and positions of the SC signals are predetermined, then that part of the total video picture signal PB which was produced during the camera beam scanning of a particular area of the total field being scanned may be gated thereby or operated upon. The segments of the PB signal which are so gated will be determined by simultaneously reproducing the PB signal and the SC signal.

If the reproduction heads are laterally aligned across the magnetic recording member 10, as illustrated, then each SC signal may be used to gate an equivalent adjacent length of the PB signal. For gating or operating upon those segments of the PB signal created during the video scanning of a specific area or areas of the total field being scanned, the lengths, spacings and positions of the SC signals relative to the PB signal will be determined by the shape of the selected area or patch of the total field being scanned and by the type of scanning employed. For example, raster scanning may be employed across a rectangular scanning field. Consequently, a rectangular area or patch in said total field which has its sides parallel to the borders of the total field will be represented in the PB signal by a series of equi-length, equi-spaced segments of the picture signal.

The segments of said picture signal may be reproduced and scanned or otherwise operated upon by having similar lengths of equi-spaced gating signals SC recorded on channel C3 and by reproducing said SC signals simultaneously with the picture signal. The presence of the reproduced SC signal at the switching input of a normally closed electron tube gate will gate an equal length of the PB signal. By predetermining the lengths, spacings and positions of the recorded SC signals, any particular area or areas of the total field being scanned may be gated in this manner or otherwise upon. The SC signals may be provided by a pulse generator of known design. Either reproduction of the sync pulse S1 or the first part of the picture signal may be utilized to trigger the operation of said pulse generator to correctly provide the SC signals for recording onto channel C3.

Still another means for providing SC or CS signals on member 10 of the correct length, spacing and position may comprise scanning an object or image field by beam scanning means and passing the resulting video picture signal to a beam storage tube and recording it on the storage element thereof. Next, the recording member 10 is driven past its recording and reproduction heads. Reproduction of the S1 signal is used to trigger the read beam of said storage tube. The resulting output of said tube is passed to a clipping circuit of the type described. The output of the clipper is recorded on channel C3 as a series of discrete signals. If the signal recorded in the storage tube is derived by scanning a mask or map having position predetermined black or white areas of sufficient light contrast on background fields and said mask or map is correctly positioned in the scanning field of said beam scanning means and provided at the proper image scale, then SC signals of the desired length, spacing and position may be generated and recorded on channel C3 by selection of the correct mask pattern.

A preferable means for providing such a mask is as follows: An image field IF is shown in FIG. 8' at the scanning plane of a video scanner or video camera optical system. Raster scanning is utilized in FIG. 8' and the scanning field is assumed to be rectangular. The horizontal lines ST are traced by the video camera scanning beam which sweeps across several areas A-A, A-B and A-C. Said areas are each crossed by a number of horizontal scanning sweeps. Each of said areas are assumed to have different light characteristics or color than the background BF of said field IF. To determine if the area A-C falls within a specific band area A-C' of the field, the apparatus of FIG. 4 may be used to effect said determination. The signal recordings of FIG. 5 consist of a series of gating signals SCN provided of equal length and equal spacing along the recording member if the area A-C' is rectangular and if the borders of said scanned area are parallel to the borders of the image field IF. Each time the beam scans a path ST and crosses the leading edge E1 of area A-C, area inflection occurs in the amplitude of the picture signal. If the background area to the right of image area A-C is the same light intensity as the area on the left side of the A-C picture, said signal will exhibit the same amplitude generated before scanning A-C when the beam sweeps past the trailing edge E2 of area A-C. The area A-C may represent any optical phenomenon such as a cutout in a panel, a component assembled on a device having a general surface of different color than area A-C, the cross section shadow or end view of an object, one object or area in a field of many such as illustrated by areas A-B and A-C.

The area A-C of FIG. 8' may be positioned in a known position in the field IF and it may be required to measure or indicate only the positions of similar shaped areas in other scanned image fields. Then, the signals to be recorded on channel C3 of FIG. 5 may be obtained by placing a mask over the areas A-A and A-B of essentially the same light characteristic as the background of said field, scanning the field IF with a video image scanning camera such as a vidicon or iconoscope tube, passing the resulting picture signal to a clipping circuit such as clipper CL-2 of FIG. 4 and recording the output of said clipping circuit on the magnetic tape 10. The recorded signal S1 is used to start or trigger beam scanning of the field IF.

Hence, the phenomenon to be measured is recorded and may be reproduced at the correct instant so that the signals SC1, SC2, SC3 . . . SCN may be used to gate only those parts of the picture signal PB generated during the scanning of the area A-C while excluding signals generated on scanning areas A-A and A-B. In order to generate and record, signals SCN on member 10 for gating portions of the picture signal PB generated in scanning an area A-C' which area is larger than A-C and has a marginal area around area A-C to account for permissible small shifts in the position of area A-C from one workpiece or specimen being scanned to the next and to generate gating signals modified to account for permissible shifting or movement of area A-C in the image field, the optical system of the scanning device may be enlarged the necessary degree to make the sides or borders of the area A-C fall on the coordinate lines LE and TE which respectively represent the sides of the area A-C' and determine the leading and trailing edges of said SCN signals. After effecting said enlargement of the image area A-C and masking of the areas A-A and A-B so that the background of image field IF is essentially of one light characteristic, the modified field may be scanned and the picture signal passed to a clipping circuit the output of which is recorded as described to provide the SCN signals on member 10.

FIG. 6 illustrates a recording arrangement and associated transducing apparatus for reproducing and/or modifying a portion or predetermined portions of a video picture signal PB recorded on a magnetic recording member or tape 10 whereby control of said reproduction or signal modifying is effected by one or more signals recorded in predetermined positions relative to said PB signal. In FIG. 6, a single control signal CS1 is shown provided on channel C3 of the recording member 10 adjacent the PB signal. Signal CS1 is in such a position whereby it may be used to gate or otherwise effect an operation on a similar and predetermined length of the PB signal.

The signal S1 on channel C1 may be used to record either the PB signal or CS1 signal in a predetermined relative position, one after the other is recorded thereon. The CS signal may be passed as described to the switching input. of normally open gate G2 after being reproduced by reproduction transducer PU3. When switch G2 is closed by the signal reproduction of the CS recording passed thereto, that part of the PB signal present at reproduction head PU2 will be passed through said gate G2. A particular segment or segments of the PB signal such as the segments produced during the beam scanning of a particular area in the image field may then be gated and passed to a circuit DCK which is adapted to operate in a predetermined manner on said gated segments of the reproduced picture signal by means of the gating signal or signals recorded on channel C3.

The circuit DCK is provided to perform one or more of a number of functions on the gated segments of the PB signal passed thereto. If segments of the PB signals are gated by multiple pulse signals on C3 of predetermined length and positioned such that said gated segments correspond to the picture signal sections generated during the scanning of a particular area of the field being scanned, then functions such as amplification, attenuation or erasure of the gated signal portions may be effected by operation of circuit DCK to produce a modified video signal which will provide a corresponding change in the image field generated thereby. Gate G2 may be operated to close and pass predetermined portions of the video signal by gating signals derived, as hereinabove provided, from clipping portions of the reproduced video picture signal itself (i.e. the output of head PU2) which may fall above or below a certain level.

If the output of delay DT' is connected to recording head RH2, gate GT may be operated to close by the same clipped gating signals. Thus either the output of the signal changer circuit DCK or the picture signal generating storage tube ST may be passed to recording head RH2 after appropriate delay introduced by delay lines DT' or DCK is effective in presenting the new or modified picture signal segment at the recording head RE2 at a time that either the clipped portion of the recorded picture signal PB or the portion defined by signal CS1 is present at recording head RH2.

The new or modified video signal portion may either be recorded directly over the segment of the video signal recording it is to modify or replace or on the appropriate length of the channel C2 which has been erased. Such erasure may be effected by either passing the clipped portion of the reproduced video picture signal or the reproduced CS signal(s) through a delay line D3 to the switching input of a normally open monostable electronic gate GE which gates a power supply PS to energize a magnetic erase head EH2.

The delay period of delay D3 is such that head EH2 will be energized during the interval the length of the tape containing the portion of the PB signal recording which was clipped upon reproduction is passing erase head EH2 or during the interval that portion of the picture signal recording associated with signal CS is passing erase head EH2. Thus, the modified picture signal passed through circuit DCK will then be recorded on an erased section of the channel C2 in the exact position previously occupied by the original gated section of the reproduced signal.

The apparatus of FIG. 6 may also be used to perform functions which are commonly employed in still or motion picture photography, such as: (a) fading or blanking or erasure of a particular area or areas of a picture or image field such as is commonly done in retouching a photograph, (b) fading or reducing the image intensity of an area or areas of the total image field being scanned and reproduced, (c) increasing the brightness or amplifying the image field being scanned and reproduced, or (d) recording a second image signal over a particular area or areas of an image field.

In order to effect the last function, i.e., recording a new signal or signals on a series of lengths of the recorded picture signal to effect the production of a new image in said image field when said picture signal is used to modulate the write beam of a video storage or picture tube, it will be necessary to obtain said new picture signal by reproducing it from a recording device.

FIG. 6 also shows means for effecting this action of recording a new picture signal onto a particular length or lengths of the channel C2 between the leading and trailing edges of the PB signal already recorded thereon. Said recording arrangement comprises a video storage tube ST having an input W1 energizable for writing a video signal into the storage element of said tube and a reading output R1 on which is generated a reproduction of the recorded video picture signal when a trigger pulse is received at read beam trigger input R2. The trigger input to R2 may be derived from amplifier A3. If the storage element of tube ST is capable of producing a signal when scanned by its read beam, which, when recorded on member 10 of FIG. 6 as said recording member is driven at the same speed in which PB was recorded, it will produce a recording having the same length as recording PB. Furthermore, if the image area in the storage tube recording element is located along the same coordinate of the storage tube, storage element as in the field scanned to generate the PB signals, signal segments for affecting said image area may be recorded onto the correct lengths of channel C2 as follows:

The signal S1 is reproduced by a reproduction head PU1 as the leading edge of picture signal PB first passes reproduction head PU2. The reproduced signal passes to the trigger input R2 of storage tube ST. The read beam of storage tube ST starts its sweep and the resulting output signal thereof is passed through a gate GT which is normally open and is closed when a signal is present at its switching input that is connected to amplifier A3. A delay line DT is provided between amplifier A3 and gate GT to account for the time required for triggering the read beam. It is assumed that the S1 signal is provided in a position to permit the reproduction of signal S1 to trigger storage tube ST to provide an output signal therefrom at the instant the leading edge of signal PB passes head PU2. This lag, if any, can be also accounted for in delay line DT' which is connected between gate GT and the recording amplifier RA2 for recording head RH2. The recording amplifier RA2 is positioned where stage RA-CK is connected to delay line DT' and recording head RH-2. The time delay constant of delay DT' is such as to delay the passage of the signal from storage tube ST a sufficient time to permit the member 10 to travel the distance between heads PU2 and RH2. The gate GT is utilized to blank out all parts of the signal transmitted from storage tube ST except those of equivalent length and reproduced when the signals CS on channel C3 are reproduced.

In FIG. 7, a series of gating signals SC1, SC2, SC3 . . . SCN are provided on channel C3 of magnetic recording member 10 adjacent a video picture signal PB, which, as in the other hereinabove described examples, may comprise a composite video signal with picture, blanking,. horizontal, and vertical sync pulses provided therewith. Each of said SC signals are of a particular length and are recorded spaced apart in positions relative to said PB signal. The SC signals may be used, when reproduced simultaneously therefrom with said PB signal, to gate particular or predetermined lengths of said PB signal which lengths were generated when a video scanning camera beam scanned across a particular area or boundary in the image field being investigated.

An object or surface may be prepositioned in the field being scanned such that a point or points on the surface of the object are at predetermined coordinate positions in the scanned image field. Then, a particular area or areas, determined by said multiple gating signals SC, may be investigated to determine if smaller areas, spots, lines or the like of different light characteristic than the background of said selected areas exist therein. For example, surface defects such as scratches, marks, holes, discoloration and the like which appear as images of different light characteristic than the general surface due to shadows, change of reflectivity or greater absorption of light, will cause a variation in the amplitude or frequency of the video picture signal when said surface is scanned.

If PB signal is composite video signal recorded on channel C2 or if other areas of the field being scanned are of equal or greater light variation than the surface defects or image phenomena being investigated, the gating signals SC may be reproduced and employed. In this manner, such phenomena will not serve to confuse the functions of measuring, counting or of otherwise determining the existence of or extent of such defects because said SC signals may be used to gate only sections of the picture signal PB generated while scanning the area of the image field in which said defects or phenomena to be measured occurs to the exclusion of other areas of said image field.

In FIG. 7, the SC signals are reproduced by head PU3 and passed to one input of a logical AND switching circuit AN23. The picture signal recording PB is reproduced by magnetic reproducing head PU2 and passed through a reproduction amplifier A2 to a clipping circuit CC12. The output of CC12 extends to the other input of circuit AN23. The clipping circuit CC12 is adjusted in clipping level to detect the image phenomena or surface defects in the area determined and gated by the SC signals for investigation. Whenever both signals from clipper C12 and amplifier A3 are present at circuit AN23 an output signal is produced therefrom.

Said output signal may be utilized in one of a number of manners. The presence of such an output signal may indicate a defect or undesirable characteristic of the surface being scanned and may be used to energize a relay which may effect one or more of such functions as the ringing of a bell, energizing of other types of alarms, the stopping or starting of a servo motor, actuation of a solenoid for rejecting or transferring the part being scanned, or the pulsing of a counter. It may also be desirable to count the pulses passed from AND circuit AN23 in a counter such as counter TC which may contain circuit means for emitting a pulse therefrom for control purposes of a predetermined count is exceeded during the passage of the entire PB signal. Notation AM refers to an alarm triggered by an output from counter TC.

FIG. 8 is a schematic diagram illustrating signal recordings and reproduction means including control circuits for automatic dimensional measurement. Means are provided for automatically and rapidly determining if a dimension in an image field, such as the distance between two surfaces, which dimension is discernible by variations or inflections in the light or color of the image defined at the limits of the investigated dimension, is positioned in a particular or predetermined area therein and is of the same length as a standard or comparative dimension. Said comparative dimension may be the length of or distance across a similar component or area conforming to a given dimensional standard such as across an article of manufacture which is dimensionally acceptable and conforms to precise dimensional measurements according to, for example, an engineering specification.

Measurement and position of the dimension or dimensions being inspected and compared is accomplished in FIG. 8 by use of a video picture signal derived by video camera beam scanning the surface of the object or area being measured or compared. The said picture signal PB may be recorded or otherwise provided hereby it may be passed to a measuring circuit or circuits at time whereby the generation of said signal is synchronized to the reproduction of other gating and position indicating signals recorded on a magnetic recording member.

In the hereinabove described video measuring and control techniques, one or more video picture signals are recorded on a magnetic recording member in a precise position relative to one or more control or gating signals so that said other signals may be reproduced to gate particular lengths of the video signal and to indicate the position of particular points or areas in said video signal. The same results may be attained by recording the video picture signal on any other medium such as the surface of a storage tube provided that it can be reproduced therefrom in a manner whereby it is synchronized in time to the generation of said other signals. This may be accomplished in the arrangement of FIG. 1, for example, by reproducing the frame indicating or sync signal S1 and employing said signal to trigger the sweep of the 'read beam' of a storage tube. Said video picture signal is thereby provided on an output circuit at the same instant that it will be reproduced from a recording on a magnetic recording member adjacent the other signals as described.

Similarly, the picture signals of the other figures including FIG. 8, may be recorded on other than the illustrated magnetic recording members. Said video storage tube may also be replaced by a deflection controlled camera scanning the image field being investigated such that the video scanning beam is triggered to effect a controlled scan by the signal reproduction of the sync signal recording S on track C1. In FIG. 8, the article or surface being investigated is located relative to the video scanner such that the image presented to the optical system of said scanning apparatus is of a predetermined scale and is aligned in said scanning field in a predetermined position so that comparison can be made by the reproduction of said prerecorded multiple gating and switching signals at predetermined intervals during the reproduction of said video picture signal.

In FIG. 8, multiple signals are shown recorded on magnetic recording member 10 including a sync signal S1 for locating a video picture signal PB which is recorded adjacent signal S1 on a second track C2. A third and fourth signal CS3 and CS4 are recorded on tracks C3 and C4, respectively. For measurement of a particular length or distance in the video image field, the signals on track C4 comprise two signals CS4-1 and CS4-2 which represent the end limits of the dimension or length being measured. Signal CS4-1, for example, is positioned relative to the PB signal such that it will be reproduced therewith and with an associated length of said PB signal which is generate when the video camera scanning beam crosses that part of the acceptable or standard image in the scanning field which is located at one end of the dimension being compared.

Referring now to FIG. 8' to illustrate the significance of the spacing, positions and lengths of the gating signals of FIG. 8, in FIG. 8' there is provided a rectangular image field BF which is scanned on a raster type scan by the video camera scanning beam. In said image field BF, multiple black or dark areas denoted A-A, A-B, A-C are located on a bright or white background B-B such that each of said areas or patches will effect a variation in amplitude in the video picture signal when scanned.

In order to discriminate between the different areas of similar or nearly the same light intensity, a signal CS3 is provided on channel C3 to gate only that part of the video signal which is produced when the beam scans or a particular portion thereof which is the particular area to be investigated or measured. Recorded signal CS3 has a length L which is derived during scanning the distance L illustrated in FIG. 8'. The distance L extends across the rectangular area A-C and includes a brief distance either side of A-C but not so far as to possibly overlap the other areas A-A and A-B. The area A-C is shown as rectangular and having ride borders which are parallel to the borders of the total image field BF. The dimension L will be determined by the degree that the patch area A-C may shift in position from one sample of area being inspected to the next and the closeness of an adjacent area such as A-B which would cause a similar variation or inflection in the video signal generated during scanning A-C which would cause an incorrect measurement or prevent measurement.

The dimension D represents the width or length of that part of an acceptable or standard area A-C which is crossed or scanned by the video camera sweep beam. In FIG. 8', dimensions D represents the required or specified width of area A-C and is shown in FIG. 8 as a distance between centerlines drawn through signal CS4-1 and signal CS4-2. The tolerance or accepted degree that the leading edge E1 of the area A-C may be shifted from its specified position may be indicated by the length of the signal CS4-1. The acceptable degree that the trailing edge E1 of area A-c may vary from its specified position may be indicated by the length of the signal CS4-2. Thus the distance between the centerline of signal CS4-1 and the leading edge of signal CS4-1 may be considered a plus tolerance and the distance from said centerline to the trailing edge of signal CS4-1 may be considered a minus tolerance as defined in conventional measurement practice. These dimensions are respectively referred to in FIGS. 8 and 8' by the notations +T and −T.

The length of signal CS4-1 is equivalent to 2T having a dimension or length determined by the speed at which the picture signal generating beam is scanning the image field BF and the acceptable variation of said area from a desired or specified point or line in the image field. If the area A-C has within its borders image characteristics which would interfered with the comparison-measurement function, the gating signal CS-3 may be provided as two or more signals falling sufficiently on both sides of the centerlines of the CS4-N signals to permit the comparative measurement to be effected.

In FIG. 8, reproduction heads PU1 to PU4 pass signals from their respective channels to respective reproduction amplifiers A-1 to A-4 as member 10 moves relative thereto. The reproduction of the PB signal is passed to a clipping circuit CL2 and is adjusted in clipping amplitude or level to produce a signal output therefrom when the increase or decrease in amplitude caused by the sweep of the camera beam in moving across the edge of area A-C appears in the reproduced signal PB. The appearance of this signal at clipper CL2 thus indicates the position of the leading edge of the image area A-C being compared. The reproduction of signal CS3 is passed to the switching input of a normally open, monostable gate or switch G2 to maintain said gate closed and complete a circuit while said reproduction of signal CS3 is passed therethrough.

The output of clipper CL2 is passed to a Schmitt circuit CM which is a cathode coupled multivibrator having an inverter at the output of the multivibrator. Said Schmitt circuit will produce a short pulse output each time a signal at its input inflects a predetermined degree in amplitude. For example, if an elongated pulse is passed to Schmitt circuit CM, the leading edge of said pulse will cause a short pulse to be produced at the output of Schmitt circuit CM and the trailing edge of said pulse will cause a second short pulse to be produced at said output. Thus, if the clipping circuit CL2 produces a signal of a given duration generated as that part of the reproduced PB signal which was produced as the scanning beam scanned across an area such as A-C in the image field of a different light intensity or color than the surrounding field, the distance across said area along a specific scanning line of the scanning path STL may be determined by measuring the length of said signal or the distance between the two points where said picture signal PB changes in amplitude.

If the area A-C provides, when so scanned, an increase or positive inflection in the picture signal, then clipping circuit CL2 will produce an output signal whenever its input is energized by that part of the picture signal generated when the beam crosses from the border to border of area A-C. The Schmitt circuit CM will produce short pulses when the leading and trailing edges of the signals from clipping circuit CL2 arrive thereat. The gating signal CS3 will determine which of the sweeps across area A-C will be used for measurement and will prevent the passage of signals produced by Schmitt circuit CM as the result of scanning the other areas A-A and A-B in the field BF.

The output of Schmitt circuit CM is passed to one input of a logical AND circuit AN2-4. The other input of AN2-4 is connected to the output of amplifier A4. The output of Schmitt circuit CM is also passed through a delay line D2 to the input of a logical NOT circuit N2. The switching input of circuit N2 is connected to the output of the AND circuit AN2-4. Delay D2 is provided to account for the switching time of circuit AN2-4 so that, if a pulse is produced at the output of Schmitt circuit CM at the same time that CS4 is being reproduced, it will not pass through the NOT circuit N2 but will be stopped by the appearance of a pulse generated by AND circuit AN2-4. When there is no output from NOT circuit N2, the leading edge and/or trailing edge of area A-C fall within the area or position indicated by signals CS4-1 and CS4-2. If the pulse should be produced from Schmitt circuit CM when there is no signal output from amplifier A4, the AND circuit AN2-4 will not produce an output and said pulse will pass through the NOT circuit N2.

The output of NOT circuit N2 may be connected to one or more of a number of electrical devices such as a relay or recording head. The relay RE may be used to activate a warning signal generating device, stop a machine, effect a visual or magnetic recording, send a signal to a computer, etc.

A simplification of the recording arrangement and apparatus of FIG. 8 involves the elimination of the signal CS3, its reproduction apparatus and the gate G2. However, the channel C4 must be noise free and cannot contain other signals which would give a false indication of the condition of the PB signal. If the recording member 10 is a magnetic drum or closed loop tape, it may be rotated or travelled at constant speed and may be used to repeat the described comparative measurement by either intermittently recording and erasing a PB signal of the phenomenon being measured from member 10 or providing said position indicating signals CS at tire intervals and synchronized to the generation of a video picture signal generated in scanning said phenomenon. The signal S1 on channel C1 may be used to trigger the sweep of a video camera scanning device to start producing said picture signal at a predetermined instant when a particular length of the recording member 10 is passing the reproduction heads or is in a predetermined position relative to said heads, during its travel, so that the similar effect will be attained as obtained in recording said signal on a specified length of said member 10 relative to said other signals and simultaneously reproducing said signals therefrom.

FIG. 9 illustrates means for automatically measuring a distance or distances between points in a video image field such as the distance between two coordinates where a scanning line STL crosses the borders of a particular area in said field or the borders of two predetermined or specified areas. An example of such measurement is the rectangular image field BF having an area or patch A-C as shown in FIG. 8'. The area A-C is characterized by a different radiation or light intensity than its surrounding field area BF. To simplify the description, the sides or borders of area A-C are parallel to the borders of the field BF. The width D of area A-C may be automatically determined by automatically measuring the length of that part of the picture signal produced during scanning the width of said area, or, assuming that scanning speed is constant, determining the time it takes for the beam to travel from one border to the other. If it is known how long it takes for the scanning beam to travel a unit distance across the area or surface AC, then the width or any predetermined dimension of area A-C may be measured by timing the interval it takes for points in or portions of the picture signal generated by such scanning to each exist in or arrive at a measuring circuit.

Provided that the area A-C is of a known and predetermined scale in BF, the actual distance D is obtained by multiplying the time it takes for said beam to sweep across said area by the proper time constant. The latter may be derived if the speed of scanning is known and the time it takes for the scanning beam to sweep or travel a unit distance is determined. Assume the picture signal generated in scanning the field is recorded on a magnetic recording member 10, as shown in FIG. 9, while said member is driven at constant speed. Then, distance D may be determined by accounting for the speed of said tape, the time interval between the reproduction of that segment of the PB signal generated when the scanning beam crosses the border E1 of area A-C during a single line and the reproduction of that segment of PB generated when said beam crosses the border E2.

FIG. 9 shows means for effecting a measurement whereby the picture signal PB derived by scanning field BF is recorded in a predetermined position on a magnetic recording member 10 relative to multiple gating signals CS3 recorded at predetermined positions on channel C3 and signal CS4 recorded on channel C4. Signal PB need not be so recorded if it may be generated in a measuring circuit such as that illustrated in FIG. 9 at a predetermined time relative to the generation of the other illustrated signals.

Whereas in FIG. 8 the length of a short pulse signal on channel C4 determined a tolerance range for the position of a line or border image in the field, in FIG. 9 such a positional tolerance is determined by the positions of the respective leading edges of signal recordings CS3-1 and CS4-1. This is effected by passing the output of reproduction amplifier A3, which output is the reproduction of recorded signal CS3-1, to an input of a dual input AND circuit AN23 and the output of reproduction amplifier A4 to the switching input of a normally closed monostable gate or NOT switch N2 which is switched to open when a reproduction of the CS3-1 signal is present thereat.

Thus, if there is an input to NOT circuit N2 resulting from a predetermined change or characteristic of signal PB being clipped in video clipper CL-2, there will only be an output from AND circuit AN23 if signal CS3-1 is being reproduced but not CS4-1. The positions of the leading and trailing edges of signals CS3-1 and CS4-1 thus determine the tolerance range of the position of the border of the area or other optical line phenomenon being measured.

Signal CS3-1 of FIG. 9 has the length equivalent of L in FIG. 8' and signal CS4-1 has the length equivalent to L minus 4T where T is the distance in the field BF along which field the border of area A-C may shift either side of a normal or standard position without falling outside of a desired tolerance range.

The signal CS4-1 of FIG. 9 has the effect to blank and prevent transmission to AN23 of any signal which may be reproduced when a portion thereof falls beyond the limits of the inside tolerance limits. Thus any images situated within area A-C which would confuse or prevent measurement are eliminated from said measurement. If area A-C has areas within its borders similar in intensity to field BF, signal CS4 may be so positioned on a recording member and has a length sufficient to prevent the passage of any signal from the clipping circuit which will produce an output and interrupt the signal passed therethrough while signal CS3 is present thereby to produce variations or multiple pulses in the output of AND circuit AN23 which will switch the flip-flop FC.

For example, the area across which it is desired to effect a lineal measurement may not be an area having changes or interruptions (such as LA') in the composition of the image pattern within its borders which will cause variations in the picture signal which will confuse or prevent measurement. To effect dimensional measurement by scanning, it is necessary to block any output from Schmitt circuit CM to the measurement apparatus illustrated which is not a pulse generated by signals produced at the leading edge and trailing edge of the border of the area being scanned for dimensional measurement. The position of signal CS4 is such that, when reproduced and passed to a logical NOT circuit, it will prevent the output signal from Schmitt circuit CM produced during the same time interval as signal CS4 is generated from passing to the AND circuit AN23. This is effected by connecting the output of amplifier A4 to pass the reproduction of the CS4 signal or signals to the switching input of NOT circuit N2 thereby disconnecting or breaking the circuit between circuit CM and AND circuit AN23.

Also illustrated in FIG. 9 are means for automatically adjusting certain of the circuit variables such as the clipping level of the clipper CL2. This may be effected automatically without adjustment by the provision of one or more signals recorded on said recording member in positions to be reproduced to effect the desired adjustment by controlling a servo motor coupled for providing said adjustment.

FIGS. 9 to 12 illustrate means for automatically adjusting the clipping level of clipper CL2 one or a number of times during said automatic measurement cycle. Means are also provided for effecting the selection of one of multiple of outputs K1 to KN over which to gate the results of measurement. A number of other functions may also be automatically adjusted by reproducing prerecorded signals from member 10. For example, the degree of amplification or attenuation of all or part of the picture signal may be adjusted by recording one or more signals on channels CS to CN of the member 10 in positions to be reproduced and effect the required adjustment or control prior to or during a measurement cycle.

If recording member 10 is driven at constant speed, the duration of a signal recorded on and reproduced therefrom prior to or during the reproduction of the picture signal may be employed to drive a servo motor from a zero set condition for a predetermined time to position the shaft of a variable resistor, capacitor or inductance a predetermined adjustment. A series of equi-spaced, equi-duration pulses reproduced from a single auxiliary channel may also be passed to a solenoid for stepping a switch to a selected position to select one of a plurality of output circuits on which to transmit.

The results of measurement digital code recorded either in series or in parallel on a multiple of said auxiliary channels may be passed to the digital-to-analog converter or shaft positioner which is adapted to adjust a variable potentiometer or rotary switch. In FIG. 9 servo motor SM is coupled through gears GR to the shaft of a variable potentiometer R9 in the grid-cathode circuit of the clipper CL2 to effect a predetermined adjustment of the potentiometer shaft by means of a signal reproduced from CB. The motor SM is controlled by forward and reverse controls F and R which are energized by signals reproduced from channels C8 and C7. Thus, if member 10 is driven at a predetermined and constant speed past the reproduction heads, the length of a signal recorded on said member will be equal to a specific time said signal exists in the output of the respective reproduction amplifiers.

A signal of a particular duration recorded on channel C8 will maintain the control F of motor SM energized for a particular time whereby the shaft of the servo motor SM will be driven a predetermined number of rotations which is used to preset or to predetermine the clipping level of clipper CL2. This may be effected by controlling said motor to positionally control the shaft of the potentiometer Rg in one direction by signals reproduced from channel C7 of member 10 and in the other direction by signals reproduced from channel CS by the reproduction amplifier A8. Amplifier A8 is operatively connected to the forward drive control F of servo SM as shown in FIG. 11 to preset the shaft of the variable potentiometer Rg in the grid-cathode circuit of the triode tube 6J5 of the clipper CL2 as illustrated in FIG. 10.

A signal recorded on channel C7 may be of such a length to reset the shaft of potentiometer Rg to zero as shown in FIG. 11. Subsequently, a signal reproduced from channel C8 is fed to the forward drive control F of motor SM to preposition said shaft, thereby adjusting the potentiometer operated bi-stable solenoid actuated switch adapted to effect the reversal of motor SM. The motor SM continues its reverse travel until the shaft of the potentiometer Rg has reached a zero position.

In FIG. 11, a limit switch LSW is shown adjacent a zero stop pin SMS. When actuated by the brush arm BA of the variable potentiometer Rg, stop pin SMS is adapted to stop motor SM at a reset shaft position. For conventional video apparatus variable potentiometer Rg has a range of 5000,000 ohms to 3 megohms permitting any predetermined level of video amplitude in the picture signal range to be clipped according to the setting of said shaft RPS.

A second method of presetting the potentiometer Rg is to record one or more digital codes on one or more channels of member 10. These digital codes are then reproduced at a particular instant during the reproduction of the picture signal recording PB or prior thereto and used to effect the angular positioning of said shaft. FIG. 10 illustrates apparatus for effecting such shaft positioning by means of a digital-to-analog converter DAC. The input to converter DAC may be a series or parallel digital code reproduced from recordings on the member 10. The digital to analog converter consists of a setting unit DAC" and a control unit DAC' for receipt of said digital input from amplifier A5. The setting unit DAC" positions the shaft to the number of revolutions and fractions of a revolution determined by the coded signal input reproduced from recording member 10. The output shaft of setting unit DAC" is coupled by gear means GR to the shaft of the variable resistor. The setting of the resistor Rg determines the clipping-level of clipper CL2.

Also illustrated in FIG. 9 are means for automatically selecting one or more circuits over which to gate information derived from the measuring operation described. The output of pulse counter CT is connected to the input of a multi-output selection switch MS which is a rotary stepping switch that is capable of attaining one of a particular number of switching positions as predetermined by pulse signals provided at an input ST thereto. A signal to a resetting input RST resets said switch to a zero switching position.

The output of counter CT may be a digital pulse or pulse train indication of the count and may be passed to one of a number of computing, recording or control circuits for effecting or performing various computing, recording or control functions. In FIGS. 9 and 12, means are shown for automatically gating the output of counter CT to one of multiple circuits K1 to KN. Signals recorded on recording member 10 are used to select which of the circuits K1 to KN the output of counter CT will pass to.

This means may also be employed to gate segments of the picture signal FB to one of a plurality of different circuits or to gate the output of any of the other illustrated devices such as clipper CL2 or Schmitt circuit CM to one of multiple circuits for recording, measurement or computing purposes. A multiple circuit rotary switch MS has its input connected to counter CT.

In FIG. 12, switch MS comprises the combination of solenoid SOL operative, when its input is pulsed, to actuate a ratchet and pawl mechanism RP which steps a shaft RPS to move a potentiometer electrical wiper arm WA to the next switching position. The input to solenoid SOL is derived from the reproduction amplifier A5. If shaft RPS is reset to a zero position, the number of pulses recorded on channel C6 will determine the position to which shaft RPS is moved. Hence, the switching of the input to the selected output circuit is effected. A servo motor SM' actuated by a signal reproduced from channel A6 may be used to reset or drive the shaft RPS to a zero position at the end of the measuring cycle. The electromechanical switching means of FIG. 12 may be replaced by an electronic device such as a magnetron beam switching tube with the input from A5 connected thereto for switching said beam one switching position each time a reproduced pulse is received thereby.

The hereinabove described means for effecting automatic switching may also be used to gate a selected of a plurality of signals or voltages to one or more selected circuits adapted to effect measurement of the type described prior to or during the reproduction of the picture signal.

The recording arrangement and measuring apparatus of FIG. 9 is subject to a degree of variation without departing from spirit of the invention as related to automatic dimension positional measurement. For example, the pulses produced at the output of the respective Schmitt cathode coupled multivibrator circuit CM by the leading edges of the reproduced control or gating signals CS3 and CS4 may be used to define a measurement or tolerance range along a scanning line in the field being scanned. If amplifier A3 is connected to a Schmitt circuit CM, it too will produce a pulse when the leading edge of signal CS4 appears. The first pulse produced by the leading edge of signal CS3 may be used to start a digital timer of the type described and the second mentioned pulse to reset said timer. A pulse or pulses produced by clipping and passing the picture signal PB through a Schmitt circuit CM may be used to effect a binary digital code output from said timer which is indicative of the location of said charge in said picture signal between the leading edges of signals CS3 and CS4. The leading and trailing edges of the CS3 and CS4 signals may thus define the limits of a dimension or positional tolerance range.

The pulse counter CT may also be replaced by a digital timer or clock DIT of the type hereinabove illustrated and used. A timer DIT indicates by a digital output therefrom where said change occurs in said picture signal relative to said CS signals or to the beginning of said picture signal. In the latter example, the digital timer DIT may be started by the reproduced signal S1, the first pulse output of AND circuit AN23 or another signal recorded on and reproduced from channel C1 or on any other channel which signal is positioned in a predetermined location of a tolerance range for the particular image phenomena being measure.

An apparatus for automatically scanning work-in-process and for determining by one of the means hereinabove described is shown in FIG. 13. The following phenomena may be determined:

(a) If the contour or shape of a work-piece conforms to a given contour or falls within specified dimensional lizits of a given contour, (b) If a particular or predetermined part or dimension of said work-piece conforms to a predetermined dimension and/or is positioned relative to other parts or areas of said work-piece within given dimensional limits, (c) If predetermined image areas exist or do not exist on said work such as production markings, components assembled therewith, imperfections, components or material, etc., (d) The actual measurement of a predetermined or specified dimension across said work or across part of said work, and (e) Other of the numerous functions commonly performed by visual or manual means or mechanical measuring devices in inspecting or measuring work in process or finished goods.

FIG. 13 shows a means for conveying a series of articles of manufacture past a scanning station SC-ST. The conveying means comprises a conveyor CV illustrated as an endless motor driven belt but which may be any known type of article conveyance. For the purpose of simplifying the description, the workpiece or article W to be scanned is shown as an oblong block or box-shaped solid with a series of steps formed therein. Any dimension across the article such as the illustrated d1 and d2 dimensions extending across the first two steps in the upper face of workpiece may be automatically determined by the means provided in FIGS. 9 to 12.

During inspection scanning, the work is held stationary by an automatic clamping fixture. However, scanning may be effected on-the-fly upon photoelectric detection thereof on the conveyor, preferably while in a predetermined location and aligned in the scanning field to provide accurate measurement. The positions of said step-like formations relative to one end W1' of workpiece may be automatically determined by the means of FIG. 4, or relative to the position of an area such as area W1 which may comprise a hole, formation on said part or component assembled therewith determined by the means of FIG. 8. The recording member 10 illustrated in FIG. 14 comprises a closed loop tape which is continuously driven in a fixed path at a constant speed for effecting said recording and reproduction relative thereto by magnetic transducing heads RE and PU.

At a scanning station SC-ST, a video camera CAM is fixed n a mount relative to the conveyor CV and is focused to scan the surface WS which faces the camera when workpiece W is aligned at a predetermined position on conveyor CV and the front end WE is at a predetermined position in the longitudinal travel of the conveyor CV. Simple means are provided in FIG. 14 for aligning the work W relative to the scanning camera CAM. However, more complex alignment means or fixtures may be needed depending on the shape of the work, the characteristics of the scanning device CAM and its optical system, and the precision required for the automatic measurement.

The work W travels in the attitude illustrated in FIGS. 13 and 14 along the conveyor CV prior to reaching scanning station SC-ST. An alignment bar AB extends over the conveyor CV. The work W is pushed against bar AB by a pusher bar B1 which is operated by an air or hydraulic cylinder CY1. The operation of cylinder CY1 is effected when the leading surface WE of the work has reached a predetermined point in its longitudinal travel in the scanning field BF.

A photoelectric cell PH and photoelectric control PHC therefor are provided. Control PHC transmits a pulse over an output circuit when light from a light source LS mounted across the conveyor is cut or interrupted by the work W as it moves past. The interruption of the light source LS initiates the action which prepositions workpiece W in the scanning field. The transmitted pulse activates a control for an air cylinder CY2 which thereafter projects an arm B2 across the conveyor CV. The face WE comes to rest against arm B2 thereby aligning workpiece W in the field when bar B1 is projected by cylinder CY1 to force face WS against alignment bar AB.

The workpiece W is thus essentially provided in a predetermined position relative to the scanning camera CAM with the surface WS to be scanned at a predetermined attitude relative to said camera scanning field. The output of control PHC is thus passed over two circuits. A first is connected to a control F of cylinder CY2 which is one input of a solenoid actuated electromechanical flip-flop switch which opens a valve and actuates the cylinder CY2 projecting the bar B2. The pulse is also passed to a time delay switch D2. A pulse is then transmitted from switch D2 to the forward control F of cylinder CYL The delay period of delay switch D2 is such that pusher bar B1 will be projected against workpiece W a time interval thereafter which is sufficient to permit the surface WE to engage and align itself against bar B2. When workpiece W is so aligned, scanning of the field by scanner camera or flying spot scanner CAM may take place in such a short interval that bars B1 and B2 may be retracted within a fraction of a second after bar B1 has urged workpiece W against bar AB. Therefore, the conveyor CV need not be stopped during this action.

Thus, cylinder CY1 is adapted to automatically retract at the end of its forward stroke. The return travel of cylinder Cy1 may be used to actuate a limit switch thereby completing a circuit with a solenoid which closes or opens a valve to activate cylinder CY2 retracting bar B2. This action is accomplished in FIG. 14 by delay relays D2' and D2 which provide pulses for energizing the reverse controls of the flip-flop switches controlling fluid actuated cylinders CY1 and CY2 for retraction thereof a short time after bar B1 urged workpiece W against bar AB.

The scanning action is accomplished as follows: The pulse signal output of control PHC is also passed through delay line D1 to respective time delay relays D3 and D4 and through line L1 as shown and to the complement input C of an electrical bi-stable unit or flip-flop switch FL2.

A first pulse transmitted through line L1 to switching control C of flip-flop switch FL2 switches the picture signal output of the video scanning device CAM over a circuit to the writing or recording input RI of a video storage tube STT. The image signal derived from scanning the surface of the prepositioned workpiece W is recorded on the storage element of the storage tube STT as described below.

After being energized by the signal on the output of delay line D1, delay element D4 transmits a second pulse to switching control C of flip-flop FL2 a time delay period after transmission of said first pulse to effect the recording of the video picture signal on the storage element of STT. Thereafter, flip-flop FL2 switches to a condition whereby the circuit between the scanner and the storage tube STT is broken. Therefore, when the workpiece W starts moving again after bar B2 retracts, the recording in storage tube STT will have been effected.

A delay relay D3 having a time constant equal to that of delay relay D4 or greater permits the picture signal to be read into the storage tube STT before effecting the recording of said picture signal on the magnetic recording member 10 in one of the manners hereinabove described. Said picture may otherwise be used as described to effect a measurement or comparison by reproducing it simultaneously with signals generated by reproduction from member 10 in the manners provided in FIGS. 1 to 12.

The output of delay relay D3 is passed to a flip-flop switching circuit FL2' which is a normally open switching means. Upon receipt of a pulse from delay relay D3, switching means FL2' closes for a predetermined period of time after which it automatically opens. The input to switch FL2' is derived from reproduction amplifier A1. When the reproduction head PU1 reproduces the sync signal S1 from channel C1 of recording member 10, said S1 pulse is passed to read trigger control RT of storage means STT. Control RT triggers the read beam control of said video storage tube STT and causes said beam to sweep the surface of the storage element and produce an output therefrom which is a video picture signal. The output is passed to a recording amplifier RA2 and recorded on channel C2 through recording head RH2 in a fixed position relative to the signal Si recorded on channel C1.

The trigger control RT comprises a vacuum tube gate for changing the potential of the read gun element (not shown) of STT to the desired voltage for effecting automatic reading of the stored signal. A power supply PS is gated to control RT when control RT is actuated by the pulse from amplifier A1. The circuit between amplifier Al and switch RT remains closed for a period to permit member 10 to travel at least one cycle. Therefore, regardless of where the recorded signal S1 is located when flip-flop FL2' is first energized, the reproduction of signal S1 will pass through switch FL2' to switch RT before the switch RT opens. The output of flip-flop FL2' is also passed to a time delay switch FL3. Delay switch FL3 is in the circuit of the recording amplifier RA2 and the recording head RH2 and maintains said circuit closed for a period of time necessary to effect recording of at least one complete video frame picture signal onto member 10.

FIG. 15 is a schematic diagram showing a further means for producing a first positive pulse when the leading edge of an elongated signal or pulse appears in a circuit and a second pulse output when the trailing edge of said signal appears thereat. The circuit of FIG. 15 may be substituted for the Schmitt cathode coupled multivibrator circuit CM of FIGS. 8 and 9.

The circuit of FIG. 15 includes a differentiating circuit DCT comprising a capacitator and resistance of very small time constant, e.g., in the order of $10^{-12}$ microseconds. The input to the differentiating circuit is from the clipping circuit CL2 of FIGS. 8 or 9. A summing amplifier or integrator SA is provided in the circuit with three inputs to its grid. One input to summing amplifier SA is derived directly from a crystal diode CD1 of the differentiating circuit DCT. Another input to summing amplifier SA is from the output of a DC amplifier inverter IN. A second crystal diode CD2 is in the circuit of differentiating circuit DCT and inverter IN. A feedback loop is shown from the output of SA to its input. The Schmitt circuit summing amplifier CM of FIG. 15 will provide a dual signal output, as described, when a prolonged signal passes to its input.

In FIG. 14, the output of the photoelectric detector PHC is connected to the trigger input TC of the video scanner or camera CAM through a delay relay or delay line D1' and switch. When energized, the trigger control TC may be adapted to cause the camera CAM to effect a cycle of beam scanning of the image field including the workpiece being inspected. Then, the single frame video picture signal generated on the output R-CAM may be passed directly to a recording member such as a magnetic drum or for direct recording thereof without employing the intermediate storage tube STT for storage. Synchronization of the reproduction of the video signal from the recording member 10 with the reproduction of a comparator video signal or gating signals as described may be effected by clipping the vertical sync signal from the composite picture signal so recorded. That is, said vertical sync signal is used to synchronize the recording and/or reproduction of said comparator signal or signals.

The input RI extends to the modulation and deflection control circuits for the write-beam of the video storage tube STT. The input RI receives the video picture signal generated at the output R-CAM of the video camera CAM.

When the trigger input for the reading control RT is pulsed by a reproduction of the frame pulse signal S1, the stored video signal in storage tube STT is generated on output OST. In FIG. 14, the video camera CAM contains a trigger control TC for full frame scanning. Refer to my U.S. Pat. Nos. 3,646,258 and 3,051,777 for greater details of frame trigger control TC.

In FIG. 1C, the output of AND circuit AN4N may be used for various control or computing purposes. If the motion of member 10 is coupled or synchronized to the motion of a machine tool carriage or component, the signal from AND circuit AN4N indicate that the condition preset in the RN switches has been attained and the output from AND circuit AN4N may be used to start or stop a servo device driving said machine or associated therewith. It may be desired to open or close a valve, actuate a solenoid, reverse direction of a driving motor, etc. when said condition has been reached.

The relay RE of FIG. 10 may be used as a gate to perform any of the gating functions described in this invention and may be used when energized by an output from AND circuit AN4N to effect one of various transducing actions on the generated or recorded picture signal; namely, (a) An output from AND circuit AN4N may indicate that a desired point in the length of the magnetic recording member 10 has been reached (i.e. one containing a specific picture signal recording of a multiplicity of different picture signal recordings. Said output may be used to effect reproduction of said picture signal from the recording thereof by completing a circuit between the output of the respective reproduction head PU2 or amplifier A2 and another output circuit connected, for example, to a recorder, etc. Actuating the relays R4 to RN in a predetermined order may thus be used for selectively reproducing picture signals from member 10. The unit length U of the code may extend the length of a specific signal recorded adjacent thereto that the output gate will be open at the time said signal recording is present at the respective reproduction head.

(b) Similarly, an output from AND circuit AN4N may be used to erase a specific signal or length of a signal recorded on member 10.

(c) If bit information is recorded on channels C1 and C2 and any other channels necessary to effect numerical recording for digital computing, control or storage of information, the preselection coding means of FIG. 10 may be used for selecting from a specific channel or channels thereof a signal or signals in code form which may be present on a known length of said member or tape 10.

FIG. 16 illustrates an inspection station, preferably along a production line, which is more versatile than the apparatus illustrated in FIG. 14. Means are provided for relatively moving both a beam scanning device and work to be inspected whereby different areas of said work are presented to the scanning field of the scanning device. The scanning device CAM may comprise a deflection control beam scanning video camera, as described, or any suitable radiation scanning means such as one utilizing X-rays, infra-red radiation received from the article being inspected, sonic or other forms of radiation detection and scanning means.

The scanner CAM is mounted on a manipulation apparatus 61 having one or more arms which are supported from above. For details of a typical article manipulator and the automatic control thereof to cause an article such as the scanning camera CAM to travel a predetermined path in the realm of its motion, reference is made to my parent application Ser. no. 477,467 filed on Dec. 24, 1954, and other copending applications which refer to computer controlled or programmed manipulators. The manipulator 61 has a first vertical arm 62 which is rotatable and defines a joint 62J for supporting a second arm 63. At the end of arm 63, the scanner camera CAM is supported on a base 65 which is preferably power pivotable and/or rotatable by means of servo motors mounted within the arms 63 and/or base 65.

Scanning of the field immediately in front of the optical system of the scanner CAM may be effected while said scanner is stationary after having been automatically prepositioned by means of a programming apparatus or computer and/or while it is in motion as defined by movement of the manipulator 61. The output of the scanner CAM comprises one or more frame picture signals and is passed to a recording apparatus of the type described. The output is recorded or immediately compared with a standard picture signal or signals to determine variations in portions of the image field as hereinabove described.

The apparatus illustrated in FIG. 16 comprises an inflow conveyor 50 illustrated as a closed loop belt or flight conveyor. A plurality of slide bars 51 constituting guide means are mounted above the conveyor 50 to define the alignment of articles delivered along a central portion of conveyor 50. Therefore, said articles will be carried onto a turntable 54 having means for prepositioning and clampingly engaging the lower portion of the article. The surface of the article is thereby aligned relative to the optical scanning field of the scanner CAM.

The turntable 54 is shown pivotally mounted on a base 56. Turntable 54 is pivotable to effect discharge of articles thereon onto a receiving conveyor 52 after scanning has been effected and to rotate the article about a yaw axis relative to the scanner. Therefore, different portions of its surface may be presented in the scanning field thereof while the scanner is held stationary or moved in a predetermined manner. The turntable 54 is also rotatable about its central axis by means of a motor 54M which is operatively coupled to frictionally or otherwise engage a surface of the table and rotate it as the motor 54M is operated. Thus, the work held against the surface of the turntable 54 is movable about the central axis of the turntable so that a further degree of movement of the work is attained. The turntable 54 may also be movable about a third axis which is parallel to the direction of the conveyors 50 and 52 so that the work may be rolled, pitched and yawed in accordance with control signals derived from a computer or a programming means. Consequently, substantially most of the surface of the work may be presented in the scanning field of the electro-optical scanning means CAM.

Side clamps 58 and 59 are movable by respective servos 58M and 59M to engage opposite surfaces of the work after it has been discharged onto the upper surface of the turntable 54. A clamp or stop 60 is projectible upwardly through an opening in the turntable 54 to limit the forward motion of the base of the work and preposition said work prior to operation of the side clamps 58 and 59 thereagainst. Clamp or stop member 60 is preferably retractable into the turntable 54 at the end of the inspection cycle. Thus, the work on the turntable may be released by forwardly tilting said turntable 54 after the clamps 58 and 59 have been retracted. Such action will result in discharging the workpiece just inspected onto the receiving conveyor 52 whereby it is carried to the next work station.

All of the described servos and actuators for the turntable 54, the conveyor motors and the motors powering the camera manipulator may be computer or program controlled to effect prepositioning of the work relative to the scanner and presentation of predetermined portions of the surface of the work in the scanning field.

FIG. 17 illustrates article positioning control means applicable to the apparatus of FIG. 16. However, positional control means for the scanner is not shown. It is assumed that it may be provided in accordance with the teachings of my parent application, Ser. No. 477,467 and interlocked with the detection of an article at the inspection station.

The article is detected upon arriving at the turntable or inspection station by means of a photoelectric cell and control PHC which generates an output pulse. Said output pulse is passed to both the forward start control F of the tape transport drive motor MT and a trigger input 32a of a multi-circuit timer or controller 32. Controller 32 has plural outputs for controlling the projection and retraction of the servos 56M, 59M and 60M for clampingly engaging said workpiece and prepositioning it at the inspection such as on the turntable 54 of FIG. 18.

The controller 32 also provides a signal to close a normally open switch 33 disposed in the output of magnetic tape reproduction transducer PU1 and the trigger input TC for the deflection control chain of the scanner camera CAM. Consequently, when the frame indicating pulse S1 recorded on the channel C1 of the magnetic recording member 10 is reproduced, it. will pass to the trigger input TC of the camera to effect deflection control of its scanning beam in a single frame sweep of its image field which includes at least a portion of the surface of the workpiece.

The picture signal modulated on the output RCAM of the scanner is passed through a flip-flop switch 34 to one of two recording heads RH3 or RH4 depending on the condition of flip-flop 34 and is recorded onto either channel C3 or C4 of the tape 10. The other channel contains either the picture signal derived in scanning a standard image field, portions of which standard image field are to be compared with portions of the field being inspected, or scanning the previous article or field for comparative scanning analysis. In other words, the apparatus illustrated in FIG. 17 may also be used for the continuous surveillance of a floor area, landscape or other form of display attained, for example, from scanning a particular area, volume or continuous flow of material provided that the cycle controller or timer 32 is utilized only to time the scanning of the camera and not to control the operation of article prepositioning and clamping means.

Accordingly, the flip-flop switch 34 will be generally applied where it is desired to effect automatic comparison of portions of one picture signal with similar portions of the previously generated picture signal. Switch 34 may be bypassed by directly connecting the picture signal output of camera CAM with one of the two recording heads RH3 or RH4. Means may be provided for automatically erasing the previously recorded picture signal on the channel to receive the new recording or for immediately comparing the just-generated picture signal with a standard picture signal recorded on tape 10 in a signal analyzer 30 of the type hereinabove described. The signal analyzer 30 of FIG. 17 is illustrated as operatively coupled for receiving the two picture signals recorded on channels C3 and C4 as well as gating signals SC recorded on channel C2 to effect the automatic measurement functions hereabove provided.

The flip-flop switch 34 may be operated to switch the picture signal output of camera CAM alternately from one channel to the other by the frame position-indicating-signal on channel C1 reproduced by pickup head PU1.

FIG. 17 also shows means for operating the tape 10 in an intermittent manner. The operating means includes stop control S of motor MT. Motor MT is energized by the pulse output of the article detector PHC and stop control S is energized when a reproduction head PU1 reads the frame position indicating pulse previously picked up by head PU1 at a time such that the entire picture signal generated by camera CAM has been recorded on the tape.

In FIG. 17, the magnetic recording member may comprise either a closed loop tape of such a length to permit the recording of single frame video picture signals or a recording disc preferably provided with means for either automatically or manually effecting the change of a picture signal recording. A continuously rotated magnetic recording drum or disc may also be employed. The output of the signal analyzer 30 extends to a computer CO for analyzing, recording or operating on the results which may be in digital form by means hereinabove described. The computer CO is operatively connected to the multicircuit controller or timer 32 for changing the program thereof to effect changes in the degree of motion of the fixture clamping means operated by servos 58M, 59M and 60M to accommodate different articles.

The cycle controller 32 may also have additional output control circuits for positionally controlling or moving the scanning camera CAM in a predetermined sequence or path to effect a predetermined scanning function. Alternatively, the computer CO may be utilized to control the movement of both the article and scanning camera in a predetermined manner in which feedback signals are generated to accurately position either or both so that an accurate base may be established for the generation of picture signals which may be automatically analyzed with picture signals generated in a similar and predetermined movement of a standard article and the scanner. FIG. 18 illustrates a recording and control arrangement applicable to the apparatus of FIGS. 16 and 17. A plurality of different standard picture signals are recorded and are selectively reproduced for comparison with picture signals generated in scanning different articles which are related to respective of the picture signal recordings on recording member 10.

Preceding each picture signal is a respective pulse train PC' recorded on track C1. Pulse train PC' is in the form of a binary code. The binary code is reproduced by reproduction transducer PU1 and passed to a shift register 35 which converts the code to a parallel binary code on outputs 35'. This code is passed to a code matching relay 36 of the type illustrated in FIG. 10 having parallel inputs 36' from a computer or controller 37.

The output of relay 36 is passed to the trigger control TC which triggers a single deflection cycle for the read beam of the scanner CAM only when the code reproduced from channel C1 matches the input code generated by controller 37. Thus, the controller or code setup means 37 may be operative in response to means for detecting and identifying the particular article which article may be one of a plurality of different articles moving on the conveyor. Consequently, it may generate a particular code associated with said article for effecting the reproduction of that picture signal recorded on recording member 10 and the gating signals provided therewith and associated with the particular article. Alternatively, it may be utilized to effect the recording of the picture signal generated in scanning the article adjacent or in a predetermined position on the recording member relative to the associated previously recorded standard picture signal.

The output 36a of code matching relay 36 is passed to the scanning trigger input TC of the scanner CAM and through a delay relay 36D to the retract control R of the product positioning or clamping servo. Release and transfer of the product is thereby accomplished after scanning has been effected and after said servo has been energized to advance against or otherwise retain the product by activation of the limit switch or photoelectric detector PHC.

FIG. 18 also shows a connection of the output of stage PHC with means for starting the stop control S of the servo MCV for stopping the inflow conveyor 50. Consequently, the next article thereon will not be delivered to the inspection station or turntable 54 until scanning of the article already thereon has been completed. The output of delay relay 36D is therefore also passed to the start control F of servo MCV as well as to any other servos operative in removing the article from the inspection station so that the cycle may be repeated for the next article. In a preferred form of the invention illustrated in FIG. 18, the magnetic recording member 10 may comprise a disc or drum which is driven at constant speed whereby scanning is effected whenever a code as commanded by the input device 37 is reproduced from channel C1.

FIG. 19 illustrates a scanning and detection apparatus having features hereinabove described and a scanner such as a television camera CAM. Camera CAM is automatically controlled in position to scan either different image fields or an image field which is greater in area than the optical system of the camera. The camera CAM is mounted on a turntable 47 which is rotated or oscillated in a predetermined manner by means of a servo 46. The turntable 47 may be continuously rotated to provide a continuous 360° scan or oscillated by automatic mechanical or electrically controlled means to scan at different positions in its rotation. Such positions may be defined by different changeable displays such as meter, chart or scope faces.

Accordingly, the turntable drive motor 46 is controlled by an automatic controller or computer CO which may also effect control of the movement of the recording member or tape 10 in the event that a predetermined condition exists in the field being scanned and is detected by a signal analyzing means or comparator 30 of the type hereinabove described or any suitable means for comparing the picture signal generated in scanning the same image field during the previous scan with that of the next scan.

In FIG. 19, the closed loop recording member 10 continues to operate at either constant speed or intermittently. Member 10 generates both picture signals on the inputs to the comparator 30 until a predetermined condition exists in the picture signal derived from the last scanning cycle or in a portion of said picture signals as determined by the gating signals of the type hereinabove described. When such a condition exists, the closed loop magnetic recording belt 10 which contains recorded thereon picture signals derived from scanning areas defined by the plurality of different camera positions 47a to 47n is not utilized for effecting automatic comparative measurement. A second recording means 41 comprising a magnetic recording disc or drum 42 rotated at constant speed is utilized for recording both the picture signal derived from scanning the unchanged or previous image field and each subsequent picture signal generated in scanning the changing image field. Therefore, a running analysis of the changing image situation is obtained.

In other words, the recording disc or drum 42 is operative for recording just one picture signal on each of its tracks which may be reproduced the number of times per minute the recording surface is rotated. The number of rotations is preferably equivalent to the number of cycles per minute which the beam of scanning camera CAM may be driven.

The output of reproduction head PU3 which is generating the standard picture signal is passed to a recording head 44'. Said output is recorded on the first track of magnetic disc or drum 42 and the output of the scanning camera CAM is recorded through recording head 45 on a second track of disc or drum 42.

These recorded picture signals are reproduced by respective pickup heads 45' and 46' and are passed through a flip-flop switch 34' to the comparator 30. The flip-flop switch 34' is a double pole-double throw device. Switch 34' is automatically switched to pass the reproductions of the picture signal recordings on rapidly rotating recording member 42 to the comparator 30 by a signal generated either on the output of the comparator 30 by the computing circuit CO or on the output thereof which energizes an alarm AL in a manner hereinabove described.

Thus, the scanning camera CAM is continuously positioned to scan different image fields. Its output picture signal is compared with respective recordings on the closed loop recording member 10 until a predetermined change occurs in the image field or a portion thereof as determined by predetermined variations in the picture signal. Whereafter, the rapidly rotating drum or disc 42 is employed to effect continuous comparative recordings which are produced and thereafter the comparator 30 determines the extent or nature of the changing image conditions. Accordingly, the output of computer CO or comparator 30 is also passed to the stop control S of the motor MW which is operative to either oscillate or rotate the turntable 47 thereby changing the scanning field of the camera.

In a preferred form of the embodiment illustrated in FIG. 19, synchronization between the movement of endless recording member 10 and the rotation of the scanning camera CAM may be attained by conventional means including use of a single drive for both the tape transport and the turntable mount for the camera. The drive may be continuous or intermittent and operative such that each time the scanner CAM generates a picture signal by scanning a particular image field as determined by the position of turntable 47, a respective comparator signal will be reproduced from member 10 or recording will be effected in a predetermined position on member 10 relative to said comparator signal. The control means 113 of FIG. 20 may also be employed.

FIG. 20 shows means for utilizing a plurality of scanning cameras CAM-1, CAM-2 etc., each of which is adapted to scan a different image field such as different changing displays, special volumes, etc. The mechanism of FIG. 20 is applicable to the apparatus hereinabove described. It is assumed that the field scanned by each of said cameras has a different optical characteristic than the fields scanned by the other cameras and that standard signals are recorded along predetermined lengths of the recording member 10 and are each identified by a respective parallel code.

A plurality or bank of reproduction heads PUC are adapted to reproduce the picture signal identifying codes from a plurality of recording tracks. The identifying codes are passed to a shift register 48 which converts each code to a series code which is passed simultaneously to a plurality of coded relays 49-1, 49-2, etc. Each of said relays is operative to generate a control signal upon receipt of the respective code which differs from the codes which energize the other relays.

The output of each of the relays 49 is connected to operate the trigger control TC of a respective scanning camera. Consequently, only that camera will effect a scanning sweep of its image field when a particular code is present at the reproduction heads PUC. Accordingly, the picture signal of the camera will be recorded in a predetermined location relative to an associated or predetermined picture signal to be compared therewith or will be reproduced and immediately compared with a predetermined picture signal which is one of a plurality of such signals recorded along different lengths of the recording member 10.

Certain aspects of the scanning, recording and reproduction arrangements provided herein may be utilized in improved scanning and detection systems. For example, a system may be provided utilizing one or more slow and/or fast scan video cameras to automatically scan and detect changes in an image field by comparing the previous picture signal generated in scanning a particular image field with the next picture signal or any subsequent picture signal and automatically determining as described changes therein.

It may be desired to scan an image field such as (a) the face of a cathode-ray-tube displaying information which may vary with time, (b) a landscape, (c) or other area such as a warehouse floor, (d) part of a production process, etc. and to automatically monitor all or part of the image field being scanned. Predetermined variations in a particular part of the image field may be used to generate alarm signals, code signals, etc. Said predetermined variations may be discriminated from variations in other parts of the image field by generating gating signals from recordings or other means which pass just those parts of the picture signal generated in scanning predetermined areas of the image field to analyzing circuits. As described, the analyzing circuits may be for automatically noting changes in frequency and/or inflections or changes in amplitude of the picture signal just generated from the previous picture signal. The variations in the amplitude or inflections may be automatically analyzed as to degree or amplitude, rate of change, duration, etc. by converting such variables to digital form and analyzing them by means of a computer. Or the analog portion of the changed or changing picture signal may be compared with stored analog signals to determine the nature of the changing image field.

In a preferred system, an endless track erasable recording member such as a closed loop magnetic tape or drum is continuously driven past magnetic recording and reproduction transducers. Any of the arrangements illustrated in FIGS. 1, 2, 5, 7 or 8 may be utilized for automatically determining variations in the image field being scanned. The scanning camera may be stationary or may be automatically rotated, oscillated or otherwise positioned to present different portions of the surrounding image field or environment in its field. A plurality of cameras may be employed with each adapted to have the signals generated by one or more field scans thereof gated to the recording transducing means at a time such that it may be compared with the picture signal generated in previously scanning the same image area or location. In other words, a monitoring system may be provided in which a plurality of different images or areas of a single field not accessible to a single scan by camera may be automatically and continuously monitored.

Referring, for example, to FIG. 3, the standard picture signal or single frame sweep signal generated in the previous scan of the image field may be recorded as signal PB1A on track C2 and its location determined by its own vertical frame sync signal or frame locating signal S1 on track C1. Signal S1, when reproduced, is thus utilized to trigger the deflection chain of the camera in scanning the same image area which was scanned to generate picture signal PB1A so as to generate a second picture signal which may be recorded as signal PB1B or is immediately directly compared with signal PB1A. The entire picture signal may be compared point-by-point with signal PBIA or just certain portions compared for any noticeable change or predetermined changes. The adjustment of the filter or clipping level of video clippers CL-1 and CL-2 and/or the location of gating signals SC11, SC12, etc. may be manually effected by using manual variable controls or may be computer controlled or program controlled by conventional servo controlled means.

The picture signal PB1A may remain recorded or may be replaced by the signal derived from the next scanning. If certain changes occur in the picture signal, automatic means, controlled by the warning signal generated, for example, at the output of clipper CL-1 or AND circuit AN1-2, may be employed to (a) stop movement of the scanner camera and continue to scan the image area so changing, (b) retain the camera scanning the changing image area of operative coupling with the recorder, (c) deflection control the beam of the scanner to continue to scan the area which is changing to the temporary exclusion of other areas, (d) control the optical portion of the electro-optical scanner to be retained on and magnify the general area of the image field where said change is occurring, (e) bring into operation other scanners of the same or different characteristics on the area under change such as radar, ultrasonic, infra-red, X-ray, etc. to determine other characteristics of the changing phenomena, and (f) sound an alarm.

If it is desired to note when changes of a predetermined character occur in the field under surveillance, a comparator signal of predetermined characteristic, which need not necessarily be a video picture signal, may be generated or recorded, for example, in place of the video picture signal which is used to compare with portions of the picture signal derived in scanning the field being inspected. For example, it may be known that a certain condition may exist in a certain portion of the image field being scanned when the picture signal thereof exhibits a predetermined change in amplitude or frequency along a predetermined segment or segments thereof. Then, comparator pulse or analog signals may be recorded at predetermined positions relative the frame sync signal S1. Signal S1 is used to trigger the read beam of the camera scanning the field being inspected. These signals may be compared with and used to gate clipped or filtered portions of the video picture signal for analysis thereof Such comparator signals need not be recorded as described, but may be generated in synchronized relation to the generation of the inspection picture signal by other known signal generating means.

In another form of the invention, means for digitizing or analyzing an image field is provided in which portions of the field such as discrete areas differing in shade, color or intensity from other portions or areas not defined by sharp image contrast may be present. It may be desirable to analyze said portions as to such variables as (a) existence or coordinate location of an area or areas of a particular intensity, shade or color, (b) determination of the area of a particular intensity or color in the field, (c) comparison of the location degree or coverage of areas of different color intensity or areas lacking discrete or sharp outline in a first image field with similarly colored or shaded areas of a second field, etc.

To effect such determinations, the apparatus hereinabove described may be modified by passing the beam generated and modulated picture signal, which picture signal is generated in scanning the image field being analyzed, to analyzing circuitry. The analyzing circuitry includes a plurality of means for filtering and/or clipping different portions of the picture signal exhibiting different characteristics. Color separation and determination by utilizing either a color television camera to generate a composite color television signal which may be later separated into its color components or combinations thereof by employing the proper electrical filter means or by employing the necessary optical filter or filters on the lens of the scanner camera.

A plurality of electronic filters may be employed to separate different portions of the picture signal of predetermined colors. Then, the output of each filter circuit or combinations thereof may be used as the herein described gating signals for operating or gating binary digital code signals generated by a digital clock circuit. The digital clock signals may be utilized to determine the location of areas in the image field of a particular color or shade and/or the shape or degree of coverage of said area or areas of said particular color or colors.

An image field such as a photograph, map or other field formation may be made up of different areas of different shades of a particular color such as shades of grey, halftone areas, etc. Said shades are scannable to generate a picture signal which varies in amplitude in accordance with the intensity or degree of the shade being scanned. A plurality of clipping devices such as clippers CL1 and CL2 shown in FIGS. 3, 4, 4a, 4b, 7, 8 and 9 may each be connected to receive the same picture signal but with each adjusted or provided with a clipping level which is different from the clipping level of the others. Thus, for a particular shade or intensity being scanned, one or more of the clippers may clip and generate an output signal while one or more may not provide an output signal.

The outputs of each clipping circuit may be connected to logical switching circuits such as illustrated in FIG. 4 to determine the scanning of a particular shade image intensity or color by means of a further signal or signals generated on further circuits. Each of the clipping circuits may be connected to operate a respective code generator when its output is energized or to pass the digital code output of a clock when its output is energized. If each code generator is generating a different code or codes of signals of different frequency, then indications in code form may be derived of the characteristics of the area or areas of different or predetermined color, shade or intensity. Such codes may be recorded or immediately analyzed to determine the existence of said areas, location, extent, shape, etc.

The video camera CAM may comprise a conventional television camera or a flying spot scanner. Such a camera CAM is employed throughout the disclosure to scan and generate video signals representative of the image or images in the scanning field being inspected. The flying spot scanner may employ a deflection controlled read beam or a solid state image sensor containing a suitable number of light sensitive elements. The light sensitive elements generate a suitable video signal when light is received from the surface of the object being scanned or when the image field is focused thereon.

One form of a suitable video camera which does not employ deflection control beam is described in Bell Telephone Laboratories note No. 19.3-22, dated March 1972. Light of the image field to be analyzed is focused onto a solid state area imaging device. The imaging device such as a silicon chip contains an array of light sensitive storage cells defining a charge coupled storage area wherein each of the cells thereof generates a stored charge which is proportionate to the incident light directed thereon. The integrated frame signal generated by all the light sensitive cells is then transferred to a storage area and read through a serial register to an output electrode as an analog video picture signal.

Single frame video picture signals may be generated for the purposes defined herein by controllably operating the shutter of such a camera. The camera shutter is predeterminedly opened when the object or image to be inspected is in the field of the camera optical system, such as in response to the described article detection means. The shutter is closed immediately thereafter until the next object or image is in the field and ready for the next scanning cycle.

I claim:

1. A method for recording, reproducing, and processing video image information comprising:

(a) generating a plurality of groups of video image information signals, each group defining a single frame image consisting of multiple line scans across the frame and including line and frame synchronization signals, wherein each group is suitable for controlling and synchronizing the modulation of a picture-generating write-beam of a video monitor-screen, (b) recording said groups of image information signals on different recording locations of an addressable multi-track magnetic storage member by: (1) passing said groups of image information signals to a magnetic head, (2) effecting relative movement between said magnetic recording head and said magnetic storage member, and (3) controlling said head to magnetically scan and record select groups of signals at select recording locations of said storage members (c) recording respective first digital codes on said magnetic storage member, each of said first digital codes indicating the location of a respective group of the image information signals recorded on a respective select recording location of the storage member, (d) recording second digital codes on said magnetic storage member, said second digital codes controlling an image modification to be made to a group of image information signals recorded on said storage member defining a selected area within the image, (e) thereafter employing said first digital codes to locate a select group of image information signals recorded on said storage member defining a frame, and (f) thereafter employing said second digital codes to control a modification of the image defined by the group of image information signals defining the frame, and applying the image information signals to generate a modified image on a video monitor-screen.

2. A method in accordance with claim 1 wherein the recording of said groups of image information signals is effected on a plurality of select portions of different recording tracks of said magnetic storage member.

3. A method in accordance with claim 1 further comprising storing said modified group of image information signals on a storage member.

4. A method in accordance with claim 1 wherein employing said second digital codes to control a modification of the image information comprises fading the selected area of the image frame by reducing the light intensity without altering the content of the image.

5. A method in accordance with claim 1 wherein employing said second digital codes to control a modification of the image information comprises amplifying the selected area of the image frame by increasing the light intensity without altering the content of the image.

6. A method in accordance with claim 1 wherein employing said second digital codes to control a modification of the image information comprises erasing the selected area of the image frame.

7. A method in accordance with claim 1 wherein employing said second digital codes to control a modification of the image information comprises sharpening the selected area of the image frame.

8. A method in accordance with claim 1 wherein employing said second digital codes to control a modification of the image information comprises using a second of said groups of image information signals defining a second video image to replace the selected area of said first video image with at least a portion of said second video image.

9. A method in accordance with claim 1 further comprising analyzing said groups of image information signals within the selected area of the image frame.

10. A method in accordance with claim 9 wherein said selected area comprises a rectangular area in said image frame.

11. A method in accordance with claim 1 further comprising analyzing said groups of image information signals to identify a selected characteristic of the image frame.

12. A method in accordance with claim 1 wherein said image information signals are originally in analog form, and further comprising converting said groups of image information signals from analog to digital form and recording said signals in digital form.

13. A method in accordance with claim 1 wherein generating said groups of image information signals includes scanning a selected image field with an imaging device, and wherein said image information signals vary in accordance with variations in the observed characteristics of the scanned image field.

14. A method in accordance with claim 1 further comprising applying said modified group of image information signals to generate an image on a video monitor-screen of a video display device by applying analog signals to modulate the write-beam of the video monitor-screen.

15. A method in accordance with claim 1 wherein employing said second digital codes to control a modification of the image comprises applying a plurality of said second digital codes to effect a plurality of modifications to said image.

16. A method in accordance with claim 1 wherein information-signal generation includes generating a series of groups of video image information signals, each representing one of a series of images of a motion picture.

17. A method in accordance with claim 6 wherein said selected area comprises a rectangular area in said image frame.

18. A method in accordance with claim 8 wherein said selected area comprises a rectangular area in said first video image.

19. The method of claim 1 wherein employing said second digital codes to control a modification of the image comprises selecting said second digital codes from a plurality of image-processing codes stored on said magnetic storage member and reproducing the selected second digital codes from said magnetic storage member.

20. A method for recording, reproducing and processing image information comprising:
(a) generating first information signals defining video image information arranged in the form of a plurality of frames of video data, each frame including data defining the image content along multiple lines, the signals describing the modulation and synchronization of the horizontal and vertical movement of a picture-generating write-beam of a video monitor-screen,
(b) recording said first information signals on a multi-track magnetic recording head, by: (1) passing said first information signals to a magnetic recording head, (2) effecting relative movement between said magnetic recording head and said magnetic recording member, and (3) controlling said head to magnetically scan and record said first information signals on a select portion of said recording member,
(c) selectively reproducing a frame of said first information signals from said magnetic recording member and applying said reproduced signals to control the generation on a video monitor-screen of a first image frame defined by said reproduced first information signals,
(d) recording first image-changing signals on said recording member, and
(e) reproducing said first image-changing signals and applying said reproduced first image-changing signals to control the modification of image information consisting of a selected area of the image defined by said reproduced first information signals and to control the generation of a modified image frame on said video monitor-screen.

21. A method in accordance with claim 20 further comprising storing on a storage member second information signals defining said modified image frame.

22. A method in accordance with claim 20 wherein applying said reproduced first image-changing signals to control a modification of the image information defined by the first information signals comprises fading the selected area of the defined image frame by reducing the light intensity without altering the image content.

23. A method in accordance with claim 20 wherein applying said reproduced first image-changing signals to control a modification of the image information defined by the first information signals comprises amplifying the selected area of the image frame by increasing the light intensity without altering the image content.

24. A method in accordance with claim 20 wherein applying said reproduced first image-changing signals to control a modification of the image information defined by the first information signals comprises erasing the selected area of the image frame.

25. A method in accordance with claim 20 wherein applying said reproduced first image-changing signals to control a modification of the image information defined by the first information signals comprises sharpening the selected area of the image frame.

26. A method in accordance with claim 20 wherein applying said first image-changing signals to control a modification of the image information defined by the first information signals comprises using a second of said groups of information signals defining a second video image to replace the selected area of said first video image frame with at least a portion of said second video image.

27. A method in accordance with claim 20 further comprising analyzing said first information signals within the selected area of the image frame.

28. A method in accordance with claim 27 wherein said selected area comprises a rectangular area in said image frame.

29. A method in accordance with claim 20 further comprising analyzing said first information signals to identify a selected characteristic of the image frame.

30. A method in accordance with claim 20 wherein said first information signals are originally in analog form, and further comprising converting said first information signals from analog to digital form and recording said signals in digital form.

31. A method in accordance with claim 20 wherein generating first information signals includes scanning a selected image field with an imaging device, and wherein said information signals vary in accordance with variations in the observed characteristics of the scanned image field.

32. A method in accordance with claim 20 wherein applying said selected first image-changing signals includes: (a) employing said first image-changing signals to modify analog recorded first information signals, (b) reproducing said modified signals from said recording member, and (c) applying said analog signals to inputs of said video monitor-screen to display modified image information.

33. A method in accordance with claim 20 wherein applying said reproduced first image-changing signals to control a modification of the image information defined by the first information signals comprises applying a plurality of said signals to effect a plurality of modifications to said image information.

34. A method in accordance with claim 20 wherein information-signal generation includes generating information signals representing a plurality of sequential images of a motion picture.

35. A method in accordance with claim 20 wherein generating said first information signals includes controllably scanning an object in an image field and generating scanning signals that vary in accordance with variations in the characteristics of the scanned object, and wherein said scanning signals are employed to generate said information signals.

36. A method in accordance with claim 24 wherein said selected area comprises a rectangular area in said image frame.

37. A method in accordance with claim 26 wherein said selected area comprises a rectangular area in said first video image frame.

38. The method of claim 20 wherein reproducing said first image-changing signals comprises first selecting said first image-changing signals form a plurality of image-processing signals stored on said magnetic storage member and reproducing the selected first image-changing signals from said magnetic storage member.

39. A method for reproducing and processing stored image signals comprising:
(a) providing a storage member containing (i) video information signals defining image content along a plurality of parallel lines forming a frame and the location of inter-line boundaries, thereby defining a visually perceptible image, and (ii) image-changing signals;
(b) reproducing the video information signals from the storage member and applying the reproduced video information signals to control generation on a video monitor-screen of the image defined by the video information signals;
(c) reproducing the image-changing signals;
(d) applying the reproduced imaged-changing signals to control a modification of a selected area consisting of less than all of the image defined by the video information signals; and
(e) controlling the generation on the video monitor-screen of the modified image.

40. The method of claim 39 wherein part (d) comprises modifying the reproduced information signals, and further comprising erasing the reproduced information signals from the storage member and recording the modified information signals on the storage member at the same location as the reproduced information signals.

41. A method in accordance with claim 39 further comprising electronically storing additional information signals defining said modified image.

42. A method in accordance with claim 39 wherein part (d) comprises fading the selected area of the defined image frame by reducing the light intensity without altering the image content.

43. A method in accordance with claim 39 wherein part (d) comprises amplifying the selected area of the image frame by increasing the light intensity without altering the image content.

44. A method in accordance with claim 39 wherein part (d) comprises erasing the selected area of the image frame.

45. A method in accordance with claim 44 wherein said selected area comprises a rectangular area in said image frame.

46. A method in accordance with claim 39 wherein part (d) comprises sharpening the selected area of the image frame.

47. A method in accordance with claim 39 wherein part (a) comprises providing a storage member also containing second video information signals defining image content along a plurality of parallel lines forming a frame and the location of inter-line boundaries, thereby defining a second visually perceptible image, and wherein part (d) comprises using the second video information signals to replace the selected image area of the image defined by the reproduced video information signals with at least a portion of said second image.

48. A method in accordance with claim 47 wherein said selected image area comprises a rectangular area.

49. A method in accordance with claim 39 wherein part (d) comprises applying a plurality of said image-changing signals to effect a plurality of modifications to said image.

50. A method in accordance with claim 39 further comprising analyzing those of said video information signals defining the selected area of the image frame.

51. A method in accordance with claim 50 wherein said selected area comprises a rectangular area in said image frame.

52. A method in accordance with claim 39 further comprising analyzing said video information signals to identify a selected characteristic of the image frame.

53. A method in accordance with claim 39 further comprising, first, generating video information signals by scanning a selected image field with an imaging device, said video information signals varying in accordance with variations in the observed characteristics of the scanned image field, and storing said video information signals in said storage member.

54. A method in accordance with claim 39 further comprising, first, generating video information signals by controllably scanning an object in an image field and generating scanning signals that vary in accordance with variations in the characteristics of the scanned object, using said scanning signals to generate said video information signals, and storing said video information signals in said storage member.

55. A method in accordance with claim 39 further comprising, first, generating video information signals representing a plurality of sequential images of a motion picture, and storing said video information signals in said storage member.

56. A method in accordance with claim 39 wherein said video information signals are stored in digital form.

57. A method in accordance with claim 39 wherein part (d) includes: (i) employing said image-changing signals to modify analog stored video information signals, (ii) reproducing said modified signals from said storage member, and (iii) applying said analog signals to inputs of said video monitor-screen to display a modified image.

58. The method of claim 39 wherein reproducing the image-changing signals comprises selecting the image-changing signals from a plurality of image-processing signals on said storage member and reproducing the selected signals from said storage member.

* * * * *